US004001729B2

United States Statutory Invention Registration [19]

[11] Reg. Number: H1729

Biller et al.

[45] Published: May 5, 1998

[54] METHOD FOR PREPARING COMPOUNDS EMPLOYING SOLID PHASE SYNTHESIS AND NOVEL LINKER-RESIN

[75] Inventors: Scott A. Biller, Hopewell, N.J.; R. Michael Lawrence, Yardley, Pa.; Michael A. Poss, Lawrenceville, N.J.

[73] Assignee: Bristol-Myers Squibb Company, Princeton, N.J.

[21] Appl. No.: 837,560

[22] Filed: Apr. 21, 1997

Related U.S. Application Data

[60] Provisional application No. 60/017,225, May 9, 1996.

[51] Int. Cl.[6] ..... C08K 5/06

[52] U.S. Cl. ..... 525/54.11

*Primary Examiner*—Charles T. Jordan
*Assistant Examiner*—Meena Chelliah
*Attorney, Agent, or Firm*—Burton Rodney

[57] ABSTRACT

A method is provided for preparing various intermediates and final products including MTP inhibitors employing solid phase syntheses. A new dialkoxyaryl aldehyde linker-resin of the structure which serves as a starting material and method for preparing same, are also provided.

18 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR PREPARING COMPOUNDS EMPLOYING SOLID PHASE SYNTHESIS AND NOVEL LINKER-RESIN

This application claims priority of U.S. Provisional Application No. 60/017,225 filed May 9, 1996.

FIELD OF THE INVENTION

The present invention relates to a method for preparing pharmaceutically active compounds via a solid phase synthesis employing a novel dialkoxyaryl aldehyde containing linker-resin which serves as a solid support for desired reactions such as in preparing MTP inhibitors.

BACKGROUND OF THE INVENTION

Provisional U.S. application Ser. No. 60/010,346, filed Jan. 16, 1996 (file HX79*) discloses inhibitors of MTP which have the structure

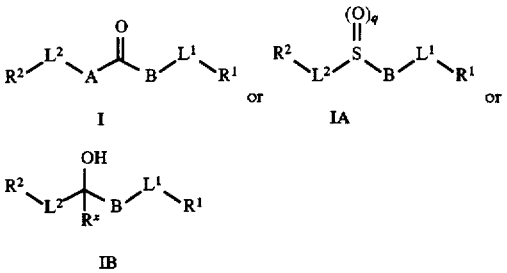

I or IA or IB including pharmaceutically acceptable salts thereof, wherein q is 0, 1 or 2;

A is (1) a bond;

(2) —O—; or

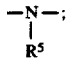

(3)

where $R^5$ is H or lower alkyl or $R^5$ together with $R^2$ forms a carbocyclic or heterocyclic ring system containing 4 to 8 members in the ring.

B is a fluorenyl-type group of the structure:

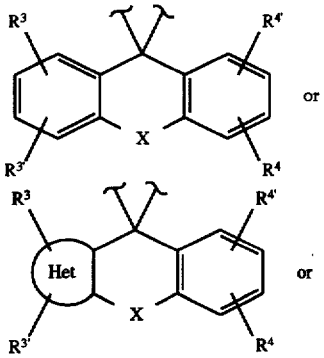

-continued

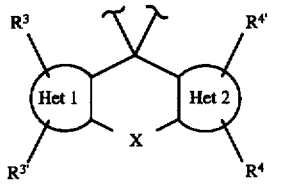

(the above B is also referred to as a fluorenyl- type ring or moiety); or

B is an indenyl-type group of the structure

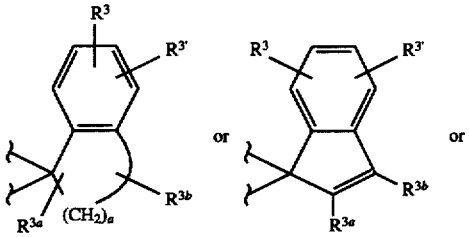

(a = 2, 3 or 4)

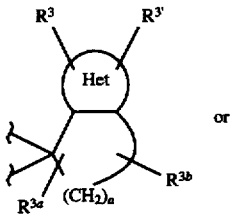

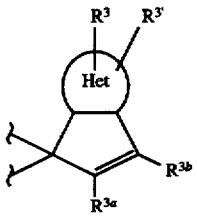

(the above B is also referred to as an indenyl-type ring or moiety);

$R^x$ is H, alkyl or aryl;

$R^1$ is alkyl, alkenyl, alkynyl, alkoxyl, (alkyl or aryl)$_3$Si (where each alkyl or aryl group is independent), cycloalkyl, cycloalkenyl, substituted alkylamino, substituted arylalkylamino, aryl, arylalkyl, arylamino, aryloxy, heteroaryl, heteroarylamino, heteroaryloxy, arylsulfonylamino, heteroarylsulfonyamino, arylthio, arylsulfinyl, arylsulfonyl, alkylthio, alkylsulfinyl, alkylsulfonyl, heteroarylthio, heteroarylsulfinyl, heteroarylsulfonyl, —PO($R^{13}$) ($R^{14}$), (where $R^{13}$ and $R^{14}$ are independently alkyl, aryl, alkoxy, aryloxy, heteroaryl, heteroarylalkyl, heteroaryloxy, heteroarylalkoxy, cycloheteroalkyl, cycloheteroalkylalkyl, cycloheteroalkoxy, or cycloheteroalkylalkoxy); $R^1$ can also be aminocarbonyl (where the amino may optionally be substituted with one or two aryl, alkyl or heteroaryl groups); cyano, 1,1-(alkoxy or aryloxy)$_2$alkyl (where the two aryl or alkyl substituents can be independently defined, or linked to one another to form a ring, such as 1,3-dioxane or 1,3-dioxolane, connected to $L^1$ (or $L^2$ in the case of $R^2$) at the 2-position); 1,3-dioxane or 1,3-dioxolane connected to $L^1$ (or $L^2$ in the case of $R^2$) at the 4-position.

The $R^1$ group may have from one to four substituents, which can be any of the $R^3$ groups or $R^1$ groups, and any of the preferred $R^1$ substituents set out below.

$R^1$ may be substituted with the following preferred substituents: alkylcarbonylamino, cycloalkylcarbonylamino, arylcarbonylamino, heteroarylcarbonylamino, alkoxycarbonylamino, aryloxycarbonylamino, heteroaryloxylcarbonylamino, uriedo (where the uriedo nitrogens may be substituted with alkyl, aryl or heteroaryl), heterocyclylcarbonylamino (where the heterocycle is connected to the carbonyl group via a nitrogen or carbon atom), alkylsulfonylamino, arylsulfonylamino, heteroarylsulfonylamino,

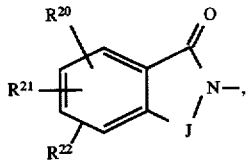

where J is: $CHR^{23}$,

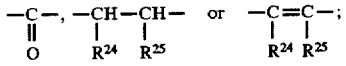

$R^{23}$, $R^{24}$ and $R^{25}$ are independently hydrogen, alkyl, alkenyl, alkynyl, aryl, arylalkyl, heteroaryl, heteroarylalkyl, cycloalkyl, or cycloalkylalkyl;

$R^{20}$, $R^{21}$, $R^{22}$ are independently hydrogen, halo, alkyl, alkenyl, alkoxy, aryloxy, aryl, arylalkyl, alkylmercapto, arylmercapto, cycloalkyl, cycloalkylalkyl, heteroaryl, heteroarylalkyl, hydroxy or haloalkyl; and these preferred substituents may either be directly attached to $R^1$, or attached via an alkylene chain at an open position.

$R^2$ is the same or different from $R^1$ and is independently any of the groups set out for $R^1$, H, polyhaloalkyl (such as $CF_3CH_2$, $CF_3CF_2CH_2$ or $CF_3$) or cycloheteroalkyl, and may be substituted with one to four of any of the groups defined for $R^3$, or any of the substituents preferred for $R^1$.

$L^1$ is a linking group containing from 1 to 10 carbons in a linear chain (including alkylene, alkenylene or alkynylene), which may contain, within the linking chain any of the following: one or two alkenes, one or two alkynes, an oxygen, an amino group optionally substituted with alkyl or aryl, an oxo group; and may be substituted with one to five alkyl or halo groups (preferably F).

$L^2$ may be the same or different from $L^1$ and may independently be any of the $L^1$ groups set out above or a single bond.

$R^3$, $R^{3'}$, $R^4$ and $R^{4'}$ may be the same or different and are independently selected from H, halogen, $CF_3$, haloalkyl, hydroxy, alkoxy, alkyl, aryl, alkenyl, alkenyloxy, alkynyl, alkynyloxy, alkanoyl, nitro, amino, thiol, alkylthio, alkylsulfinyl, alkylsulfonyl, carboxy, alkoxycarbonyl, aminocarbonyl, alkylcarbonyloxy, alkylcarbonylamino, cycloheteroalkyl, cycloheteroalkylalkyl, cyano, Ar, Ar-alkyl, ArO, Ar-amino, Ar-thio, Ar-sulfinyl, Ar-sulfonyl, Ar-carbonyl, Ar-carbonyloxy or Ar-carbonylamino, wherein Ar is aryl or heteroaryl and Ar may optionally include 1, 2 or 3 additional rings fused to Ar;

$R^{3a}$ and $R^{3b}$ are the same or different and are independently any of the $R^3$ groups except hydroxy, nitro, amino or thio;

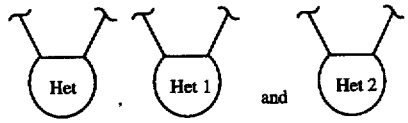

are the same or different and independently represent a 5 or 6 membered heteroaryl ring which may contain 1, 2, 3 or 4 heteroatoms in the ring which are independently N, S or O; and including N-oxides.

X (in the fluorenyl type ring) is a bond, or is one of the following groups:

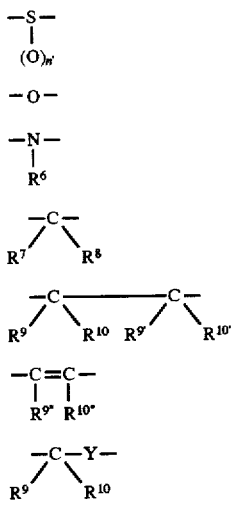

(1)

(2)

(3)

(4)

(5)

(6)

(7)

wherein

Y is O, N—$R^6$ or S;

n' is 0, 1 or 2;

$R^6$ is H, lower alkyl, aryl, —C(O)—$R^{11}$ or —C(O)—$R^{11}$.

$R^7$ and $R^8$ are the same or different and are independently H, alkyl, aryl, halogen, —O—$R^{12}$, or $R^7$ and $R^8$ together can be oxygen to form a ketone;

$R^9$, $R^{10}$, $R^{9'}$ and $R^{10'}$ are the same or different and are independently H, lower alkyl, aryl or —O—$R^{11}$;

$R^{9''}$ and $R^{10''}$ are the same or different and are independently H, lower alkyl, aryl, halogen or —O—$R^{11}$;

$R^{11}$ is alky or aryl;

$R^{12}$ is H, alkyl or aryl.

The following provisos apply to formula I compounds:

(a) when $R^1$ is unsubstituted alkyl or unsubstituted arylalkyl, $L^1$ cannot contain amino;

(b) when $R^1$ is alkyl, $L^1$ cannot contain amino and oxo in adjacent positions (to form an amido group);

(c) when $R^2L^2A$— is $H_2N$—, $R^1L^1$ cannot contain amino;

(d) when $R^1$ is cyano, $L^1$ must have more than 2 carbons;

(e) $R^1L^1$ must contain at least 3 carbons.

With respect to compounds of the invention IA and IB, $R^2L^2$ cannot have an O or N atom directly attached to S=(O)q or $CR^x(OH)$, and for IA, $R^2L^2$ cannot be H.

U.S. application Ser. No. 472,067 filed June 6, 1995 (file DC21e) discloses compounds of the structure

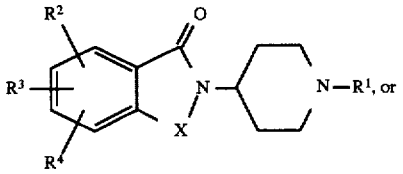

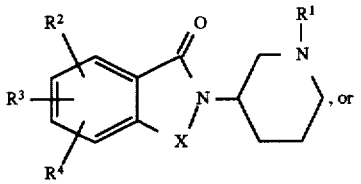

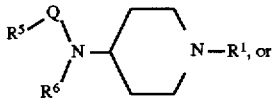

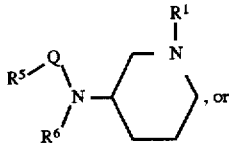

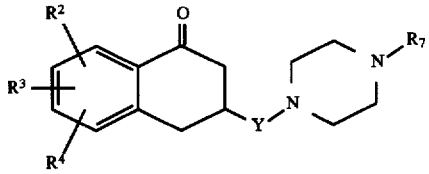

where Q is

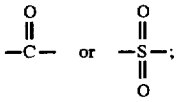

X is: $CHR^8$,

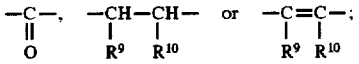

$R^8$, $R^9$ and $R^{10}$ are independently hydrogen, alkyl, alkenyl, alkynyl, aryl, arylalkyl, heteroaryl, heteroarylalkyl, cycloalkyl, or cycloalkylalkyl;

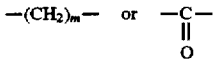

wherein m is 2 or 3;

$R^1$ is alkyl, alkenyl, alkynyl, aryl, heteroaryl, arylalkyl wherein alkyl has at least 2 carbons, diarylalkyl, arylalkenyl, diarylalkenyl, arylalkynyl, diarylalkynyl, diarylalkylaryl, heteroarylalkyl wherein alkyl has at least 2 carbons, cycloalkyl, or cycloalkylalkyl wherein alkyl has at least 2 carbons, all optionally substituted through available carbon atoms with 1, 2, 3 or 4 groups selected from halo, haloalkyl, alkyl, alkenyl, alkoxy, aryloxy, aryl, arylalkyl, alkylmercapto, arylmercapto, cycloalkyl, cyclo-alkylalkyl, heteroaryl, fluorenyl, heteroarylalkyl, hydroxy or oxo;

or $R^1$ is a fluorenyl-type group of the structure

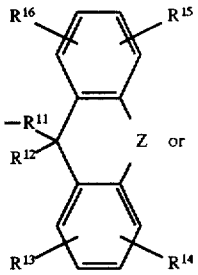

A

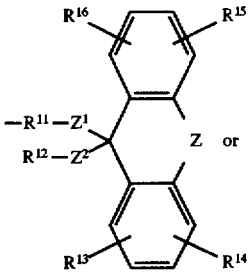

B

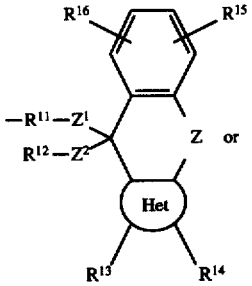

C

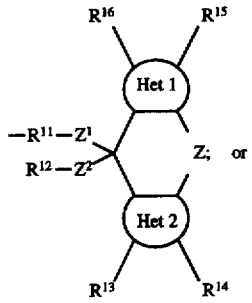

D $R^1$ is an indenyl-type group of the structure

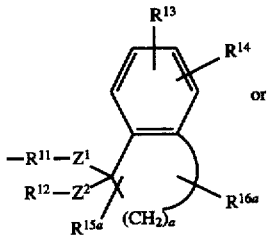

E (a = 2, 3 or 4)

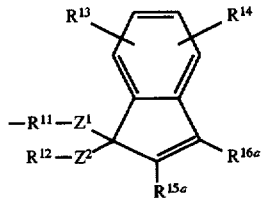

F

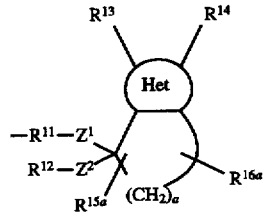

G

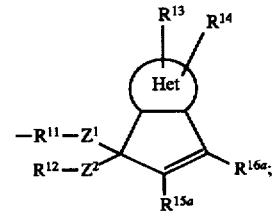

H $Z^1$ and $Z^2$ are the same or different and are independently a bond, O, S,

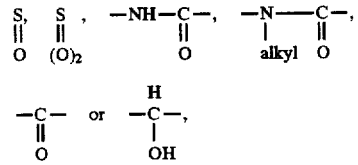

with the proviso that with respect to B, at least one of $Z^1$ and $Z^2$ will be other than a bond; $R^{11}$ is a bond, alkylene, alkenylene or alkynylene of up to 10 carbon atoms; arylene or mixed arylene-alkylene; $R^{12}$ is hydrogen, alkyl, alkenyl, aryl, haloalkyl, trihaloalkyl, trihaloalkylalkyl, heteroaryl, heteroarylalkyl, arylalkyl, arylalkenyl, cyclo-alkyl, aryloxy, alkoxy, arylalkoxy or cycloalkyl-alkyl, with the provisos that (1) when $R^{12}$ is H, aryloxy, alkoxy or arylalkoxy, then $Z^2$ is

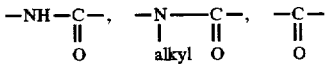

or a bond and (2) when $Z^2$ is a bond, $R^{12}$ cannot be heteroaryl or heteroarylalkyl;

Z is bond, O, S, N-alkyl, N-aryl, or alkylene or alkenylene from 1 to 5 carbon atoms; $R^{13}$, $R^{14}$, $R^{15}$, and $R^{16}$ are independently hydrogen, alkyl, halo, haloalkyl, aryl, cycloalkyl, cycloheteroalkyl, alkenyl, alkynyl, hydroxy, alkoxy, nitro, amino, thio, alkylsulfonyl, arylsulfonyl, alkylthio, arylthio, aminocarbonyl, alkylcarbonyloxy, arylcarbonylamino, alkylcarbonylamino, arylalkyl, heteroaryl, heteroarylalkyl or aryloxy;

$R^{15a}$ and $R^{16a}$ are independently hydrogen, alkyl, halo, haloalkyl, aryl, cycloalkyl, cycloheteroalkyl, alkenyl, alkynyl, alkoxy, alkylsulfonyl, arylsulfonyl, alkylthio, arylthio, aminocarbonyl, alkylcarbonyloxy, arylcarbonylamino, alkylcarbonylamino, arylalkyl, heteroaryl, heteroarylalkyl, or aryloxy;

or $R^1$ is a group of the structure

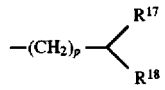

wherein p is 1 to 8 and $R^{17}$ and $R^{18}$ are each independently H, alkyl, alkenyl, aryl, arylalkyl, heteroaryl, heteroarylalkyl, cycloalkyl or cycloalkylalkyl at least one of $R^{17}$ and $R^{18}$ being other than H;

or $R^1$ is a group of the structure

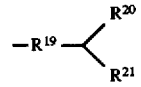

wherein $R^{19}$ is aryl or heteroaryl;

$R^{20}$ is aryl or heteroaryl;

$R^{21}$ is H, alkyl, aryl, alkylaryl, arylalkyl, aryloxy, arylalkoxy, heteroaryl, heteroarylalkyl, heteroarylalkoxy, cycloalkyl, cycloalkylalkyl or cycloalkylalkoxy;

$R^2$, $R^3$, $R^4$ are independently hydrogen, halo, alkyl, alkenyl, alkoxy, aryloxy, aryl, arylalkyl, alkylmercapto, arylmercapto, cycloalkyl, cycloalkylalkyl, heteroaryl, heteroarylalkyl, hydroxy or haloalkyl;

$R^5$ is independently alkyl, alkenyl, alkynyl, aryl, alkoxy, aryloxy, arylalkoxy, heteroaryl, arylalkyl, heteroarylalkyl, cycloalkyl, cycloalkylalkyl, polycycloalkyl, polycycloalkylalkyl, cycloalkenyl, cycloheteroalkyl, heteroaryloxy, cycloalkenylalkyl, polycycloalkenyl, polycycloalkenylalkyl, heteroarylcarbonyl, amino, alkylamino, arylamino, heteroarylamino, cycloalkyloxy, cycloalkylamino, all optionally substituted through available carbon atoms with 1, 2, 3 or 4 groups selected from hydrogen, halo, alkyl, haloalkyl, alkoxy, haloalkoxy, alkenyl, alkynyl, cycloalkyl, cycloalkylalkyl, cycloheteroalkyl, cycloheteroalkylalkyl, aryl, heteroaryl, arylalkyl, arylcycloalkyl, arylalkenyl, arylalkynyl, aryloxy, aryloxyalkyl, arylalkoxy, arylazo, heteroaryloxo, heteroarylalkyl, heteroarylalkenyl, heteroaryloxy, hydroxy, nitro, cyano, amino, substituted amino, thiol, alkylthio, arylthio, heteroarylthio, arylthioalkyl, alkylcarbonyl, arylcarbonyl, arylaminocarbonyl, alkoxycarbonyl, aminocarbonyl, alkynylaminocarbonyl, alkylaminocarbonyl, alkenyl-aminocarbonyl, alkylcarbonyloxy, arylcarbonyloxy, alkylcarbonylamino, arylcarbonylamino, arylsulfinyl, arylsulfinylalkyl, arylsulfonyl, alkylsulfonyl, arylsulfonylamino, heteroarylcarbonylamino, heteroarylsulfinyl, heteroarylthio, heteroarylsulfonyl, alkylsulfinyl;

$R^6$ is hydrogen or $C_1$–$C_4$-alkyl or $C_1$–$C_4$ alkenyl; all optionally substituted with 1, 2, 3 or 4 groups which may independently be any of the substituents listed in the definition of $R^5$ set out above;

$R^7$ is alkyl, aryl or arylalkyl wherein alkyl by itself or as part of arylalkyl is optionally substituted with oxo

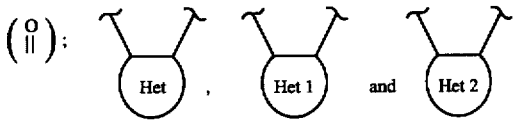

are the same or different and are independently selected from heteroaryl containing 5- or 6-ring members; and

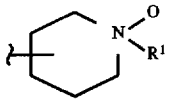

thereof; and pharmaceutically acceptable salts thereof;

with the provisos that where in the first formula X is $CH_2$, and $R^2$, $R^3$ and $R^4$ are each H, then $R^1$ will be other than 3,3-diphenylpropyl, and in the fifth formula, where one of $R^2$, $R^3$ and $R^4$ is 6-fluoro, and the others are H, $R^7$ will be other than 4-(2-methoxyphenyl).

The above compounds are inhibitors of microsomal triglyceride transfer protein (referred to hereinafter as MTP inhibitors) and as such are useful in decreasing serum lipids and in treating atherosclerosis.

DESCRIPTION OF THE INVENTION

In accordance with the present invention, a dialkoxy aryl aldehyde linker-resin is provided for use in carrying out solid phase syntheses, which dialkoxyaryl aldehyde linker-resin is formed of a resin suitable for use as a support for carrying out solid phase syntheses, and an aldehyde containing linker attached to the resin.

In a preferred embodiment of the present invention, the dialkoxyaryl aldehyde linker-resin has the structure I

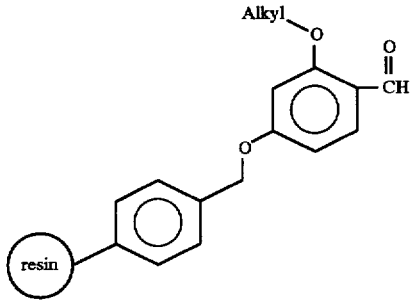

I where alkyl is preferably $CH_3$.

In addition, in accordance with the present invention, a method for preparing dialkoxyaryl aldehyde linker-resin I is provided, wherein an aldehyde of the structure II

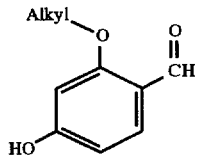

II is reacted with a resin III

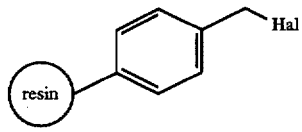

III where Hal is Cl, Br or I, in the presence of a base, such as NaH, lithium bistrimethylsilylamide, sodium bistrimethylsilylamide, potassium bistrimethylsilylamide or potassium hydride, to form aldehyde linker-resin I.

Furthermore, in accordance with the present invention, a method is provided for forming an amine linker-resin intermediate of the structure IV

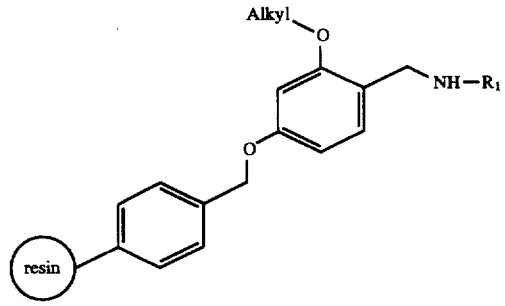

IV wherein $R_1$ is H, alkyl or aryl, which includes the steps of reacting the dialkoxyaryl aldehyde linker-resin I with an amine of the structure V V $H_2N$—$R_1$ (or its salt, such as propylamine, or aniline) optionally in the presence of a dehydrating agent such as trimethylorthoformate, molecular sieves or titanium isopropoxide, and treating the reaction with a reducing agent, such as sodium triacetoxyboro-hydride, sodium cyanoborohydride or sodium borohydride, and optionally in the presence of catalytic amounts of a weak organic acid, such as acetic acid, propionic acid or pivalic acid, to form the amine linker-resin intermediate IV.

Still further in accordance with the present invention, a method is provided for preparing a linker-resin intermediate of the structure VI

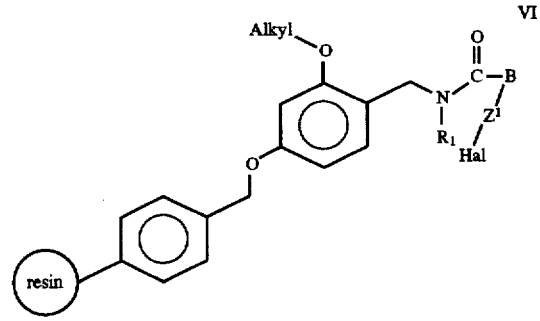

VI wherein $R_1$ and Hal are as defined above, $Z^1$ is alkylene, alkenylene or alkynylene of up to 10 carbons;

B is

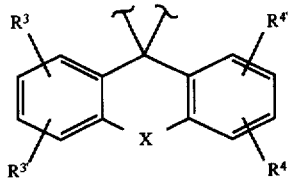

or

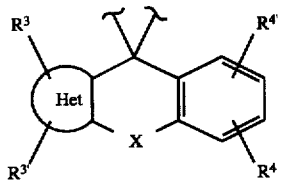

or

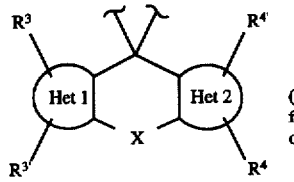

(B is also referred to as a fluorenyl-type ring or group); or

B is an indenyl-type group of the structure

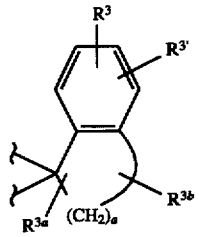

(a = 2,3 or 4)

or

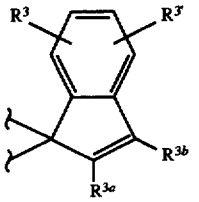

or

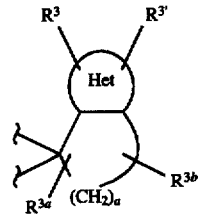

or

-continued

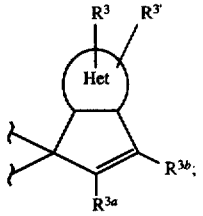

$R^3$, $R^{3'}$, $R^4$ and $R^{4'}$ may be the same or different and are independently selected from H, halogen, $CF_3$, haloalkyl, alkoxy, alkyl, aryl, alkenyl, alkenyloxy, alkynyl, alkynyloxy, alkanoyl, nitro, alkylthio, alkylsulfinyl, alkylsulfonyl, carboxy, alkoxycarbonyl, aminocarbonyl, alkylcarbonyloxy, alkylcarbonylamino, cycloheteroalkyl, cycloheteroalkylalkyl, cyano, Ar, Ar-alkyl, ArO, Ar-amino, Ar-thio, Ar-sulfinyl, Ar-sulfonyl, Ar-carbonyl, Ar-carbonyloxy or Ar-carbonylamino, wherein Ar is aryl or heteroaryl and Ar may optionally include 1, 2 or 3 additional rings fused to Ar;

$R^{3a}$ and $R^{3b}$ are the same or different and are independently any of the $R^3$ groups except hydroxy, nitro, amino or thio;

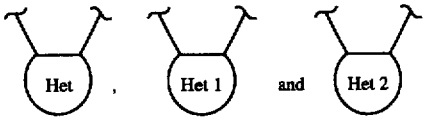

are the same or different and independently represent a 5 or 6 membered heteroaryl ring which may contain 1, 2, 3 or 4 heteroatoms in the ring which are independently N, S or O; and including N-oxides.

X (in the fluorenyl type ring) is a bond, or is one of the following groups:

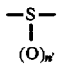

(1)

(2)

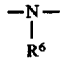

(3)

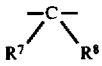

(4)

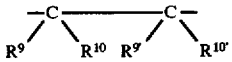

(5)

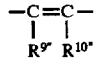

(6)

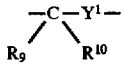

(7)

wherein $Y_1$ is O, N—$R^6$ or S;

n' is 0, 1 or 2;

$R^6$ is H, lower alkyl, aryl, —C(O)—$R^{11}$ or —C(O)—O—$R^{11}$;

$R^7$ and $R^8$ are the same or different and are independently H, alkyl, aryl, halogen, —O—$R^{12}$, or $R^7$ and $R^8$ together can be oxygen to form a ketone;

$R^9$, $R^{10}$, $R^{9'}$ and $R^{10'}$ are the same or different and are independently H, lower alkyl, aryl or —O—$R^{11}$;

$R^{9''}$ and $R^{10''}$ are the same or different and are independently H, lower alkyl, aryl, halogen or —O—$R^{11}$;

$R^{11}$ is alky or aryl;

$R^{12}$ is H, alkyl or aryl;

which includes the steps of (1) providing an amine linker-resin intermediate of the structure IV

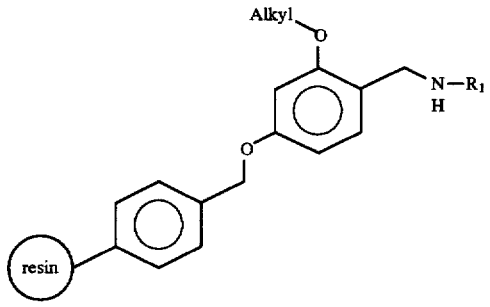

IV (2) treating the amine linker-resin intermediate with a halide of the structure VII

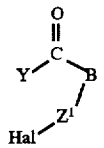

VII where Y is Halo such as Cl, Br or F;

Hal is Cl, Br or I;

$Z^1$ is as defined above in the presence of a base (such as triethylamine, diisopropylethylamine or pyridine), to form the linker-resin intermediate VI; or (2a) treating the amine linker-resin intermediate IV of step (1) with an acid VIII

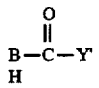

VIII (where Y' is OH) in the presence of a coupling agent, such as diisopropylcarbodiimide, dicyclohexylcarbodiimide, benzotriazole-1-yl-oxy-trispyrrolidino phosphonium hexafluorophosphate (PyBOP®) or 2-(1H-benzotriazole-1-yl)-1,1,3,3-tetramethyluranium hexafluorophosphate (HBTU), and an auxiliary nucleophile such as 1-hydroxy-7-azabenzotriazole, 1-hydroxybenzotriazole or dimethylaminopyridine, to form intermediate X

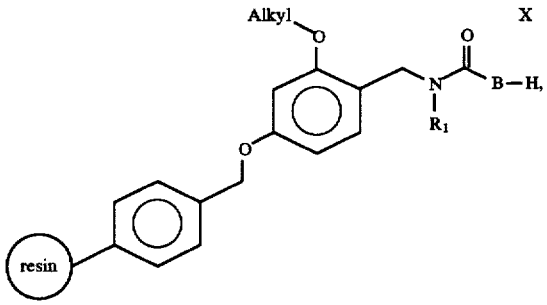

X and alkylating X by treating X with a dihaloalkane XI $Hal_1$—$Z^1$—$Hal_2$ XI where $Z^1$ is as defined above, and $Hal_1$ and $Hal_2$ are independently a halogen such as Cl, Br or I, in the presence of a base such as sodium bistrimethylsilyl amide, lithium bistrimethylsilyl amide, potassium bistrimethylsilyl amide or lithium diisopropylamide, to form linker-resin intermediate VI.

In yet another aspect of the present invention, a method is provided for preparing an MTP inhibitor of the structure XIII

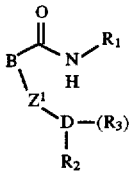

XIII where $R_1$, B and $Z^1$ are as defined above, and D is S, O or N, with the provisos that (1) when D is S or O, $R_3$ is not present, (2) when D is N, $R_2$ and $R_3$ are present, and (3) D, $R_2$ and $R_3$ may optionally form a ring

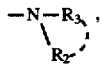

which is

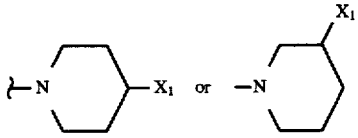

wherein $X_1$ is

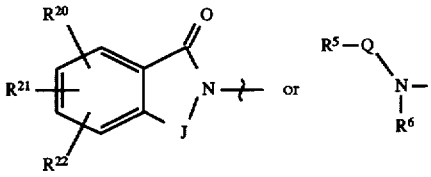

where $R^5$ is independently alkyl, alkenyl, alkynyl, aryl, alkoxy, aryloxy, arylalkoxy, heteroaryl, arylalkyl, heteroarylalkyl, cycloalkyl, cycloalkylalkyl, polycycloalkyl, polycycloalkylalkyl, cycloalkenyl, cycloheteroalkyl, heteroaryloxy, cycloalkenylalkyl, polycycloalkenyl, polycycloalkenylalkyl, heteroarylcarbonyl, arylamino, heteroarylamino, cycloalkyloxy, cycloalkylamino, all optionally substituted through available carbon atoms with 1, 2, 3 or 4 groups selected from hydrogen, halo, alkyl, haloalkyl, alkoxy, haloalkoxy, alkenyl, alkynyl, cycloalkyl, cycloalkylalkyl, cycloheteroalkyl, cycloheteroalkylalkyl, aryl, heteroaryl, arylalkyl, arylcycloalkyl, arylalkenyl, arylalkynyl, aryloxy, aryloxyalkyl, arylalkoxy, arylazo, heteroaryloxo, heteroarylalkyl, heteroarylalkenyl, heteroaryloxy, hydroxy, nitro, cyano, alkylthio, arylthio, heteroarylthio, arylthioalkyl, alkylcarbonyl, arylcarbonyl, arylaminocarbonyl, alkoxycarbonyl, aminocarbonyl, alkynylaminocarbonyl, alkylaminocarbonyl, alkenylaminocarbonyl, alkylcarbonyloxy, arylcarbonyloxy, alkylcarbonylamino, arylcarbonylamino, arylsulfinyl, arylsulfinylalkyl, arylsulfonyl, alkylsulfonyl, arylsulfonylamino, heteroarylcarbonylamino, heteroarylsulfinyl, heteroarylthio, heteroarylsulfonyl, alkylsulfinyl;

$R^6$ is hydrogen or $C_1$–$C_4$ alkyl or $C_1$–$C_4$ alkenyl; all optionally substituted with 1, 2, 3 or 4 groups which may independently be any of the substituents listed in the definition of $R^5$ set out above;

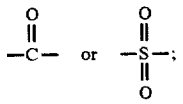

J is: $CHR^{23}$,

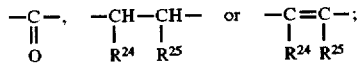

$R^{23}$, $R^{24}$ and $R^{25}$ are independently hydrogen, alkyl, alkenyl, alkynyl, aryl, arylalkyl, heteroaryl, heteroarylalkyl, cycloalkyl, or cycloalkylalkyl;

$R^{20}$, $R^{21}$, $R^{22}$ are independently hydrogen, halo, alkyl, alkenyl, alkoxy, aryloxy, aryl, arylalkyl, alkylmercapto, arylmercapto, cycloalkyl, cycloalkylalkyl, heteroaryl, heteroarylalkyl, hydroxy or haloalkyl; and these substituents may either be directly attached or attached via an alkylene chain at an open position.

$R_2$ and $R_3$ (when not part of a ring with D) are independently H, alkyl, aryl, heteroaryl, arylalkyl, heteroarylalkyl, cycloalkyl, cycloalkylalkyl, all optionally substituted through available carbon atoms with 1, 2, 3 or 4 groups selected from H, halogen, $CF_3$, haloalkyl, hydroxy, alkoxy, alkyl, aryl, alkenyl, alkenyloxy, alkynyl, alkynyloxy, alkanoyl, nitro, alkylthio, alkylsulfinyl, alkylsulfonyl, carboxy, alkoxycarbonyl, aminocarbonyl, alkylcarbonyloxy, alkylcarbonylamino, cycloheteroalkyl, cycloheteroalkylalkyl, cyano, Ar, Ar-alkyl, ArO, Ar-amino, Ar-thio, Ar-sulfinyl, Ar-sulfonyl, Ar-carbonyl, Ar-carbonyloxy or Ar-carbonylamino (wherein Ar is aryl or heteroaryl and Ar may optionally include 1, 2 or 3 additional rings fused to Ar), cycloalkylcarbonylamino, aryloxycarbonylamino, heteroaryloxycarbonylamino, uriedo (where the uriedo nitrogens may be substituted with alkyl, aryl or heteroaryl), cyclyloheteroalkylcarbonylamino (where the heterocycle is connected to the carbonyl group via a nitrogen or carbon atom), alkylsulfonylamino, arylsulfonylamino, heteroarylsulfonylamino,

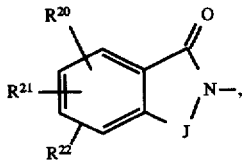

where J and $R^{20}$, $R^{21}$, $R^{22}$ are as defined above;

which method includes the steps of (a) providing a linker-resin intermediate of the structure VI

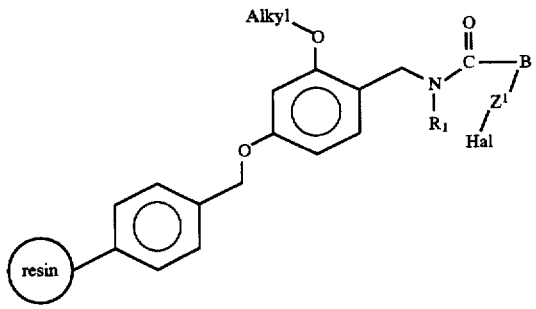

VI (b) where D in the compound XIII is S or O, reacting the linker-resin intermediate VI with a thiol or alcohol of the structure XIV $$HD—R_2 \qquad \text{XIV}$$

where D is S or O, in the presence of a base, such as sodium bistrimethylsilyl amide, lithium bistrimethylsilyl amide, potassium bistrimethylsilyl amide, sodium hydride, potassium hydride or potassium carbonate, to form the linker-resin thioether or ether XV

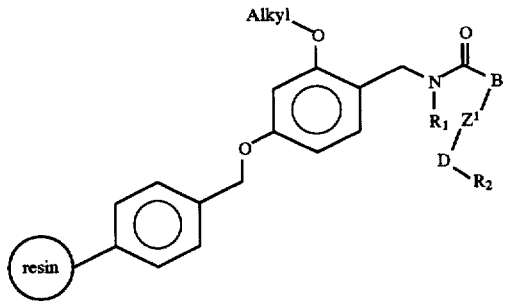

XV where D is S or O;

(c) where D is N, reacting the linker-resin intermediate VI with an amine XVI

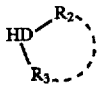

XVI in the presence of weak alkali base such as potassium carbonate or sodium carbonate, to form the linker-resin amine XV (where D is N), and (d) treating the linker-resin thioether, ether or amine XV with strong acid such as trifluoroacetic acid or hydrogen fluoride, optionally in the presence of anisole or thioanisole, to remove the resin and form the MTP inhibitor XIII.

In addition, MTP inhibitor compounds of the structure XIII'

XIII'

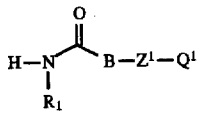

may be prepared according to the following reaction sequence:

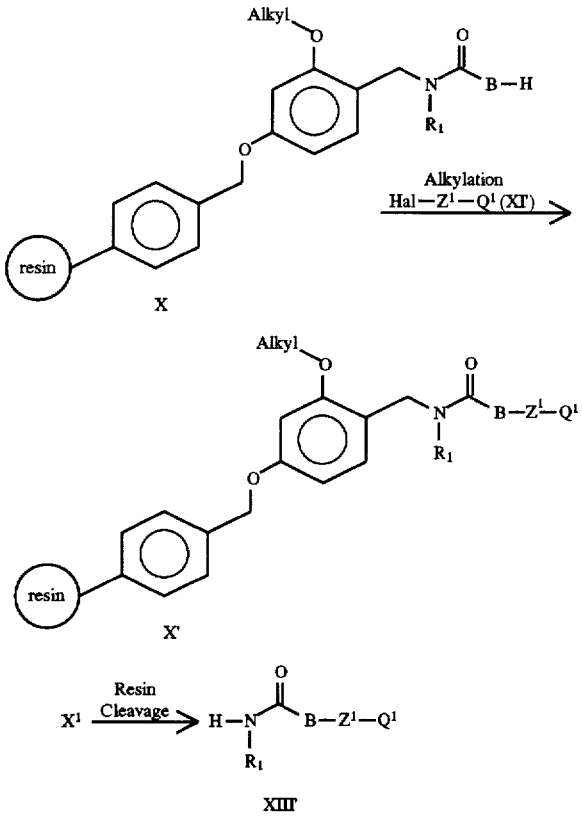

wherein $R_1$ and $Z^1$l are as defined above and $Q^1$ is alkyl, alkenyl, alkynyl, alkoxyl, (alkyl or aryl)$_3$Si (where each alkyl or aryl group is independent), cycloalkyl, cycloalkenyl, substituted alkylamino, substituted arylalkylamino, aryl, arylalkyl, arylamino, aryloxy, heteroaryl, heteroarylamino, heteroaryloxy, arylsulfonylamino, heteroarylsulfonylamino, arylthio, arylsulfinyl, arylsulfonyl, alkylthio, alkylsulfinyl, alkylsulfonyl, heteroarylthio, heteroarylsulfinyl, heteroarylsulfonyl, —PO($R^{13}$) ($R^{14}$), (where $R^{13}$ and $R^{14}$ are independently alkyl, aryl, alkoxy, aryloxy, heteroaryl, heteroarylalkyl, heteroaryloxy, heteroarylalkoxy, cycloheteroalkyl, cycloheteroalkylalkyl, cycloheteroalkoxy, or cycloheteroalkylalkoxy).

The $Q^1$ group may have from one to four substituents, which can be any of the $R^3$ groups or $Q^1$ groups, and any of the preferred $Q^1$ substituents set out below.

$Q^1$ may be substituted with the following preferred substituents: alkylcarbonylamino, cycloalkylcarbonylamino, arylcarbonylamino, heteroarylcarbonylamino, alkoxycarbonylamino, aryloxycarbonylamino, heteroaryloxylcarbonylamino, uriedo (where the uriedo nitrogens may be substituted with alkyl, aryl or heteroaryl), heterocyclylcarbonylamino (where the heterocycle is connected to the carbonyl group via a nitrogen or carbon atom), alkylsulfonylamino, arylsulfonylamino, heteroarylsulfonylamino,

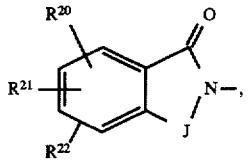

where J, $R^{20}$, $R^{21}$, and $R^{22}$ are as defined above.

The above alkylation may be carried out as described in alkylating X to form VI.

The resin cleavage may be carried out as in forming MTP inhibitor XIII.

DETAILED DESCRIPTION OF THE INVENTION

The following definitions apply to the terms as used throughout this specification, unless otherwise limited in specific instances.

The resin

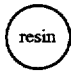

is preferably a polystyrene resin, and more preferably is a divinylbenzene cross-linked polystyrene resin employed in the form of beads. Other resins suitable for use herein include conventional resins known for use in solid phase syntheses such as a polyethylene glycol-polystyrene-based resin, polyethylene glycol or polypropylene glycol based resin, functionalized with a benzylhalide (as in III), so that the attachment with the linker aldehyde can be made. In addition, resin IIIA, which terminate in $CH_2OH$ (that is,

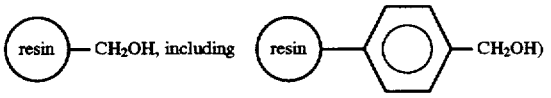

can be coupled to linker aldehyde II to provide

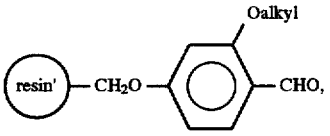

via the Mitsunobu reaction (e.g. $Ph_3P$, $C_2H_5O_2CN{=}N{-}CO_2C_2H_5$, THF, 25° C).

In addition to beads, the resin may be in the form of other solid support such as pellets, disks, capillaries, hollow fibers, needles, solid fibers, cellulose beads, pore-glass beads, silica gels, grafted co-poly beads, polyacrylamide beads, latex beads, dimethylacrylamide beads optionally cross-linked with N,N'-bis-acryloyl ethylene diamine, glass particles coated with a hydrophobic polymer, and the like.

The term "MTP" refers to a polypeptide or protein complex that (1) if obtained from an organism (e. g., cows, humans, etc.), can be isolated from the microsomal fraction of homogenized tissue; and (2) stimulates the transport of triglycerides, cholesterol esters, or phospholipids from synthetic phospholipid vesicles, membranes or lipoproteins to synthetic vesicles, membranes, or lipoproteins and which is distinct from the cholesterol ester transfer protein [Drayna et al., *Nature* 327, 632–634 (1987)] which may have similar catalytic properties.

The phrase "stabilizing" atherosclerosis as used in the present application refers to slowing down the development of and/or inhibiting the formation of new atherosclerotic lesions.

The phrase "causing the regression of" atherosclerosis as used in the present application refers to reducing and/or eliminating atherosclerotic lesions.

Unless otherwise indicated, the term "lower alkyl", "alkyl" or "alk" as employed herein alone or as part of another group includes both straight and branched chain hydrocarbons, containing 1 to 40 carbons, preferably 1 to 20 carbons, more preferably 1 to 12 carbons, in the normal chain, such as methyl, ethyl, propyl, isopropyl, butyl, t-butyl, isobutyl, pentyl, hexyl, isohexyl, heptyl, 4,4-dimethylpentyl, octyl, 2,2,4-trimethylpentyl, nonyl, decyl, undecyl, dodecyl, the various branched chain isomers thereof, and the like as well as such groups including 1 to 4 substituents which may be any of the $R^3$ groups, or the $R^1$ substituents set out herein.

Unless otherwise indicated, the term "cycloalkyl" as employed herein alone or as part of another group includes saturated or partially unsaturated (containing 1 or 2 double bonds) cyclic hydrocarbon groups containing 1 to 3 rings, including monocyclicalkyl, bicyclicalkyl and tricyclicalkyl, containing a total of 3 to 20 carbons forming the rings, preferably 4 to 12 carbons, forming the ring and which may be fused to 1 aromatic ring as described for aryl, which include cyclopropyl, cyclobutyl, cyclopentyl, cyclohexyl, cycloheptyl, cyclooctyl, cyclodecyl and cyclododecyl, cyclohexenyl,

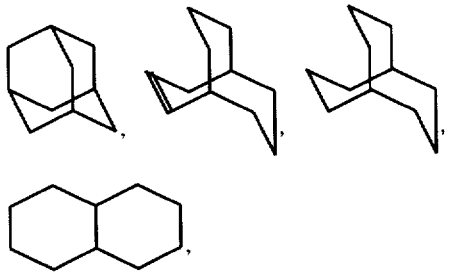

any of which groups may be optionally substituted with 1 to 4 substituents which may be any of the $R^3$ groups, or the $R^1$ substituents set out herein.

The term "cycloalkenyl" as employed herein alone or as part of another group refers to cyclic hydrocarbons containing 5 to 20 carbons, preferably 6 to 12 carbons and 1 or 2 double bonds. Exemplary cycloalkenyl groups include cyclopentenyl, cyclohexenyl, cycloheptenyl, cyclooctenyl, cyclohexadienyl, and cycloheptadienyl, which may be optionally substituted as defined for cycloalkyl.

The term "polycycloalkyl" as employed herein alone or as part of another group refers to a bridged multicyclic group containing 5 to 20 carbons and containing 0 to 3 bridges, preferably 6 to 12 carbons and 1 or 2 bridges. Exemplary polycycloalkyl groups include [3.3.0]-bicyclooctanyl, adamantanyl, [2.2.1]-bicycloheptanyl, [2.2.2]-bicyclooctanyl and the like and may be optionally substituted as defined for cycloalkyl.

The term "polycycloalkenyl" as employed herein alone or as part of another group refers to a bridged multicyclic group containing 5 to 20 carbons and containing 0 to 3 bridges and containing 1 or 2 double bonds, preferably 6 to 12 carbons and 1 or 2 bridges. Exemplary polycycloalkyl groups include [3.3.0]-bicyclooctenyl, [2.2.1]-bicycloheptenyl, [2.2.2]-bicyclooctenyl and the like and may be optionally substituted as defined for cycloalkyl.

The term "aryl" as employed herein alone or as part of another group refers to monocyclic and bicyclic aromatic groups containing 6 to 10 carbons in the ring portion (such as phenyl or naphthyl) and may optionally include one to three additional rings fused to Ar (such as aryl, cycloalkyl, heteroaryl or cycloheteroalkyl rings) and may be optionally substituted through available carbon atoms with 1, 2, or 3 groups selected from hydrogen, halo, haloalkyl, alkyl, haloalkyl, alkoxy, haloalkoxy, alkenyl, trifluoromethyl, trifluoromethoxy, alkynyl, cycloalkylalkyl, cycloheteroalkyl, cycloheteroalkylalkyl, aryl, heteroaryl, arylalkyl, aryloxy, aryloxyalkyl, arylalkoxy, arylthio, arylazo, heteroarylalkyl, heteroarylalkenyl, heteroarylheteroaryl, heteroaryloxy, hydroxy, nitro, cyano, amino, substituted amino wherein the amino includes 1 or 2 substituents (which are alkyl, aryl or any of the other aryl compounds mentioned in the definitions), thiol, alkylthio, arylthio, hetero-arylthio, arylthioalkyl, alkoxyarylthio, alkylcarbonyl, arylcarbonyl, alkylaminocarbonyl, arylaminocarbonyl, alkoxycarbonyl, aminocarbonyl, alkylcarbonyloxy, arylcarbonyloxy, alkylcarbonylamino, arylcarbonylamino, arylsulfinyl, arylsulfinylalkyl, arylsulfonylamino or arylsulfonaminocarbonyl or any of the $R^3$ groups, or the $R^1$ substituents set out herein:

The term "aralkyl", "aryl-alkyl" or "aryllower alkyl" as used herein alone or as part of another group refers to alkyl groups as discussed above having an aryl substituent, such as benzyl or phenethyl, or naphthylpropyl, or an aryl as defined above.

The term "lower alkoxy", "alkoxy", "aryloxy" or "aralkoxy" as employed herein alone or as part of another group includes any of the above alkyl, aralkyl or aryl groups linked to an oxygen atom.

The term "amino" as employed herein alone or as part of another group may optionally be substituted with one or two substituents such as alkyl, aryl, arylalkyl, heteroaryl, heteroarylalkyl, cycloheteroalkyl, cycloheteroalkylalkyl and/or cycloalkyl.

The term "lower alkylthio", alkylthio", "arylthio" or "aralkylthio" as employed herein alone or as part of another group includes any of the above alkyl, aralkyl or aryl groups linked to a sulfur atom.

The term "lower alkylamino", "alkylamino", "arylamino", or "arylalkylamino" as employed herein alone or as part of another group includes any of the above alkyl, aryl or arylalkyl groups linked to a nitrogen atom.

The term "acyl" as employed herein by itself or part of another group, as defined herein, refers to an organic radical linked to a carbonyl $$\left(\begin{matrix} O \\ \| \\ C \end{matrix}\right)$$

group; examples of acyl groups include alkanoyl, alkenoyl, aroyl, aralkanoyl, heteroaroyl, cycloalkanoyl, and the like.

The term "alkanoyl" as used herein alone or as part of another group refers to alkyl linked to a carbonyl group.

Unless otherwise indicated, the term "lower alkenyl" or "alkenyl" as used herein by itself or as part of another group refers to straight or branched chain radicals of 2 to 20 carbons, preferably 3 to 12 carbons, and more preferably 1 to 8 carbons in the normal chain, which include one to six double bonds in the normal chain, such as vinyl, 2-propenyl, 3-butenyl, 2-butenyl, 4-pentenyl, 3-pentenyl, 2-hexenyl, 3-hexenyl, 2-heptenyl, 3-heptenyl, 4-heptenyl, 3-octenyl, 3-nonenyl, 4-decenyl, 3-undecenyl, 4-dodecenyl, 4,8,12-tetradecatrienyl, and the like, and which may be optionally substituted with 1 to 4 substituents, namely, halogen, haloalkyl, alkyl, alkoxy, alkenyl, alkynyl, aryl, arylalkyl, cycloalkyl, amino, hydroxy, heteroaryl, cycloheteroalkyl, alkanoylamino, alkylamido, arylcarbonylamino, nitro, cyano, thiol, alkylthio or any of the $R^3$ groups, or the $R^1$ substituents set out herein.

Unless otherwise indicated, the term "lower alkynyl" or "alkynyl" as used herein by itself or as part of another group refers to straight or branched chain radicals of 2 to 20 carbons, preferably 2 to 12 carbons and more preferably 2 to 8 carbons in the normal chain, which include one triple bond in the normal chain, such as 2-propynyl, 3-butynyl, 2-butynyl, 4-pentynyl, 3-pentynyl, 2-hexynyl, 3-hexynyl, 2-heptynyl, 3-heptynyl, 4-heptynyl, 3-octynyl, 3-nonynyl, 4-decynyl,3-undecynyl, 4-dodecynyl and the like, and which may be optionally substituted with 1 to 4 substituents, namely, halogen, haloalkyl, alkyl, alkoxy, alkenyl, alkynyl, aryl, arylalkyl, cycloalkyl, amino, heteroaryl, cycloheteroalkyl, hydroxy, alkanoylamino, alkylamido, arylcarbonylamino, nitro, cyano, thiol, and/or alkylthio, or any of the $R^3$ groups, or the $R^1$ substituents set out herein.

The term "alkylene" as employed herein alone or as part of another group refers to alkyl groups as defined above having single bonds for attachment to other groups at two different carbon atoms and may optionally be substituted as defined above for "alkyl".

Ther terms "alkenylene" and "alkynylene" as employed herein alone or as part of another group refer to alkenyl groups as defined above and alkynyl groups as defined above, respectively, having single bonds for attachment at two different carbon atoms.

Suitable alkylene, alkenylene or alkynylene groups or $(CH_2)_m$, $(CH_2)_n$ or $(CH_2)_p$ (which may include alkylene, alkenylene or alkynylene groups) as defined herein, may optionally include 1, 2, or 3 substituents which include any of the $R^3$ groups, or the $R^1$ substituents set out herein.

Examples of alkylene, alkenylene and alkynylene include

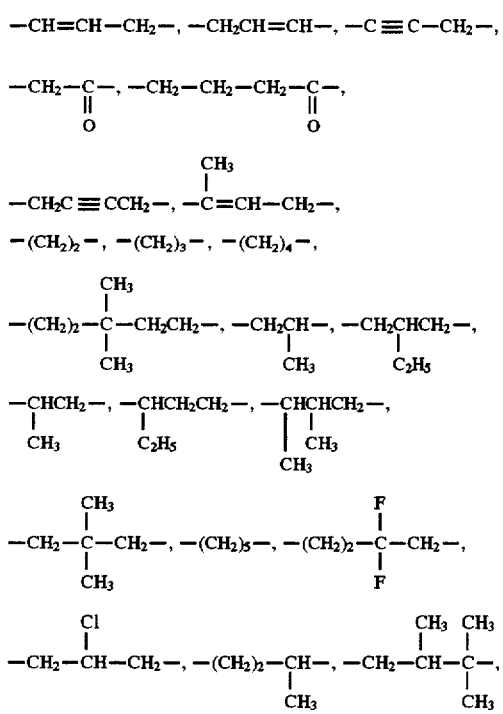

-continued

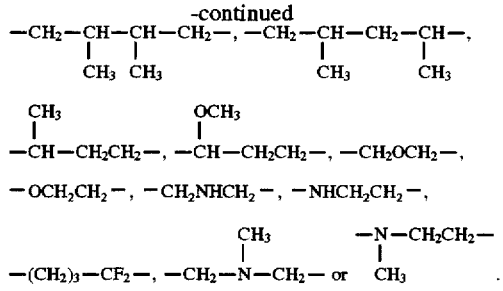

The term "halogen" or "halo" as used herein alone or as part of another group refers to chlorine, bromine, fluorine, and iodine as well as $CF_3$, with chlorine or fluorine being preferred.

The term "metal ion" refers to alkali metal ions such as sodium, potassium or lithium and alkaline earth metal ions such as magnesium and calcium, as well as zinc and aluminum.

The term "cycloheteroalkyl", as used herein alone or as part of another group refers to a 5-, 6- or 7-membered saturated or partially unsaturated ring which includes 1 to 2 hetero atoms such as nitrogen, oxygen and/or sulfur, linked through a carbon atom or a heteroatom, where possible, optionally via the linker $(CH_2)_p$ (which is defined above), such as

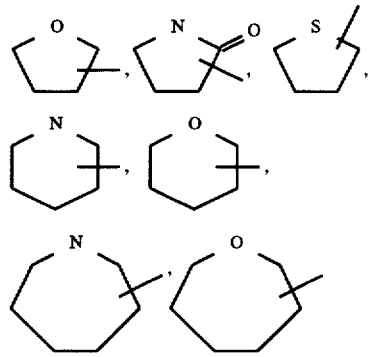

and the like. The above groups may include 1 to 4 substituents such as alkyl, halo, oxo and/or any of of the $R^3$ groups, or the $R^1$ substituents set out herein. In addition, any of the above rings can be fused to a cycloalkyl, aryl, heteroaryl or cycloheteroalkyl ring.

The term "heteroaryl" as used herein alone or as part of another group refers to a 5- or 6-membered aromatic ring which includes 1, 2, 3 or 4 hetero atoms such as nitrogen, oxygen or sulfur,and such rings fused to an aryl, cycloalkyl, heteroaryl or cycloheteroalkyl ring (all of which may be optionally substituted) (e.g. benzothiophenyl, indolyl), and includes possible N-oxides, such as

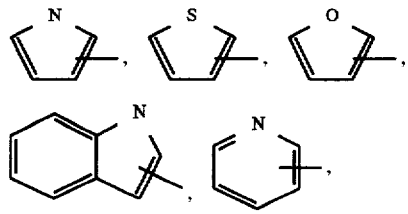

-continued

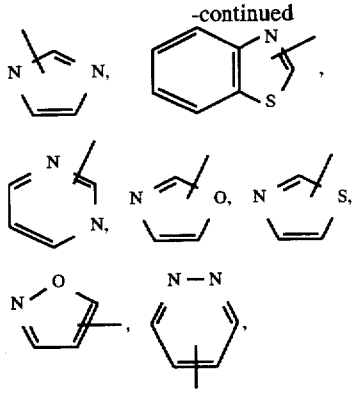

and the like.

Ar may be either aryl or heteroaryl as defined above.

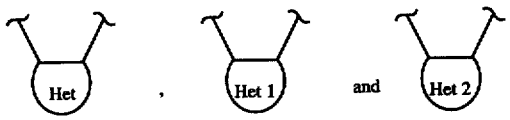

are the same or different, as defined hereinbefore, and are attached to the central ring of the indenyl or fluorenyl type group at adjacent positions (that is, ortho or 1,2-positions). Examples of such groups include

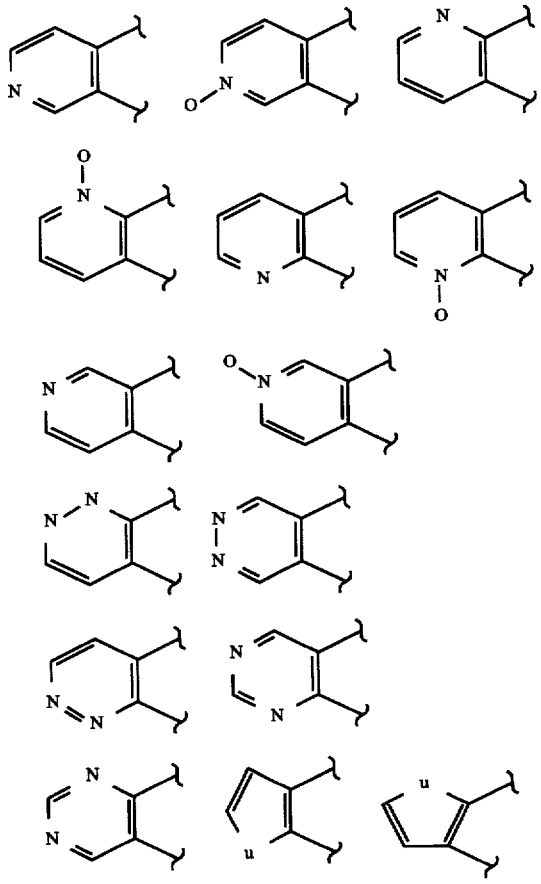

-continued

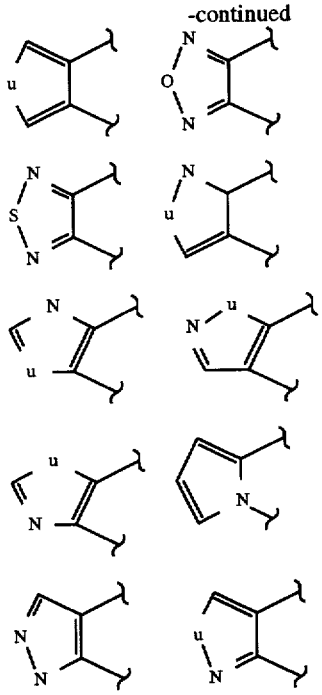

wherein u is selected from O, S, and $NR^{7a}$; $R^{7a}$ is H, lower alkyl, aryl, —C(O)$R^{7b}$, —C(O)O$R^{7b}$; $R^{7b}$ is alkyl or aryl.

The heteroaryl groups including the above groups may optionally include 1 to 4 substituents such as any of the $R^3$ groups, or the $R^1$ substituents set out herein. In addition, any of the above rings can be fused to a cycloalkyl, aryl, heteroaryl or cycloheteroalkyl ring.

The term cycloheteroalkylalkyl" as used herein alone or as part of another group refers to cycloheteroalkyl groups as defined above linked through a C atom or heteroatom to a $(CH_2)_p$ chain.

The term "heteroarylalkyl" or "heteroarylalkenyl" as used herein alone or as part of another group refers to a heteroaryl group as defined above linked through a C atom or heteroatom to a —$(CH_2)_p$-chain, alkylene or alkenylene as defined above.

The term "polyhaloalkyl" as used herein refers to an "alkyl" group as defined above which includes from 2 to 9, preferably from 2 to 5, halo substituents, such as F or Cl, preferably F, such as $CF_3CH_2$, $CF_3$ or $CF_3CF_2CH_2$.

Preferred MTP inhibitor compounds of formula I wherein A is NH,

B is

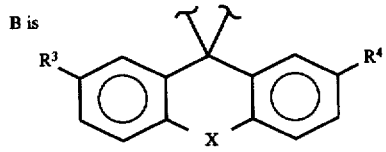

X is a bond, oxygen or sulfur; $R^3$ and $R^4$ are independently H or F.

In the reactions to follow, unless otherwise indicate, the moiety "B" in the starting materials, intermediates and final products, is set out as

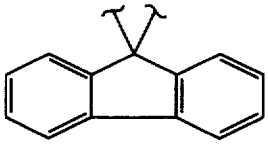

for purposes of illustration only.

It will be appreciated that the "B" moiety in the starting materials, intermediates and final products in all reactions set forth herein, unless indicated to the contrary may be any of the fluorenyl-type groups

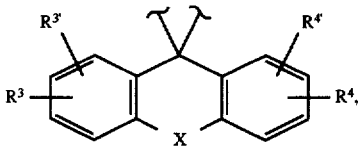

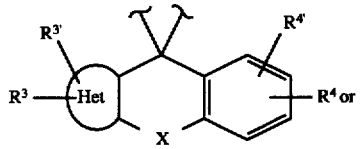

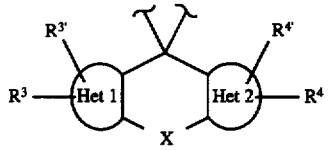

as well as any of the indenyl-type groups

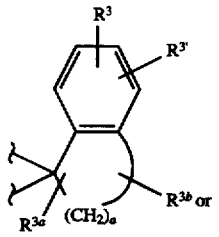

(a = 2,3 or 4)

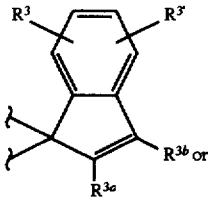

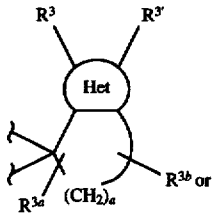

-continued

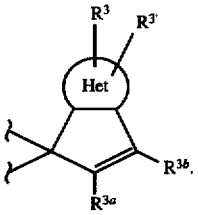

The above B moieties (including all fluorenyl-type groups and all indenyl-type groups) are collectively referred to as "fluorenyl-type" moieties. The use of the first fluorenyl-type group (as set out in the previous paragraph) in the following reaction schemes is for purposes of illustration only; any of the 3 fluorenyl groups or 4 indenyl groups as set out above may be employed in any of the reaction schemes set out herein in place of

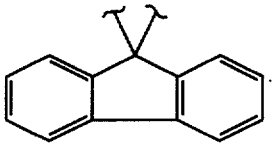

A detailed description of the methods of the invention is set out hereinafter.

SOLID PHASE SYNTHESES

Method for Preparing Aldehyde Linker-Resin I

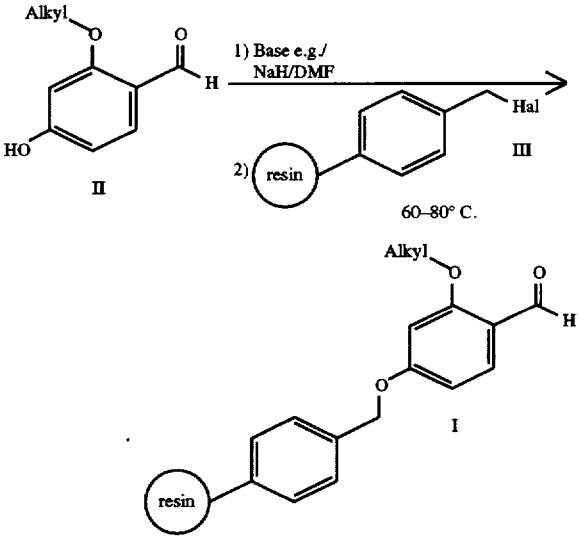

A solution of 4-hydroxy-2-alkoxybenzaldehyde II, such as 4-hydroxy-2-methoxybenzaldehyde, in an inert organic solvent such as dimethylformamide (DMF), dimethylacetamide or tetrahydrofuran is admixed with a suspension of base preferably, sodium hydride (preferably in mineral oil), lithium bistrimethyl-silyl amide or sodium bistrimethylsilyl amide, in an inert organic solvent such as any of the solvents for aldehyde II. Resin compound III, preferably beads of polystyrene cross-linked with divinylbenzene (preferably about 1%), is added and the reaction mixture heated at a temperature within the range from about 40° to about 90° C., preferably from about 60° to about 80° C., to form aldehyde linker-resin I.

In carrying out the above reaction, the aldehyde II will be employed in a molar ratio to resin compound III (based on benzylhalide resin portion) of within the range from about 10:1 to about 1.5:1, preferably from about 5:1 to about 2:1.

Method for Preparing Amine Linker-Resin IV and Linker-Resin Intermediate VI

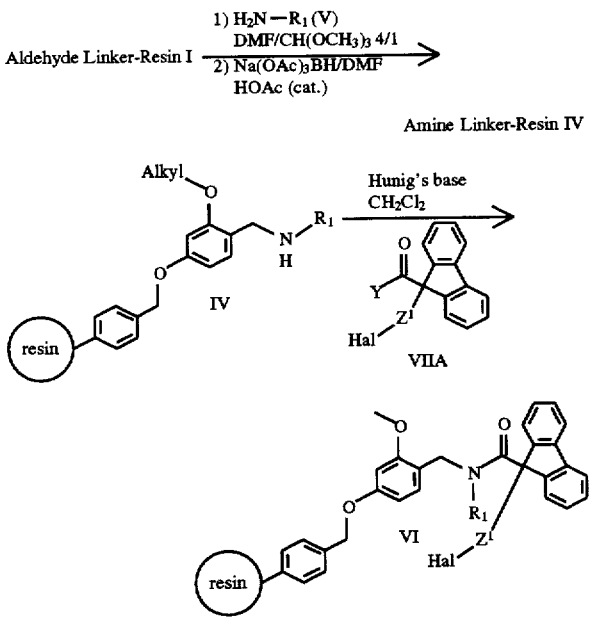

(Y is preferably Cl $Z^1$ is preferably $(CH_2)_n$ where n is 1 to 8, Hal is preferably Br)

Aldehyde linker-resin I is swollen by mixing with an inert organic solvent such as DMF, DMA or dichloroethane. After removal of solvent, a dehydrating agent, preferably trimethylorthoformate or molecular sieves is added followed by amine V ($H_2N—R_1$) or the hydrochloride thereof (from about 3.8 to about 10 mmol, 7–18 equivalents amine V per equivalent of aldehyde linker-resin I) as a solution in the solvent used for resin swelling.

Reducing agent such as sodium triacetoxyborohydride or sodium cyanoborohydride, and catalytic amounts of weak organic acid preferably acetic acid are added. Amine linker-resin IV is formed which is admixed with Hunig's base (diisopropylethyl amine), or triethylamine, pyridine or collidine and is treated with halide VIIA, which preferably is 9-(4-bromoalkyl)-9H-fluorene carboxylic acid chloride, to afford linker-resin intermediate VI.

In carrying out the above reaction, the halide VIIA will be employed in a molar ratio to amine linker-resin IV of within the range of from about 10:1 to about 1:1, preferably from about 4:1 to about 1.2:1.

Alternative Preparation of Linker-Resin Intermediate VI

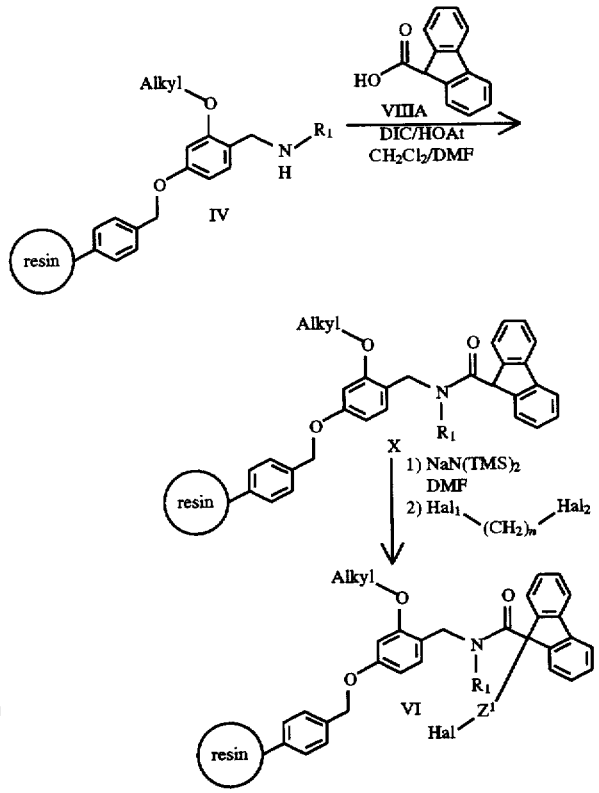

Amine linker-resin IV is swollen with methylene chloride or other inert organic solvent such as dichloroethane, DMF or dimethylacetamide (DMA). A solution of auxiliary nucleophilic, preferably 1-hydroxy-7-azabenzotriazole, and acid VIII, preferably 9-fluorenecarboxylic acid VIIIA, in DMF and methylene chloride, or other suitable organic solvent, is treated with coupling agent, preferably diisopropylcarbodiimide, and mixed with swollen amine linker-resin IV to form resin compound X.

The acid VIII (9-fluorenecarboxylic acid) will be employed in a molar ratio to amine linker resin IV within the range from about 10:1 to about 1.1:1, preferably from about 3:1 to about 1.5:1.

The resin compound X is swollen with a degassed solvent, preferably DMF, and treated with base, preferably sodium bis(trimethylsilyl)amide (molar ratio of base:X within the range from about 3:1 to about 1:1, preferably from about 1.5:1 to about 1.2:1) in a suitable degassed inert organic solvent such as tetrahydrofuran (THF), DMF or DMSO, under an inert atmosphere such as argon. After draining and rinsing, the resin compound X is suspended in a suitable degassed inert organic solvent such as DMF, DMSO or THF and is alkylated by treating with a dihaloalkane such as 1,3-dibromopropane, 1,4-dibromobutane or 1,5-dibromopentane, (molar ratio dihaloalkane:resin compound X within the range from about 10:1 to about 2:1, preferably from about 7:1 to about 3:1) to form the linker-resin intermediate VI.

The alkylation of X to X' (used in forming MTP inhibitor XIII') is carried out as described for alkylation of X to VI.

Method for Preparing Thioethers and Ethers or Amines

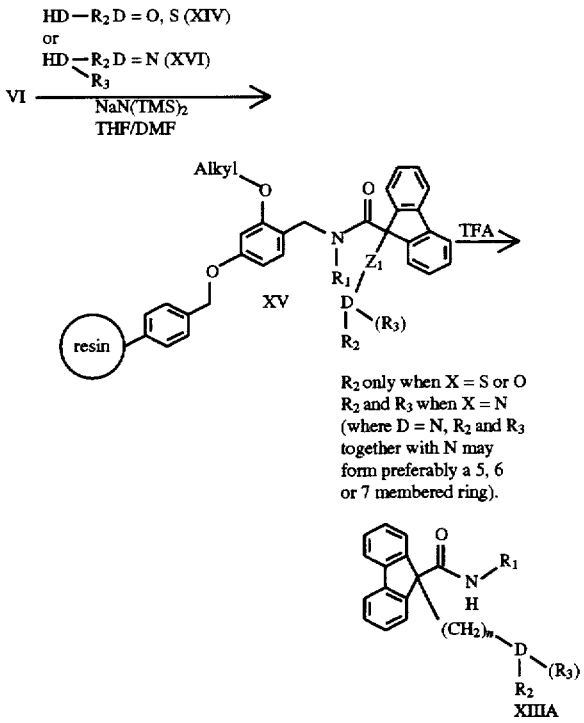

(1) Preparation of Thioether or Ether Intermediate

The linker-resin intermediate VI is swollen with inert organic solvent such as DMF, DMA or THF, and after removal of solvent, thiol or alcohol HD—$R_2$ (XIV) (molar ratio of HD—$R_2$:VI of from about 10:1 to about 1.5:1, preferably from about 5:1 to about 3:1) is added. Base such as lithium or potassium bistrimethylsilylamide, preferably, sodium bistrimethylsilylamide, is added to form resin XV where D is S or O.

(2) Preparation of Amine Intermediate

The amines are formed by swelling linker-resin intermediate VI with inert organic solvent (as described above) and after removal of solvent, amine

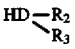

(XVI)

(molar ratio of amine XVI:VI within the range from about 10:1 to about 2:1, preferably from about 7:1 to about 3:1) and weak alkali base such as potassium carbonate or sodium carbonate are added to form resin XV where D is N.

(3) Preparation of Products XIII (and XIII')

The resin XV (or X') is treated with strong acid such as trifluoroacetic acid (TFA), hydrogen fluoride, preferably TFA, optionally in the presence of anisole or thioanisole, to remove the resin and form the product XIII (or XIII').

The following Examples represent preferred embodiments of the present invention.

EXAMPLE 1

9-[4-[(6-Ethoxy-2-benzothiazolyl)thio]butyl]-N-propyl-9H-fluorene-9-carboxamide

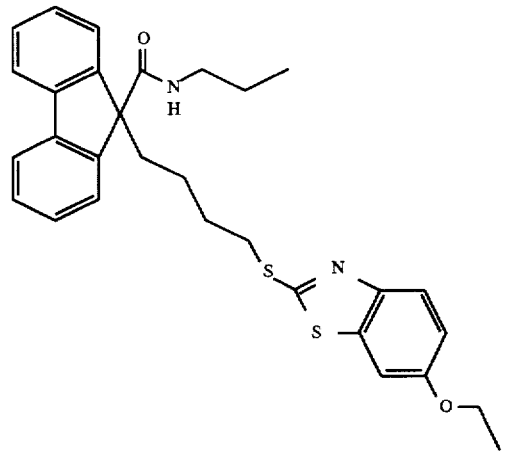

A.

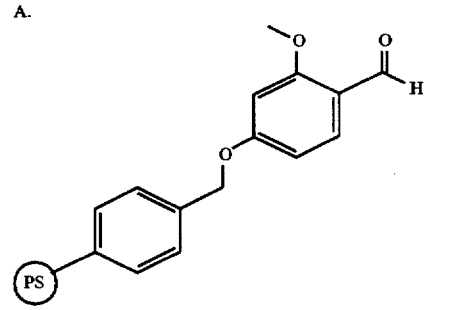

PS = 1% Divinylbenzene cross-linked polystyrene resin, 100–200 mesh

To a magnetically stirred suspension of 4.8 g (120 mmol, 10 eq) of sodium hydride (60% mineral oil dispersion) in 30 mL of dimethylformamide (DMF) at 0° C. was added a solution of 18.2 g (120 mmol, 10 eq) of 4-hydroxy-2-methoxybenzaldehyde in 50 mL of DMF dropwise over 75 min. The reaction was allowed to warm to room temperature (RT) and stirred for an additional 75 min. The stirbar was removed and 10 g (12 mmol, 1 eq) of Merrifield resin (loading of 1.2 mmol/g, Advanced Chemtech) was added. The flask was placed in a heating mantel mounted on a vortex mixer and heated at 70° C. (internal temperature) while vortexing for 26 h. The contents of the reaction vessel were transferred to a large filter funnel with a scintered-glass frit (porosity C) and rinsed sequentially with DMF (3×100 mL), 1:1 DMF:water (3×100 mL), water (2×100 mL) and MeOH (5×100 mL). The resin was dried under high vacuum (0.1 mm Hg) for 72 h to afford 11.16 g (98% of expected weight) of title product as a tacky non-freeflowing tan resin. The resin was characterized by gel-phase $^{13}$C—NMR and elemental analysis (chlorine and oxygen).

Elemental Analysis: Chlorine: Expected 0% Cl for 100% loading; found 0.21%. Starting Cl content of resin was 4.26%. Residual Cl consistent with 95% resin loading. Oxygen: Expected 5.76% for 100% loading; found 6.21%.

B.

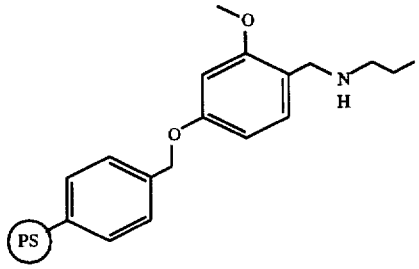

To a 25 mL Varian polypropylene tube fitted with a polyethylene frit and a luer stopcock was added 500 mg of Part A resin. The tube was sealed with a 19 mm Aldrich Suba septa and the resin was swollen in 5 mL of dry DMF, mixed by vortexing for 1 min and the DMF was removed using vacuum and $N_2$ pressure in order to maintain the vessel under inert atmosphere. Trimethyl orthoformate (1 mL) was added followed by 3.2 mL of DMF and 0.8 mL (10.0 mmol, 18 eq) of n-propylamine. The reaction mixture was vortexed for 18 h at room temperature. After removal of the reaction solution by nitrogen pressure and vacuum, 5 mL of a 200 mg/mL solution of sodium triacetoxyborohydride in DMF (1 g, 4.7 mmol, 8 eq) and 100 μL of acetic acid were added. The reaction mixture was vortexed for 8 h at room temperature. The reaction solution was removed and the resin was rinsed with DMF (4×5 mL), 1:1 DMF:water (2×5 mL), water (1×5 mL), DMF (3×5 mL) and dichloromethane ($CH_2Cl_2$) (4×5 mL). The last $CH_2Cl_2$ rinse was done with dry $CH_2Cl_2$ in the tube with the septa in place using nitrogen gas and vacuum to filter away the solvent and keep the reaction vessel under inert atmosphere. The title resin was used in the next step without characterization.

C.

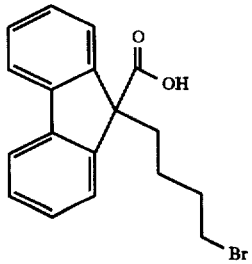

To a solution of 9-fluorenecarboxylic acid (50 g, 240 mmol) in THF (1200 mL) at 0° C. was added dropwise a solution of n-butyllithium (2.5M, 211 mL, 530 mmol) in THF. The yellow reaction was stirred at 0° C. for 1 h, then 1,4-dibromobutane (31.3 mL, 260 mmol) was added dropwise over 30 min. The reaction was stirred at 0° C. for 30 min, then the reaction was warmed to room temperature for 30 h. The reaction was extracted with water (3×750 mL). The combined aqueous layers were extracted with ethyl ether (800 mL). The aqueous layer was made acidic with HCl solution (1N, 500 mL), then extracted with dichloromethane (3×750 mL). The combined organic layers were dried over $MgSO_4$. Evaporation gave title compound (71 g, 85%) as a white solid.

D.

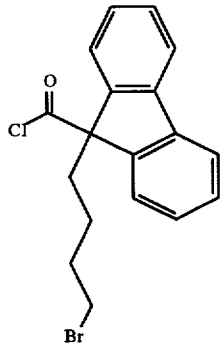

To 3.45 g (10 mmol, 1 eq) of Part C 9-(4-bromobutyl)-9H-fluorene carboxylic acid in 15 mL of $CH_2Cl_2$ was added 100 μL of DMF. The resulting solution was cooled to 0° C. and 7.5 mL (15 mmol, 1.5 eq) of a 2.0 M oxalyl chloride solution in $CH_2Cl_2$ was added. The bubbling reaction mixture was stirred at 0° C. for 15 min and then allowed to warm to room temperature. After 2 h, the reaction mixture was concentrated to afford the crude title acid chloride as a yellowish orange solid/oil mixture which was dissolved in $CH_2Cl_2$ and used without purification.

E.

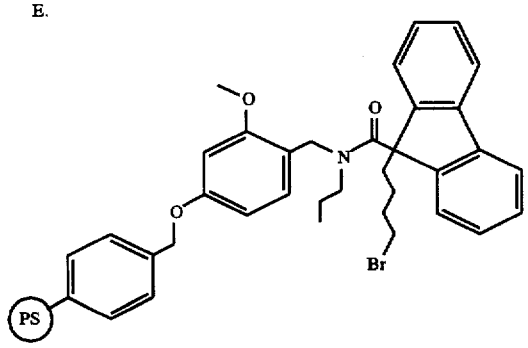

To the Part B resin in the polypropylene tube were added 1 mL of diisopropylethyl amine (5.7 mmol, 10 eq) and 1 mL of $CH_2Cl_2$ and the resulting mixture was mixed for 2 min. The tube was cooled to 0° C. in an ice bath and 4 mL (2.2 mmol, 4 eq) of a solution of Part D acid chloride in $CH_2Cl_2$ was added. The resulting orange reaction mixture was mixed by vortexing at room temperature for 19 h. and then rinsed with $CH_2Cl_2$ (4×5 mL) to afford title resin which was used in the next step without characterization.

F.

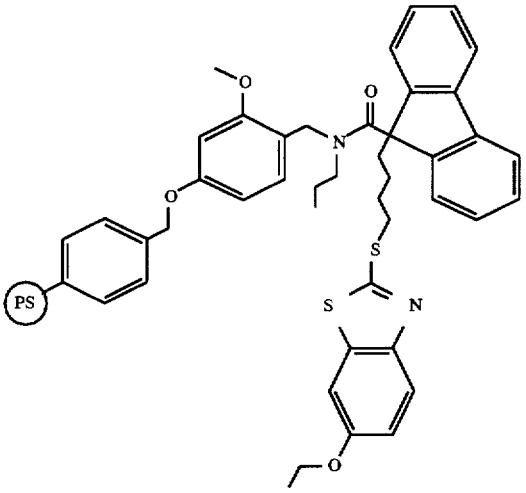

The Part E resin in the sealed polypropylene tube was swollen in 5 mL of dry DMF and vortexed for 2 min. The solvent was removed with $N_2$ and vacuum and a solution of 1.16 g (5.5 mmol, 10 eq) of 6-ethoxy-2-mercaptobenzothiazole in 4 mL of DMF was added to the resin followed by 5 mL (5 mmol, 9 eq) of a 1.0 M solution of sodium bistrimethylsilylamide in THF. Vortexing was initiated and the reaction mixture was mixed for 17 h at room temperature. The reaction solution was filtered away and the title resin was rinsed with DMF (4×5 mL), 1:1 DMF:water (2×5 mL), water (1×5 mL), DMF (3×5 mL) and dichloromethane ($CH_2Cl_2$) (4×5 mL).

G. 9-[4-[(6-Ethoxy-2-benzothiazolyl)thio]-butyl]-N-propyl-9H-fluorene-9-carboxamide The Part F resin was treated with 5 mL of 100% trifluoroacetic acid and vortexed for 90 min. The reaction solution was collected, the resin was rinsed with $CH_2Cl_2$ (3×1 ML) and the combined reaction solution and rinses were concentrated. The products from 3 parallel reactions were each redissolved in 15 mL of $CH_2Cl_2$, pooled and reconcentrated to afford 393 mg (46% crude) of an off-white solid. Recrystallization from MeOH afforded 339 mg (40%) of title compound as a white solid.

mp 112°–113.5° C. MS (electrospray, pos. ions): m/z 517 (M+H). Anal. Calcd for $C_{30}H_{32}N_2O_2S_2$: C, 69.73; H, 6.24; N, 5.42; S, 12.41 Found: C, 69.48; H, 6.22; N, 5.39; S, 12.25.

EXAMPLE 2

9-[4-[(4,5-Diphenyl-1H-imidazol-2-yl)thio]butyl]-N-[2-(4-methoxyphenyl)ethyl]-9H-fluorene-9-carboxamide

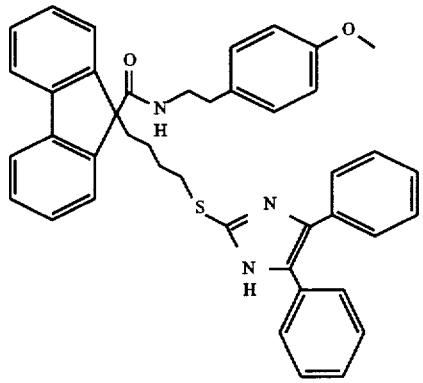

A.

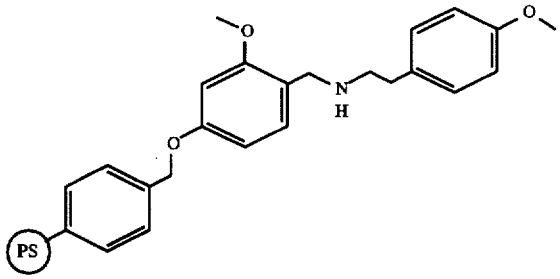

To a 25 mL Varian polypropylene tube fitted with a polyethylene frit and a luer stopcock was added 500 mg of Example 1 Part A resin. The tube was sealed with a 19 mm Aldrich Suba septa and the resin was swollen in 5 mL of dry DMF, mixed by vortexing for 1 min and the DMF was removed using vacuum and $N_2$ pressure in order to maintain the vessel under inert atmosphere. Trimethyl orthoformate (1 mL) was added followed by 2.6 mL of DMF and 1.46 mL (1.51 g, 10.0 mmol, 18 eq) of p-methoxyphenethylamine. The reaction mixture was vortexed for 18 h at RT. After removal of the reaction solution by nitrogen pressure and vacuum, 5 mL of a 200 mg/mL solution of sodium triacetoxyborohydride in DMF (1 g, 4.7 mmol, 8 eq) and 100 μL of acetic acid were added. The reaction mixture was vortexed for 8 h at room temperature. The reaction solution was removed and the resin was rinsed with DMF (4×5 mL), 1:1 DMF:water (2×5 mL), water (1×5 mL), DMF (3×5 mL) and dichloromethane ($CH_2Cl_2$) (4×5 mL). The last $CH_2Cl_2$ rinse was done with dry $CH_2Cl_2$ in the tube with the septa in place using nitrogen gas and vacuum to filter away the solvent and keep the reaction vessel under inert atmosphere. The title resin was used in the next step without characterization.

B.

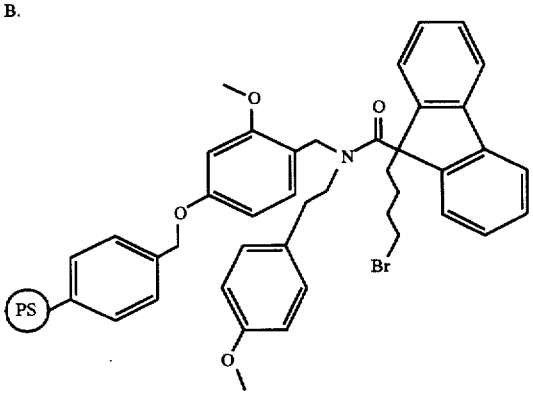

To the Part A resin in the polypropylene tube were added 1 mL of diisopropylethyl amine (5.7 mmol, 10 eq) and 1 mL of $CH_2Cl_2$ and the resulting mixture was mixed for 2 min. The tube was cooled to 0° C. in an ice bath and 4 mL (2.2 mmol, 4 eq) of a solution of Example 311 Part C acid chloride in $CH_2Cl_2$ was added. The resulting orange reaction mixture was mixed by vortexing at room temperature for 19 h and then rinsed with $CH_2Cl_2$ (4×5 mL) to afford title resin which was used in the next step without characterization.

C.

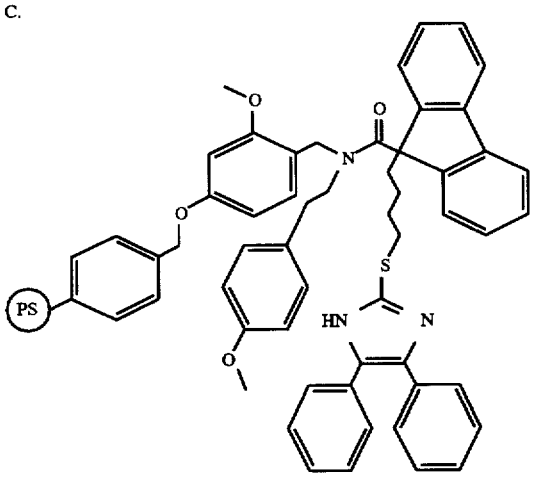

The Part B resin in the sealed polypropylene tube was swollen in 5 mL of dry DMF and vortexed for 2 min. The solvent was removed with $N_2$ and vacuum. To a suspension of 1.4 g (5.5 mmol, 10 eq) of 4,5-diphenyl-2-imidazolethiol in 5 mL of DMF was added 5 mL (5 mmol, 9 eq) of a 1.0 M solution of sodium bistrimethylsilylamide in THF. The resulting solution of thiolate anion was added to the resin, vortexing was initiated and the reaction mixture was mixed for 17 h at RT. The reaction solution was filtered away and the title resin was rinsed with DMF (4×5 mL), 1:1 DMF-:water (2×5 mL), water (1×5 mL), DMF (3×5 mL) and dichloromethane ($CH_2Cl_2$) (4×5 mL) and used in the next step without characterization.

D. 9-[4-[(4,5-Diphenyl-1H-imidazol-2-yl)-thio] butyl]-N-[2-(4-methoxyphenyl)ethyl]-9H-fluorene-9-carboxamide The Part C resin was treated with 5 mL of 100% trifluoroacetic acid and vortexed for 90 min. The reaction solution was collected, the resin was rinsed with $CH_2Cl_2$ (3×1 mL) and the combined reaction solution and rinses were concentrated. The products from 3 parallel reactions were each redissolved in 15 mL of $CH_2Cl_2$, pooled and reconcentrated to afford 729 mg (68% crude) of a yellow oil. Flash chromatography on silica gel (50 g) eluted with 2% MeOH in $CH_2Cl_2$ (1 L), followed by 5% MeOH in $CH_2Cl_2$ (1 L) afforded 208 mg (19%) of title compound as a white foam.

MS(electrospray, pos. ions): m/z 650 (M+H). Anal. Calc'd for $C_{42}H_{39}N_3O_2S$+0.63 $CH_2Cl_2$: C, 71.72; H, 5.59; N, 5.97; S, 4.56 Found: C, 71.96; H, 5.64; N, 5.94; S, 4.76.

EXAMPLE 3

9-[4-(2-Thiazolylthio)butyl]-N-(2,2,2-trifluoroethyl)-9H-fluorene-9-carboxamide

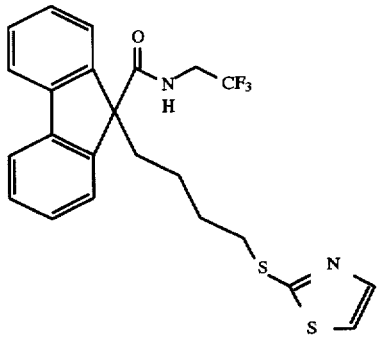

A.

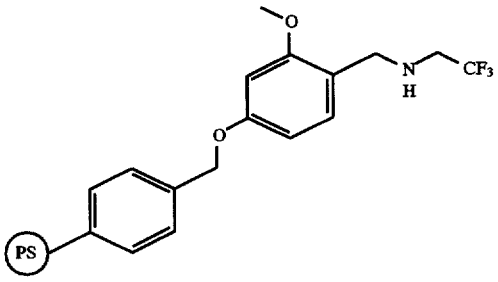

To a 25 mL Varian polypropylene tube fitted with a polyethylene frit and a luer stopcock was added 500 mg of Example 1 Part A resin. The tube was sealed with a 19 mm Aldrich Suba septa and the resin was swollen in 5 mL of dry DMF, mixed by vortexing for 1 min and the DMF was removed using vacuum and $N_2$ pressure in order to maintain the vessel under inert atmosphere. Trimethyl orthoformate (1 mL) was added followed by 3.2 mL of DMF and 796 μL (991 mg, 10.0 mmol, 18 eq) of 2,2,2-trifluoroethylamine. The reaction mixture was vortexed for 18 h at room temperature. After removal of the reaction solution by nitrogen pressure and vacuum, 5 mL of a 200 mg/mL solution of sodium triacetoxyboro-hydride in DMF (1 g, 4.7 mmol, 8 eq) and 100 μL of acetic acid were added. The reaction mixture was vortexed for 8 h at room temperature. The reaction solution was removed and the resin was rinsed with DMF (4×5 mL), 1:1 DMF:water (2×5 mL), water (1×5 mL), DMF (3×5 mL) and dichloromethane ($CH_2Cl_2$) (4×5 mL). The last $CH_2Cl_2$ rinse was done with dry $CH_2Cl_2$ in the tube with the septa in place using nitrogen gas and vacuum to filter away the solvent and keep the reaction vessel under inert atmosphere. The title resin was used in the next step without characterization.

B.

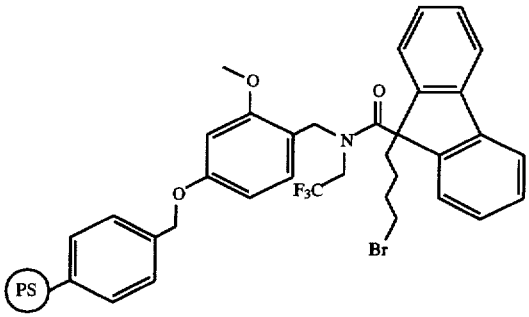

To the Part A resin in the polypropylene tube were added 1 mL of diisopropylethyl amine (5.7 mmol, 10 eq) and 1 mL of $CH_2Cl_2$ and the resulting mixture was mixed for 2 min. The tube was cooled to 0° C. in an ice bath and 4 mL (2.2 mmol, 4 eq) of a solution of Example 1 Part D acid chloride in $CH_2Cl_2$ was added. The resulting orange reaction mixture was mixed by vortexing at RT for 19 h. and then rinsed with $CH_2Cl_2$ (4×5 mL) to afford title resin which was used in the next step without characterization.

C.

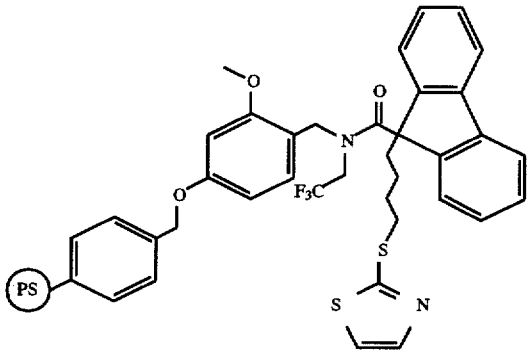

The Part B resin in the sealed polypropylene tube was swollen in 5 mL of dry DMF and vortexed for 2 min. The solvent was removed with $N_2$ and vacuum and a solution of 644 mg (5.5 mmol, 10 eq) of 2-mercaptothiazole in 4 mL of DMF was added to the resin followed by 5 mL (5 mmol, 9 eq) of a 1.0 M solution of sodium bistrimethylsilylamide in THF. Vortexing was initiated and the reaction mixture was mixed for 17 h at RT. The reaction solution was filtered away and the title resin was rinsed with DMF (4×5 mL), 1:1 DMF:water (2×5 mL), water (1×5 mL), DMF (3×5 mL) and dichloromethane ($CH_2Cl_2$) (4×5 mL).

D. 9-[4-(2-Thiazolylthio)butyl]-N-(2,2,2-trifluoroethyl)-9H-fluorene-9-carboxamide The Part C resin was treated with 5 mL of 100% trifluoroacetic acid and vortexed for 90 min. The reaction solution was collected, the resin was rinsed with $CH_2Cl_2$ (3×1 mL) and the combined reaction solution and rinses were concentrated. The products from 3 parallel reactions were each redissolved in 15 mL of $CH_2Cl_2$, pooled and reconcentrated to afford 395 mg (52% crude) of an off-white solid. Recrystallization from MeOH afforded 342 mg (45%) of title compound as a white solid.

mp 143°–144° C. MS(electrospray, pos. ions): m/z 463 (M+H). Anal. Calcd for $C_{23}H_{21}N_2O_2S_2F_3$: C, 59.72; H, 4.58; N, 6.06; S, 13.86 Found: C, 59.65; H, 4.58; N, 6.01; S, 13.64.

EXAMPLE 4

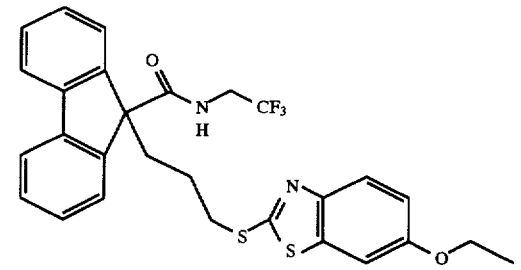

A

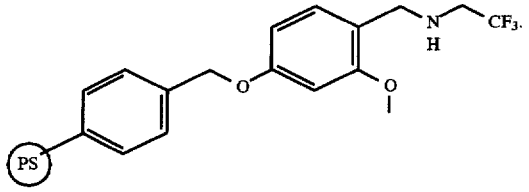

Example 1 Part A resin (250 mg, 0.3 mmol) was swollen in 3.0 mL of dimethylformamide (DMF). The solvent was drained, and 406 mg (3.0 mmol, 10 eq) of trifluoroethylamine, 261 μL (1.5 mmol, 5 eq) of diisopropylethylamine, 0.5 mL of trimethylorthoformate and 1.8 mL of DMF were added. The reaction mixture was shaken on a vortex mixer for 3.5 hours. The reaction solution was drained and 2.5 mL of a 200 mg/mL solution of sodium triacetoxyborohydride (500 mg) and 100 μL of acetic acid were added. The mixture was shaken for 16 hours. The resin was rinsed with 3×3 mL of the following: DMF, 1:1 DMF:$H_2O$, $H_2O$, DMF, followed by 5×3 mL each of $CH_2Cl_2$ and $CH_3OH$. The resin was dried under vacuum to provide 262 mg of title resin compound as a white resin.

B

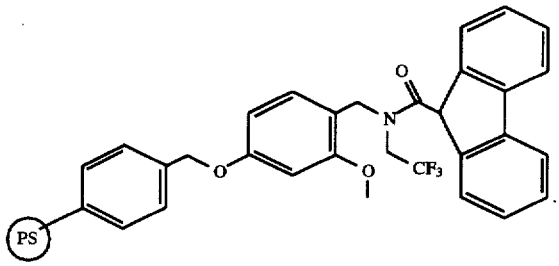

The Part A resin (262 mg, 0.3 mmol) was swollen in 3.0 mL of methylene chloride. A solution of 204 mg of 1-hydroxy-7-azabenzotriazole (1.5 mmol, 5 eq) and 315 mg of 9-fluorenecarboxylic acid (1.5 mmol, 5 eq) in 1.0 mL of DMF and 2.0 mL of methylene chloride was treated with 235 μL of diisopropylcarbodiimide (1.5 mmol, 5 eq). The resin was drained, the reagent solution was added and the mixture was shaken for 17 hours. The reaction solution was drained and rinsed with 3×3 mL of the following: DMF, 1:1 DMF:$H_2O$, $H_2O$, DMF, followed by 5×3 mL each of $CH_2Cl_2$ and $CH_3OH$. The resin was dried under vacuum to provide 356 mg of title resin compound as a yellow resin.

C

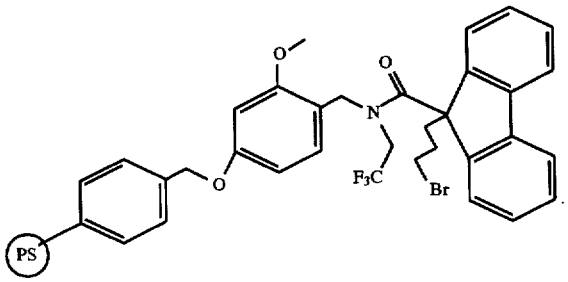

The Part B resin (323 mg, 0.27 mmol) was swollen in 3.0 mL of DMF (new Sure-Seal) and then drained under an atmosphere of argon. DMF (2.5 mL) was added, followed by the dropwise addition of 324 μL (3.2 mmol, 1.2 eq) of a 1.0 M solution of sodium bis(trimethylsilyl)amide in tetrahydrofuran (THF). The reaction mixture was shaken under argon for two hours. The reaction solution was drained and the resin was rinsed with 6×3 mL of DMF maintaining an argon atmosphere. The resin was suspended in 2.5 mL of DMF and 137 μL of 1,3 dibromopropane (1.35 mmol, 5 eq) was added. The mixture was shaken for 4 hours. The reaction solution was drained and the resin was rinsed with 3×3 mL of the following: DMF, 1:1 DMF:$H_2O$, $H_2O$, followed by 4×3 mL of DMF to provide title resin compound, used as is in the next step.

D

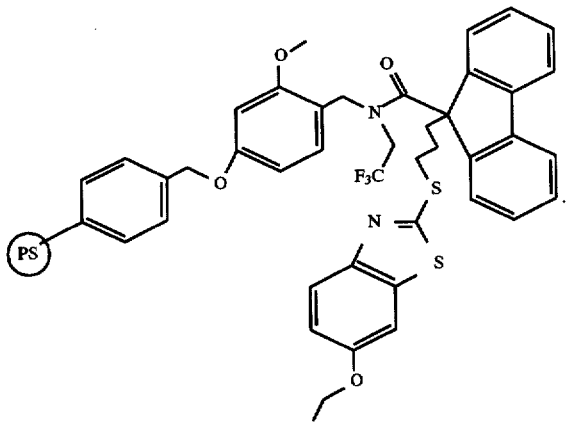

The Part C resin (0.27 mmol) was swollen in 3.0 mL of DMF. The solvent was drained and a solution of 570 mg of 6-ethoxy-2-mercaptobenzothiazole (2.7 mmol, 10 eq) in 3.0 mL of DMF was added, followed by the dropwise addition of 2.7 mL (2.7 mmol, 10 eq) of a 1.0 M solution of sodium bis(trimethylsilyl)amide in THF. After the addition was completed, the mixture was shaken for 14 hours. The resin was rinsed with 3×3 mL of the following: DMF, 1:1 DMF:$H_2O$, $H_2O$, DMF, followed by 8×3 mL of $CH_2Cl_2$ to provide title resin compound, used as is in the next step.

E

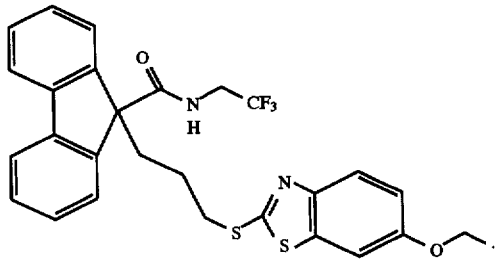

The Part D resin (0.27 mmol) was treated with 3.0 mL of trifluoroacetic acid for 90 minutes and then rinsed with methylene chloride, and the solutions were concentrated to provide 86 mg (58%) of a brown solid. This solid was combined with another batch of product prepared by the same route and purified by flash chromatography on silica gel (50 g) packed, loaded, and eluted with 25% hexane in methylene chloride followed by 100% methylene chloride. The 100% methylene chloride fractions were concentrated to provide 198 mg of title compound an off-white foam.

MS (ESI, +ions): m/z 543 (M+H). Analysis Calcd. for $C_{28}H_{25}N_2O_2S_2F_3$: C, 61.98; H, 4.64; N, 5.16; S, 11.82; F, 10.50 Found: C, 61.90; H, 4.72; N, 5.06; S, 12.09; F, 10.23.

EXAMPLE 5

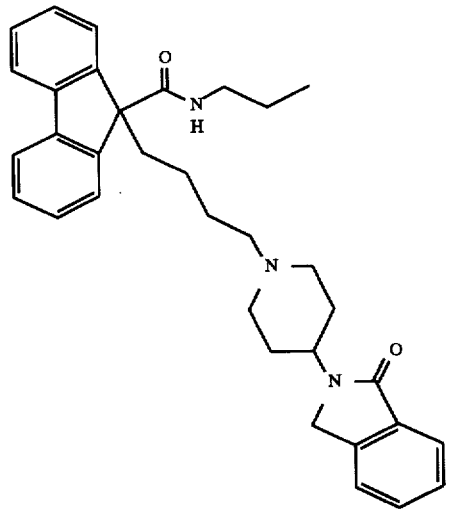

A

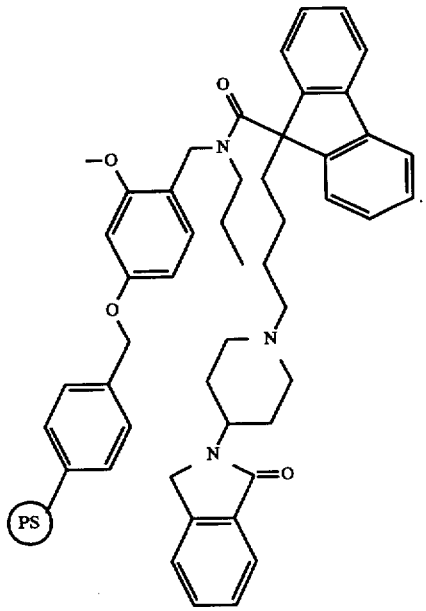

Example 1 Part E resin (231 mg) in a sealed polypropylene tube was swollen in 5 mL of dry DMF and vortexed for 2 min. The solvent was removed and 3 mL of dry DMF was added followed by 1.2 mmol (5 eq) of

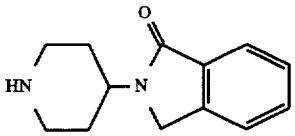

and 133 mg of $K_2CO_3$. Vortexing was initiated and the reaction mixture was mixed for 17 h at 75° C. The reaction solution was filtered away and the resin was rinsed with 1:1 DMF:water (2×5 mL), water (1×5 mL), DMF (3×5 mL) and $CH_2Cl_2$ (3×5 mL) to afford title resin compound which was used in the next step without characterization.

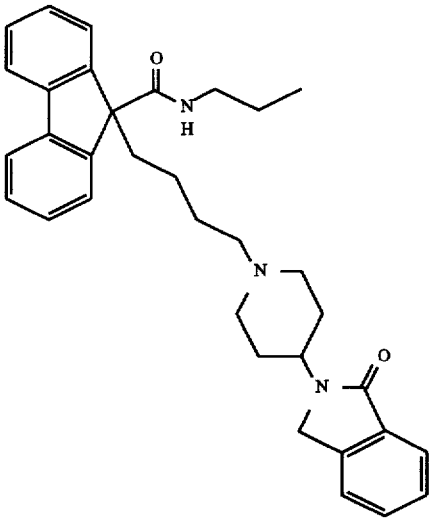

The Part A resin compound was treated with 5 mL of 100% trifluoroacetic acid and vortexed for 90 min. The reaction solution was collected, the resin was rinsed with $CH_2Cl_2$ (3×1 mL) and the combined reaction solution and rinses were concentrated to afford 97 mg of title compound.

MS (electrospray, pos. ions) 522 (M+H).

Additional compounds which may be prepared employing solid phase synthesis techniques as described in Examples 1 to 5 are disclosed in U.S. application Ser. No. 60/010,346 filed Jan. 16, 1996, and U.S. application Ser. No. 472,067 filed June 6, 1995, examples of which are set out below.

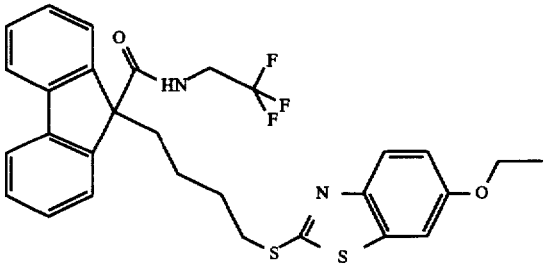

m/z 557 (M + H)

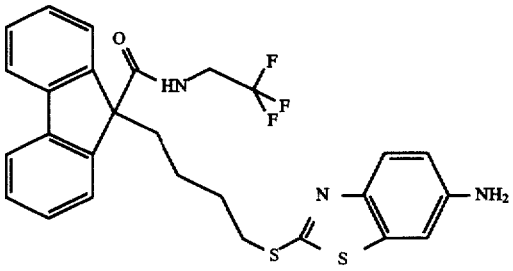

m/z 528 (M + H)

-continued
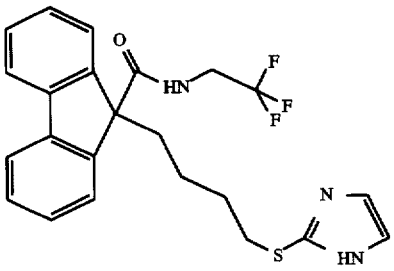
m/z 446 (M + H)
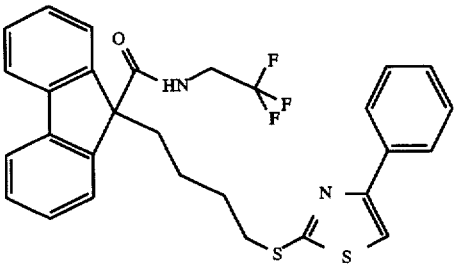
m/z 539 (M + H)
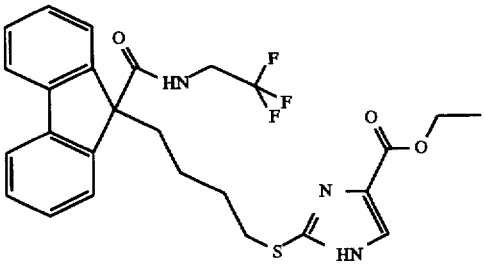
m/z 518 (M + H)
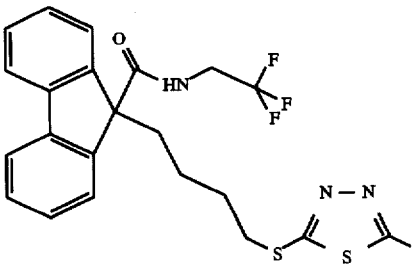
m/z 478 (M + H)
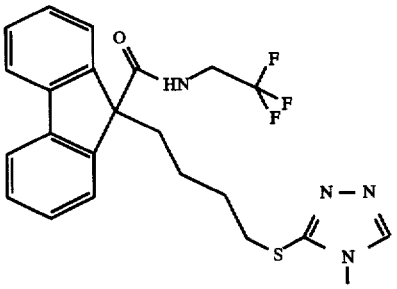
m/z 461 (M + H)

-continued
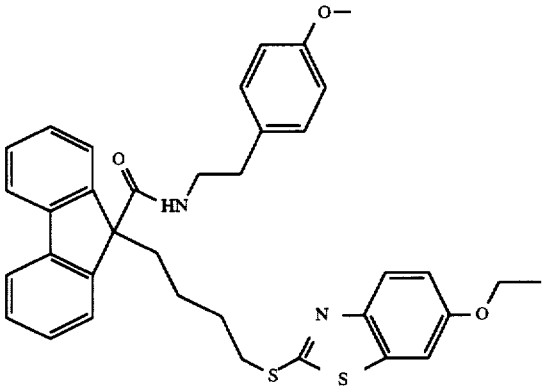
m/z 609 (M + H)
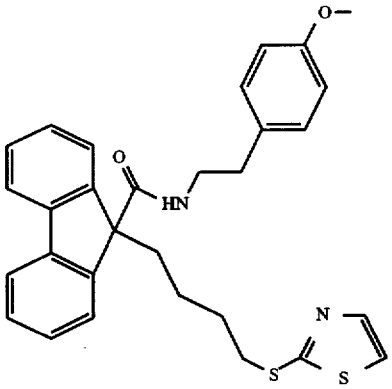
m/z 515 (M + H)
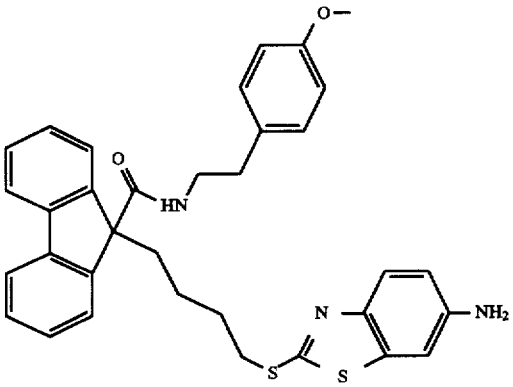
m/z 580 (M + H)
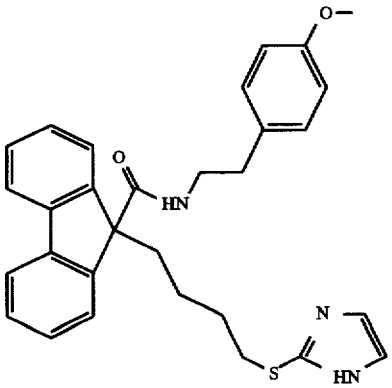
m/z 498 (M + H)

-continued
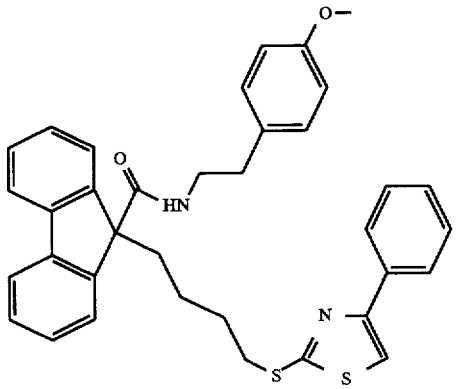
m/z 591 (M + H)
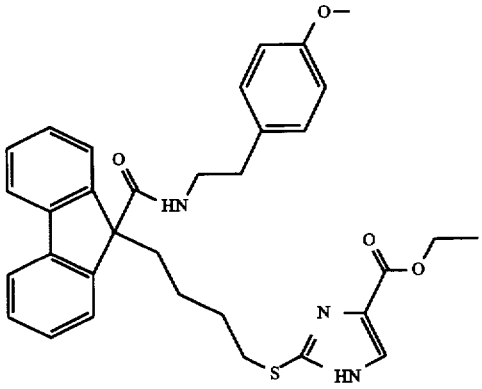
m/z 570 (M + H)
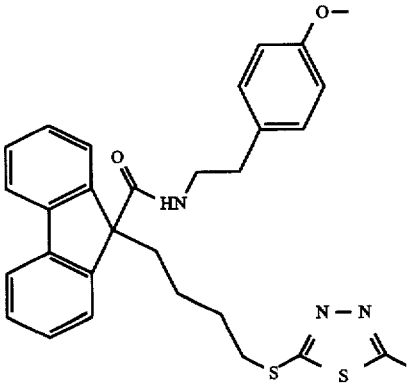
m/z 530 (M + H)
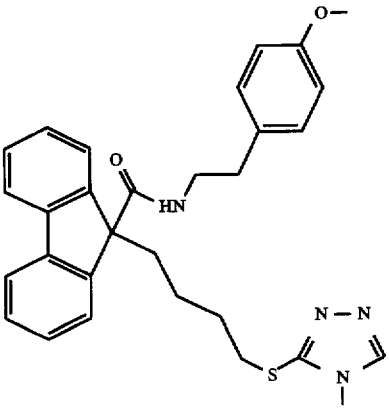
m/z 513 (M + H)

-continued
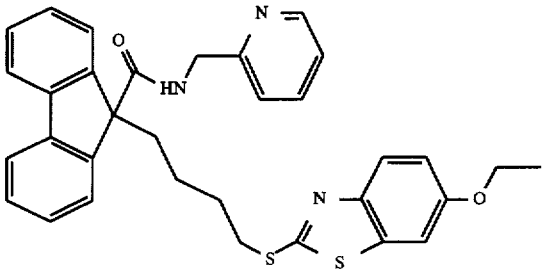
m/z 566 (M + H)
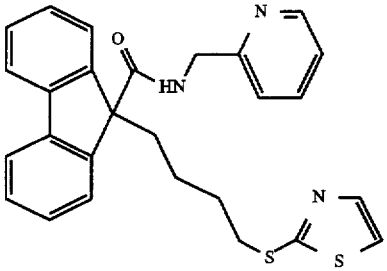
m/z 472 (M + H)
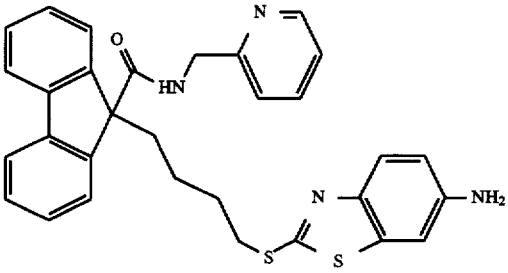
m/z 537 (M + H)
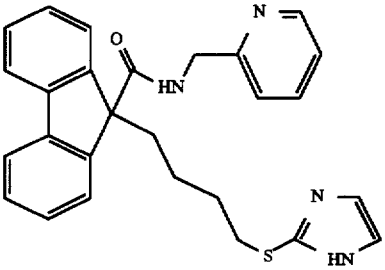
m/z 455 (M + H)
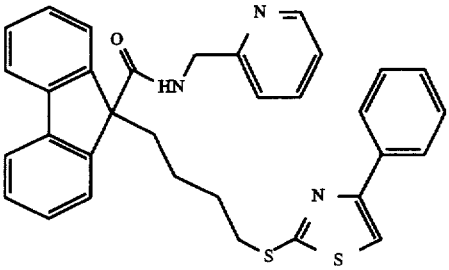
m/z 548 (M + H)
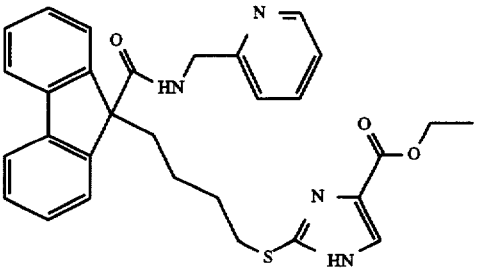
m/z 527 (M + H)

-continued
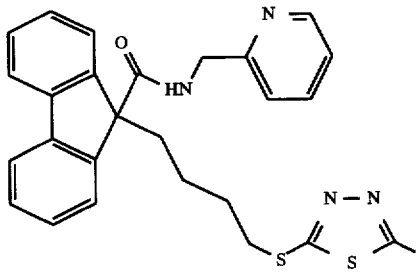
m/z 487 (M + H)
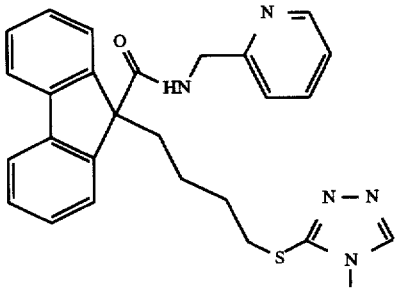
m/z 470 (M + H)
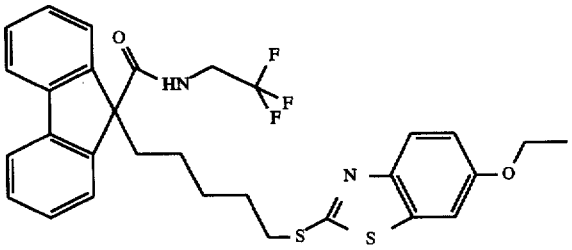
m/z 571 (M + H)
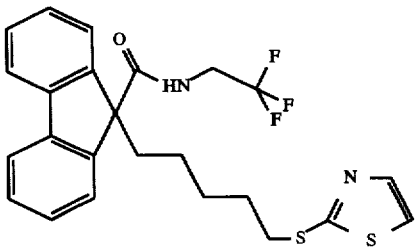
m/z 477 (M + H)
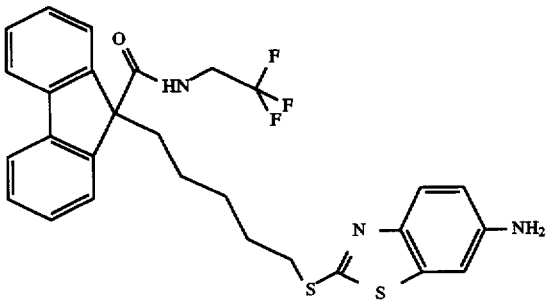
m/z 542 (M + H)

-continued
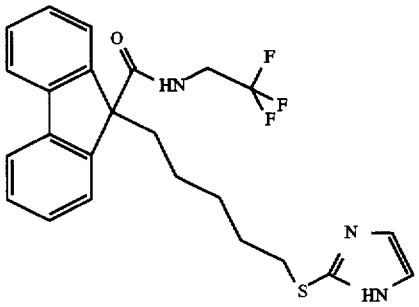
m/z 460 (M + H)
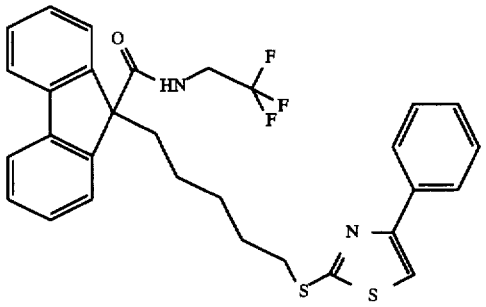
m/z 553 (M + H)
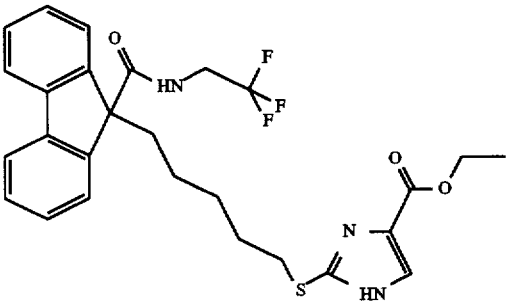
m/z 532 (M + H)
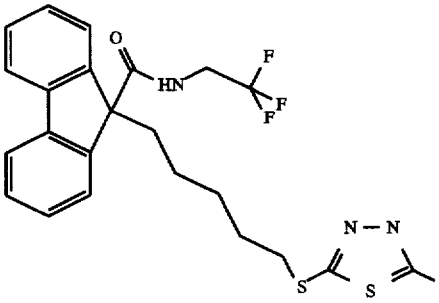
m/z 492 (M + H)
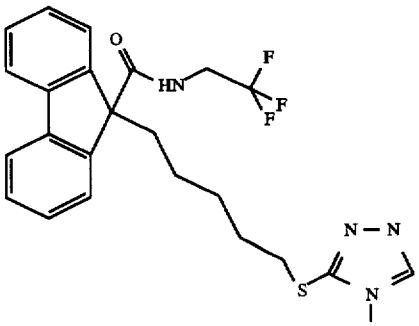
m/z 475 (M + H)

-continued
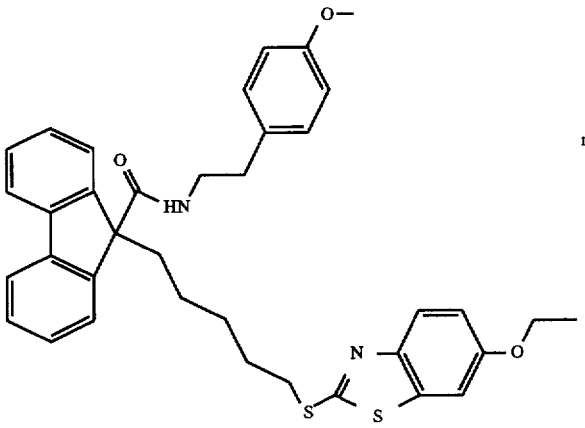
m/z 623 (M + H)
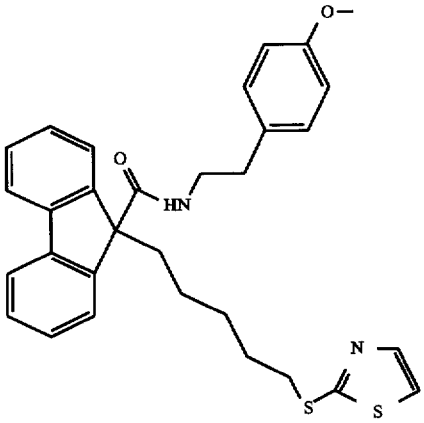
m/z 529 (M + H)
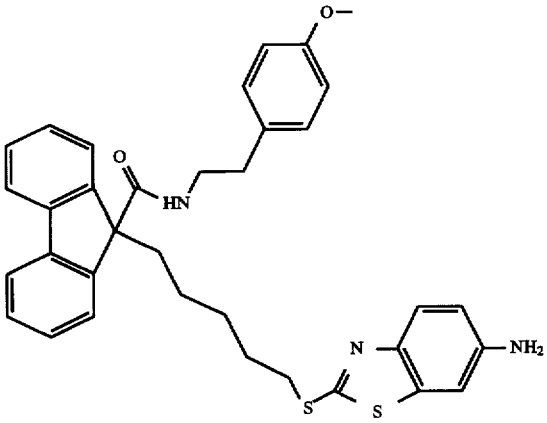
m/z 594 (M + H)

-continued
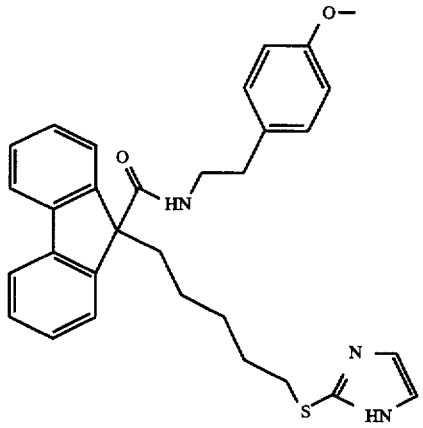
m/z 512 (M + H)
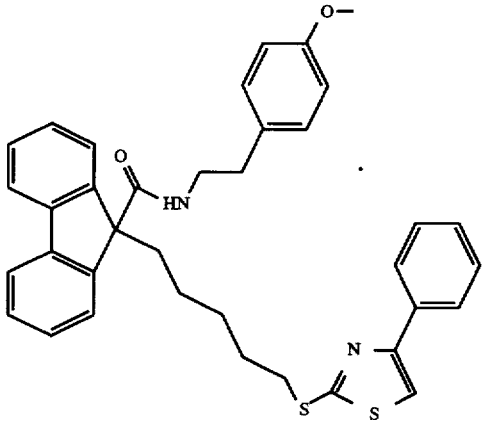
m/z 605 (M + H)
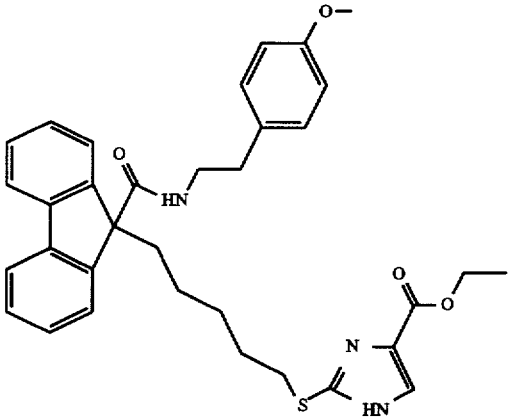
m/z 584 (M + H)

-continued
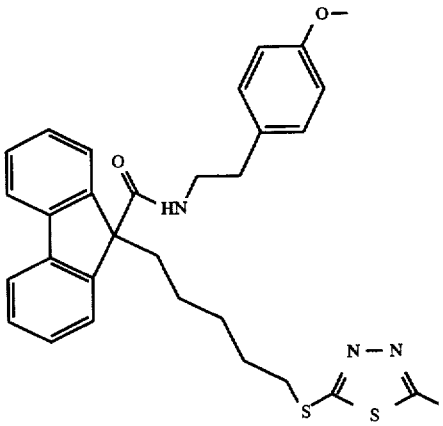
m/z 544 (M + H)
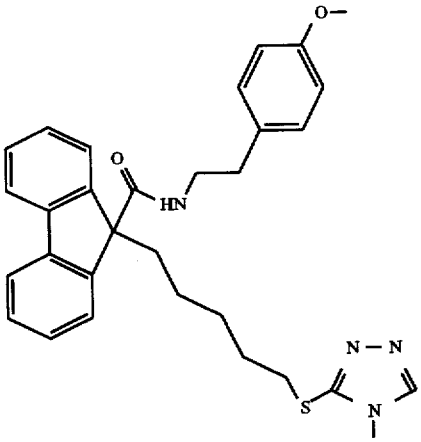
m/z 527 (M + H)
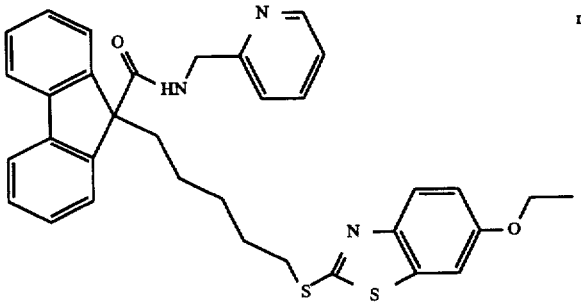
m/z 580 (M + H)
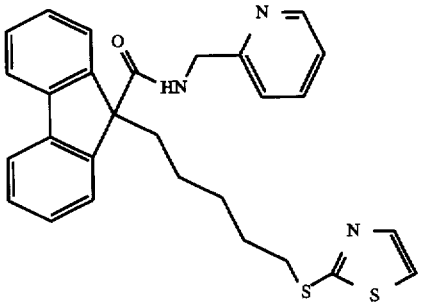
m/z 486 (M + H)

-continued
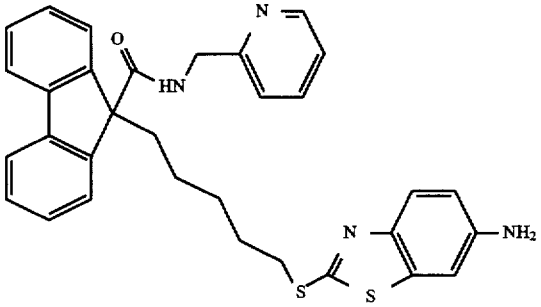
m/z 551 (M + H)
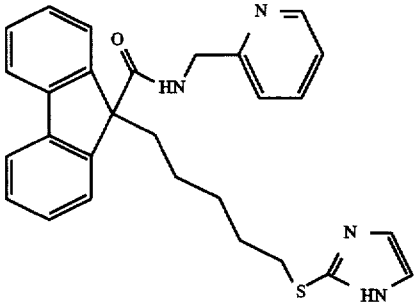
m/z 469 (M + H)
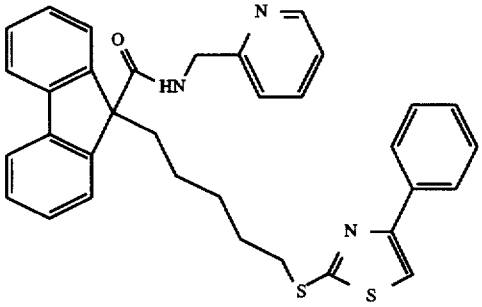
m/z 562 (M + H)
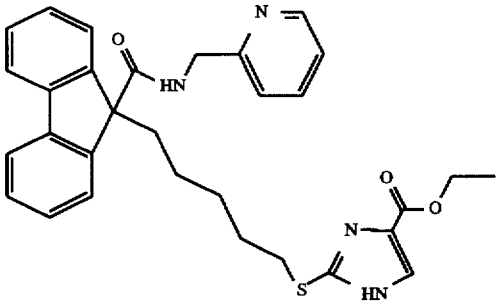
m/z 541 (M + H)
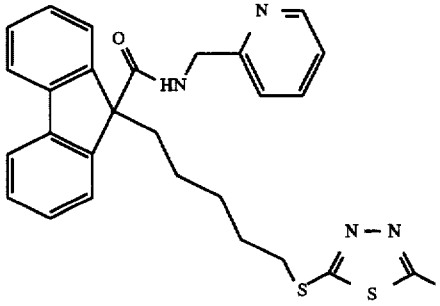
m/z 501 (M + H)

-continued
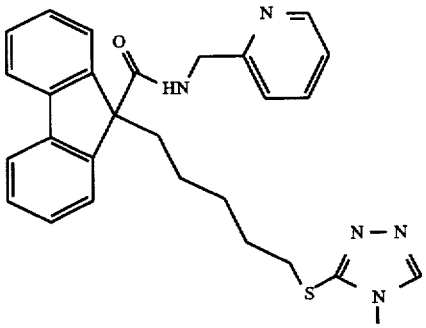
m/z 484 (M + H)
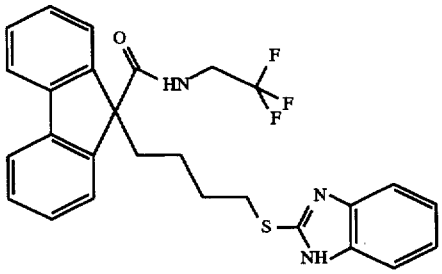
m/z 496 (M + H)
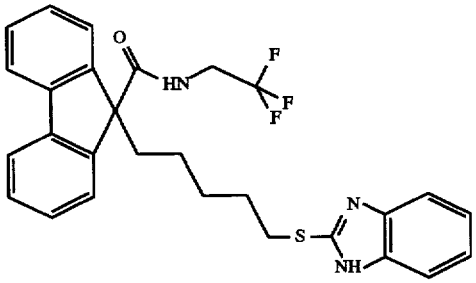
m/z 510 (M + H)
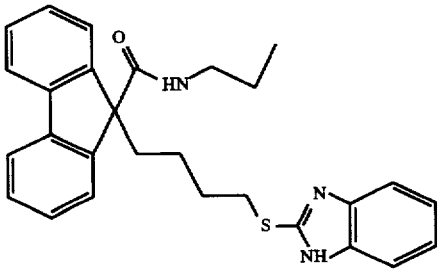
m/z 456 (M + H)
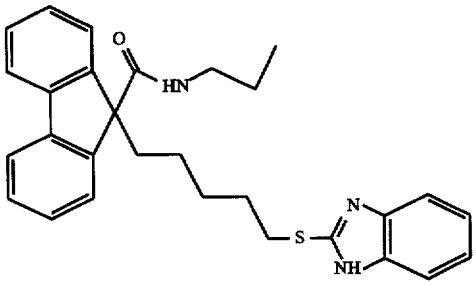
m/z 470 (M + H)

-continued
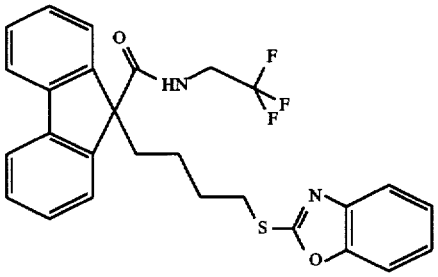
m/z 497 (M + H)
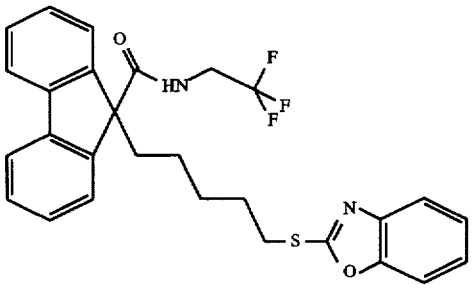
m/z 511 (M + H)
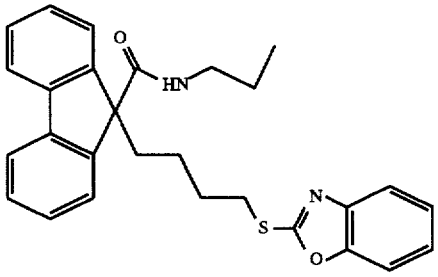
m/z 457 (M + H)
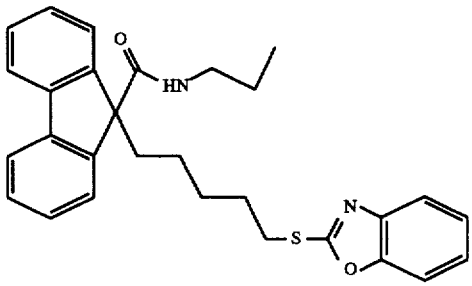
m/z 471 (M + H)
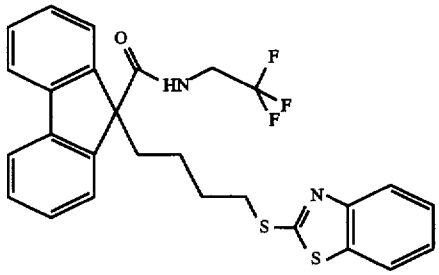
m/z 513 (M + H)

-continued
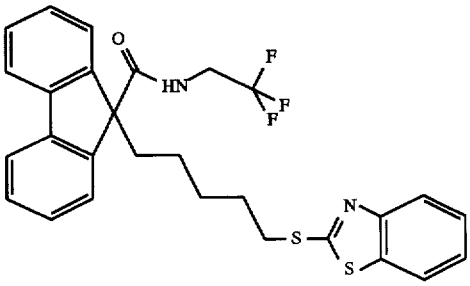
m/z 527 (M + H)
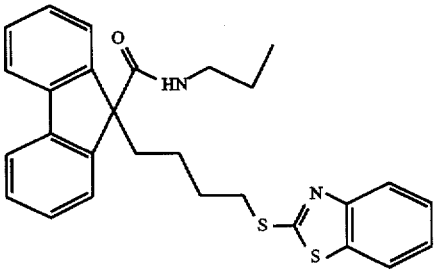
m/z 473 (M + H)
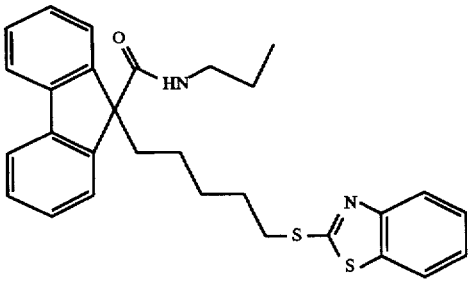
m/z 487 (M + H)
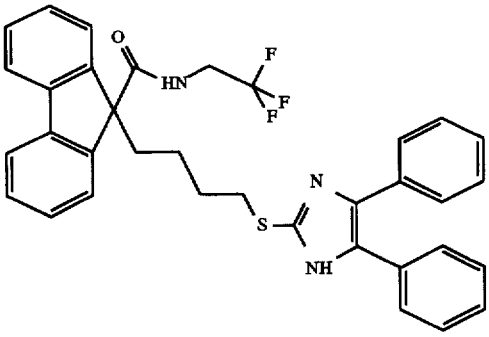
m/z 598 (M + H)
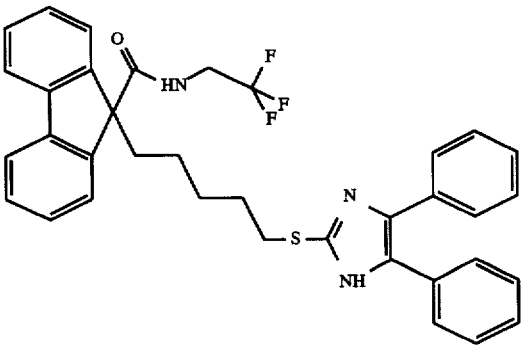
m/z 612 (M + H)

-continued
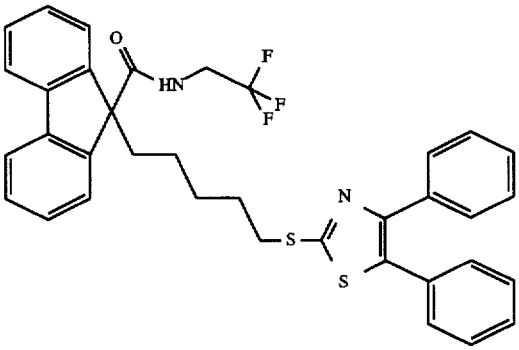
m/z 629 (M + H)
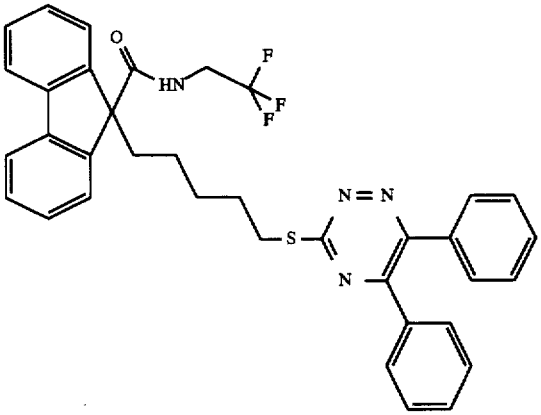
m/z 625 (M + H)
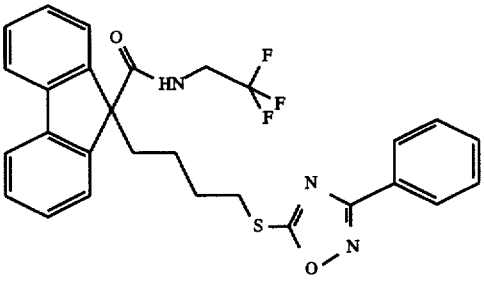
m/z 522 (M − H)
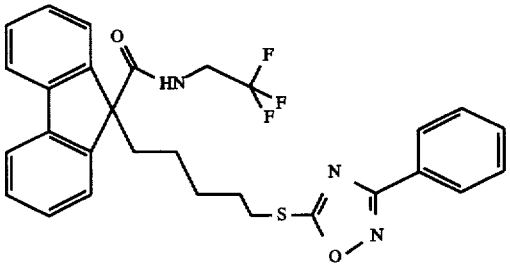
m/z 536 (M + H)
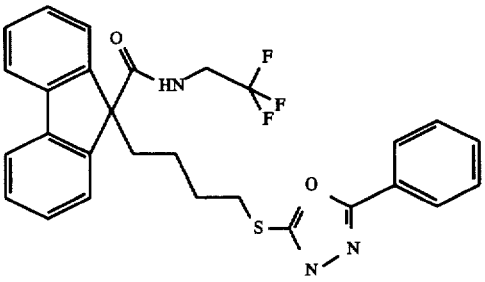
m/z 524 (M + H)

-continued
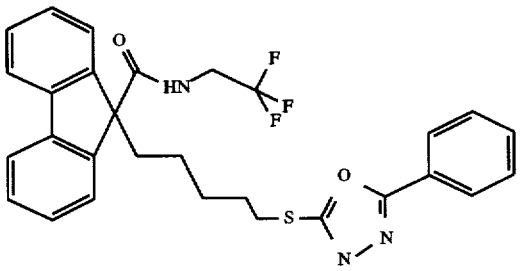
m/z 538 (M + H)
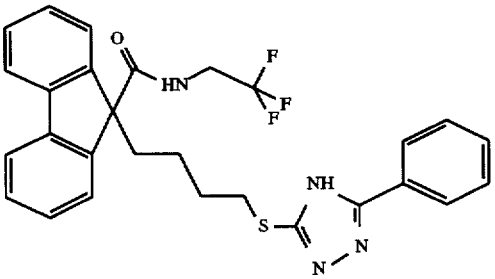
m/z 523 (M + H)
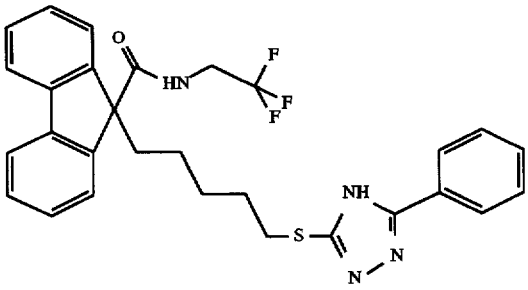
m/z 537 (M + H)
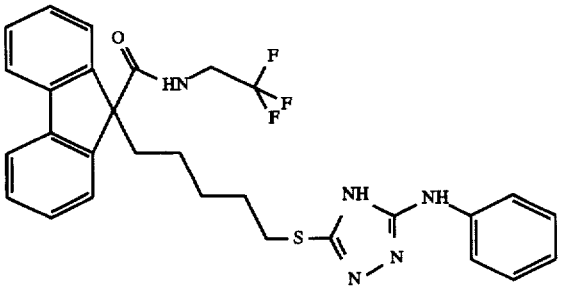
m/z 552 (M + H)
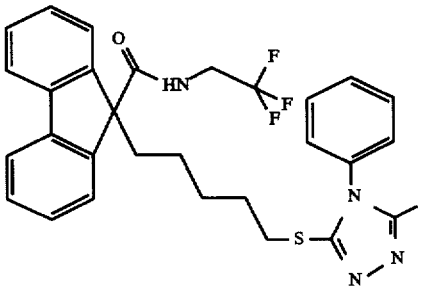
m/z 551 (M + H)

-continued
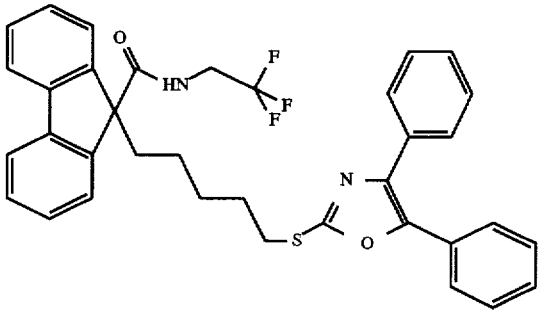
m/z 613 (M + H)
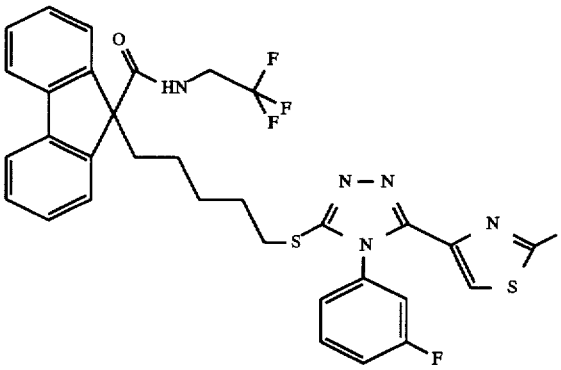
m/z 652 (M + H)
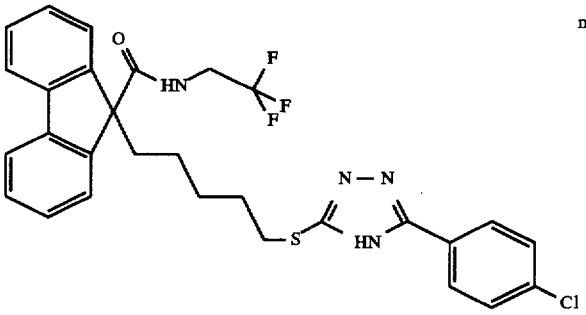
m/z 572 (M + H)
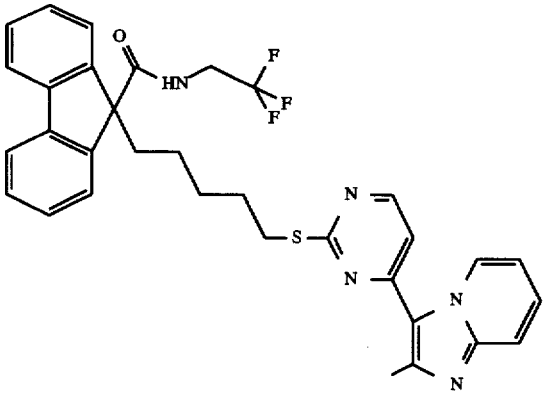
m/z 602 (M + H)

-continued
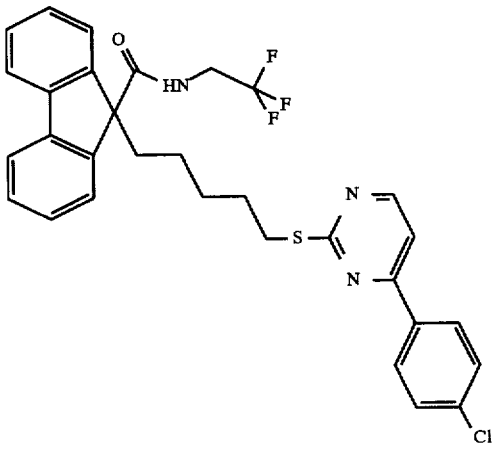
m/z 582 (M + H)
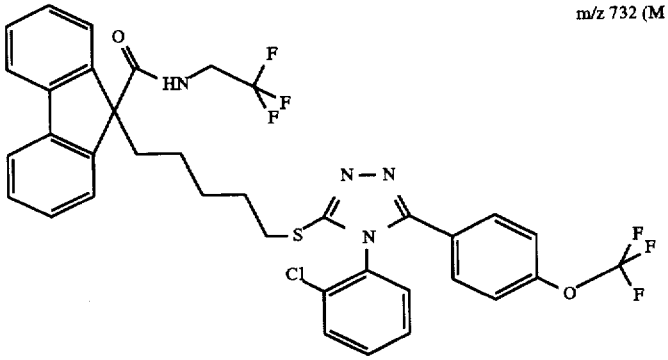
m/z 732 (M + H)
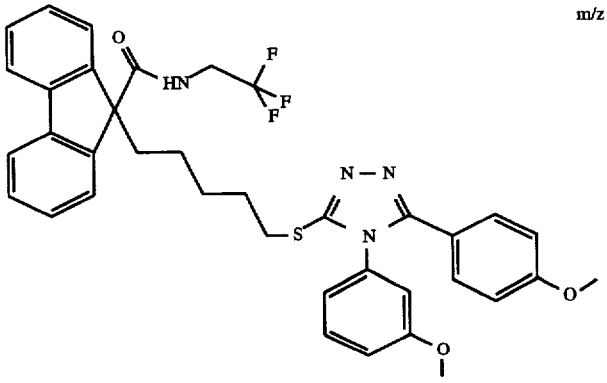
m/z 673 (M + H)
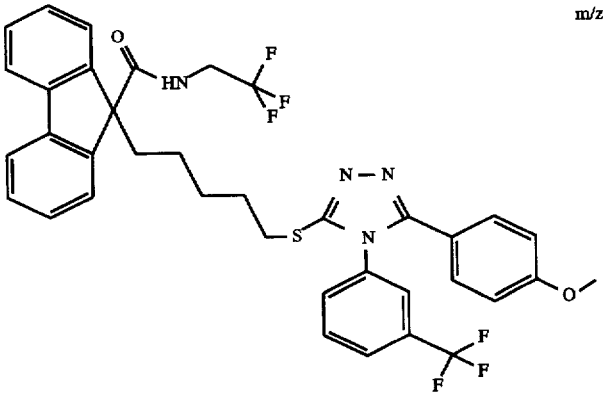
m/z 711 (M + H)

-continued
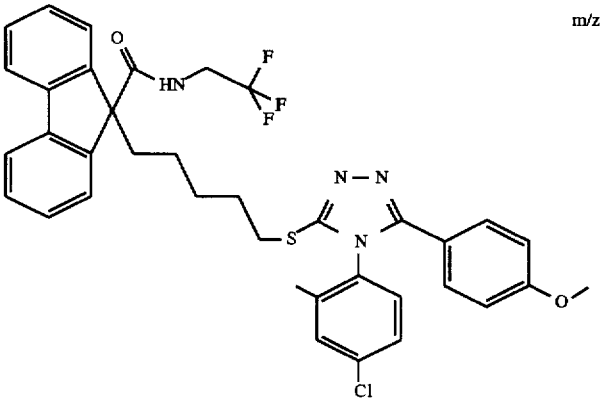
m/z 692 (M + H)
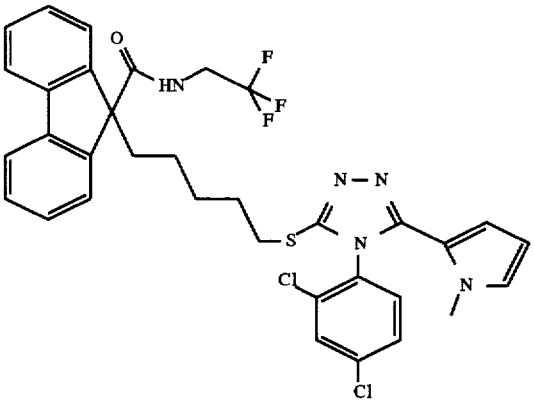
m/z 685 (M + H)
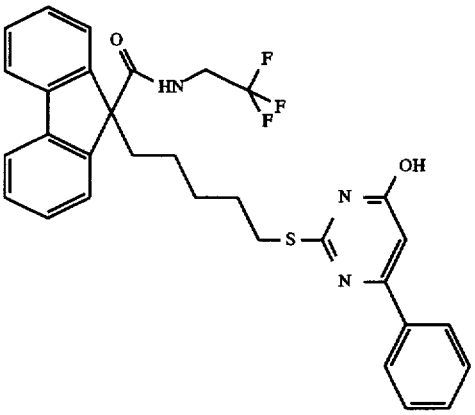
m/z 564 (M + H)
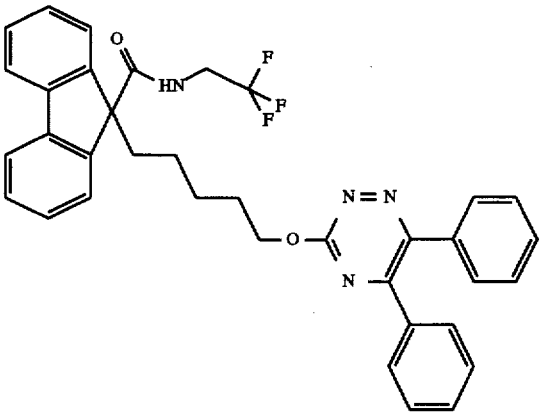
m/z 609 (M + H)

-continued
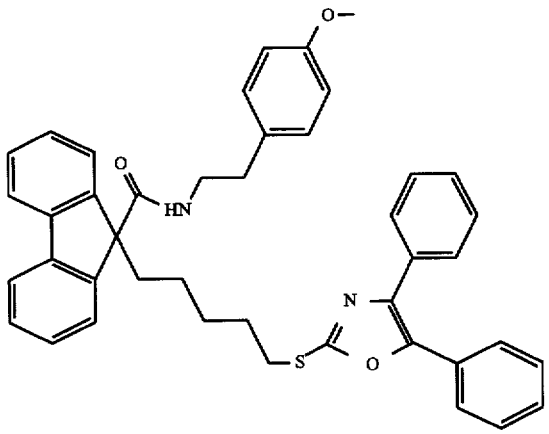
m/z 665 (M + H)
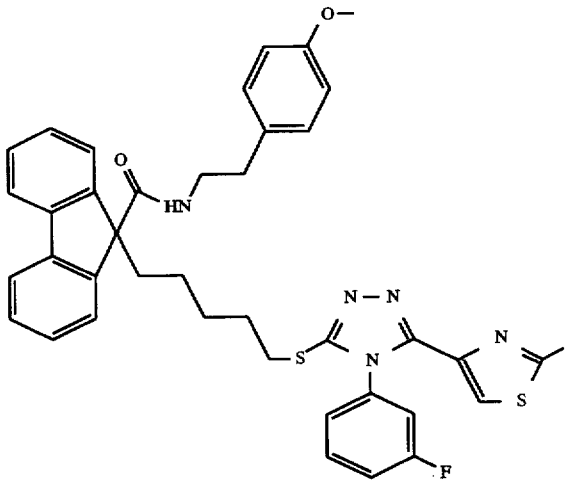
m/z 704 (M + H)
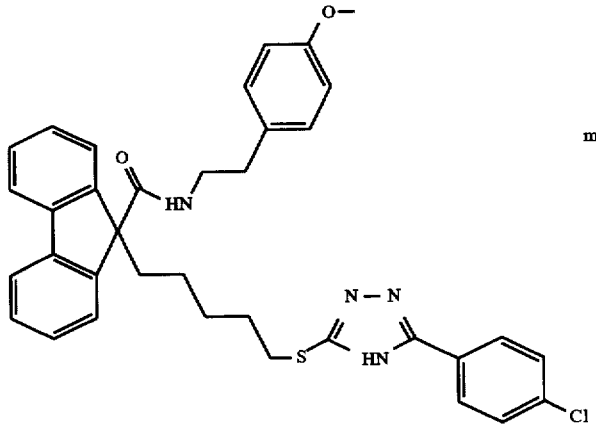
m/z 624 (M + H)

-continued
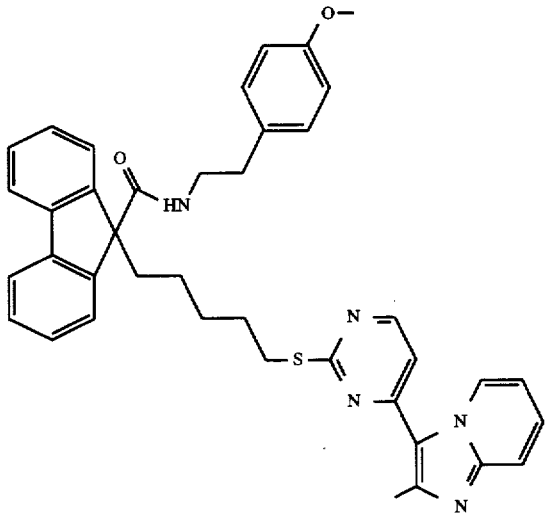
m/z 654 (M + H)
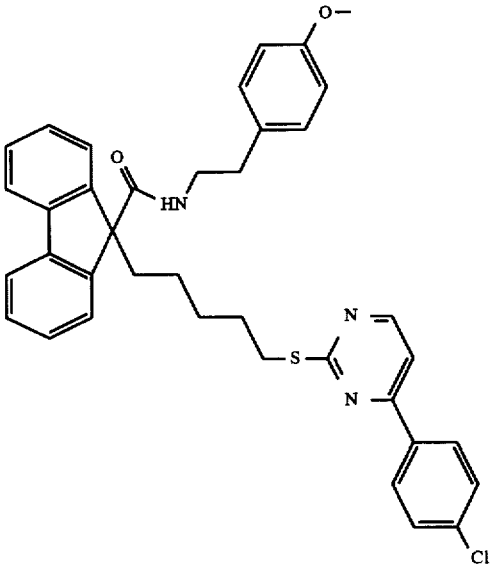
m/z 634 (M + H)
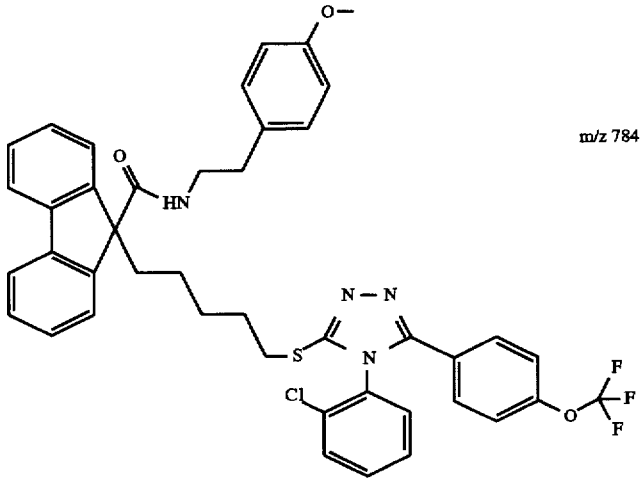
m/z 784 (M + H)

-continued
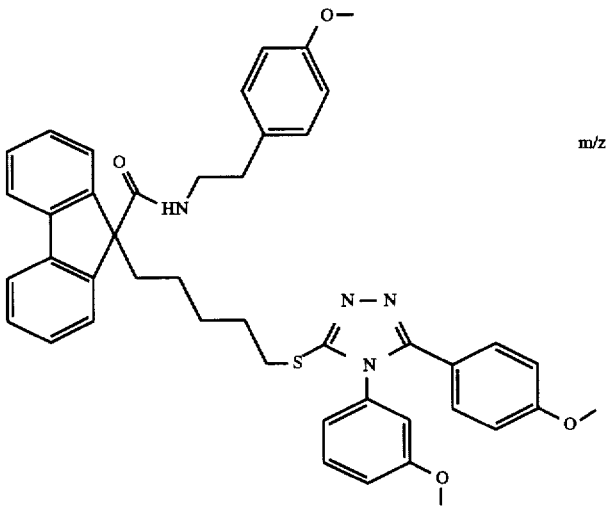
m/z 725 (M + H)
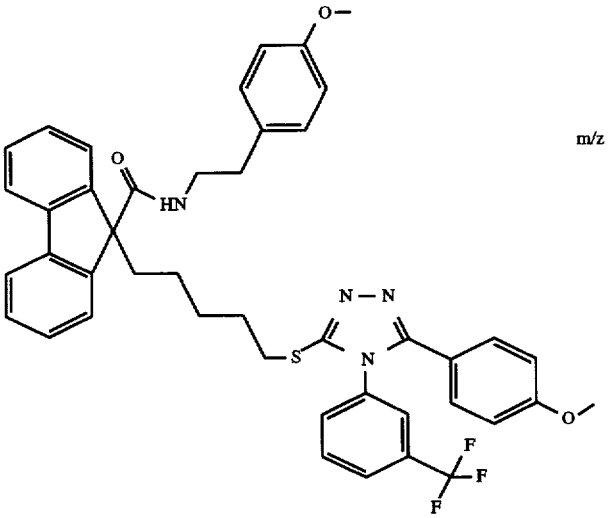
m/z 763 (M + H)
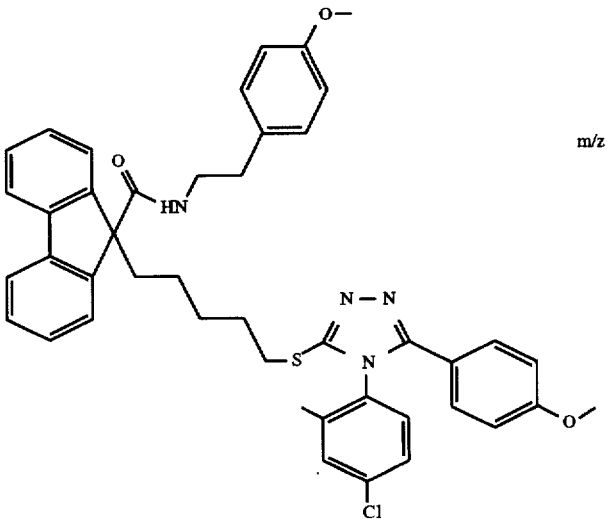
m/z 744 (M + H)

-continued
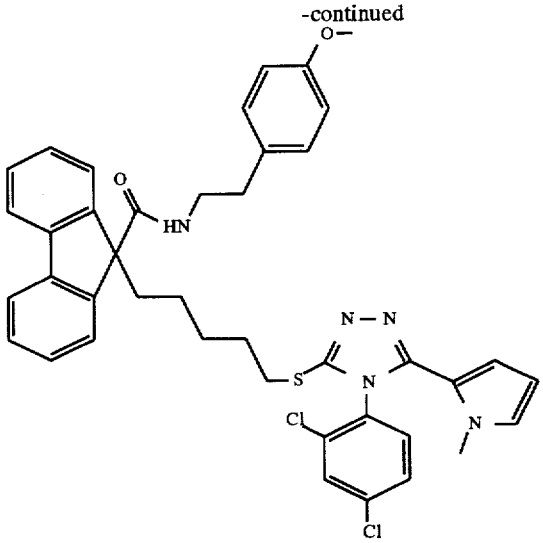
m/z 737 (M + H)
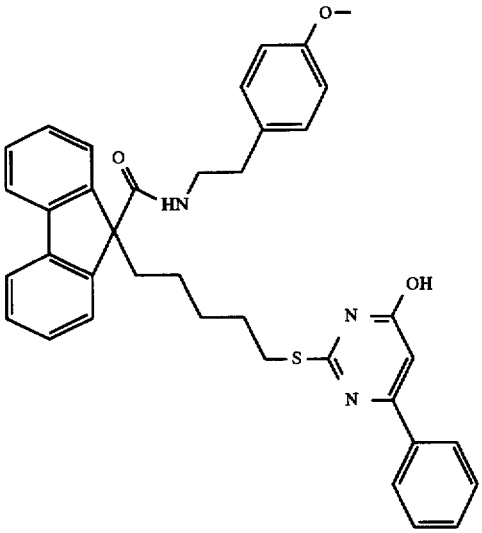
m/z 616 (M + H)
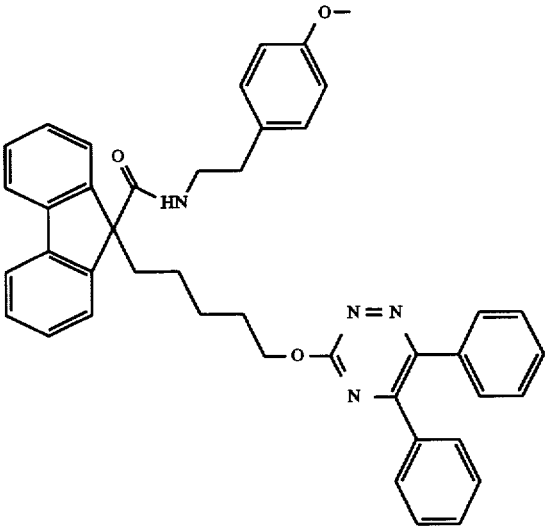
m/z 661 (M + H)

(E)-9-[4-[4-(1,3-Dihydro-1-oxo-2H-isoindol-2-yl)-1-piperidinyl]-2-butenyl-2,7-difluoro-N-(2,2,2-trifluoroethyl)-9H-fluorene-9-carboxamide, monotrifluoroacetic acid (TFA) salt

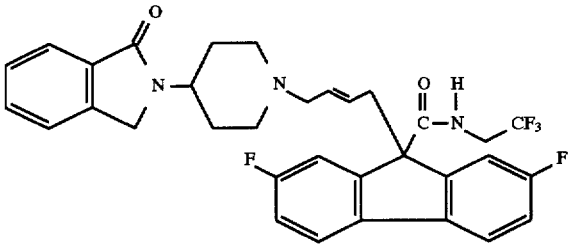

9-[4-[4-(1,3-Dihydro-1-oxo-2H-isoindol-2-yl)-1-piperidinyl]butyl]-2,7-difluoro-N-(2,2,2-trifluoroethyl)-9H-fluorene-9-carboxamide, TFA salt

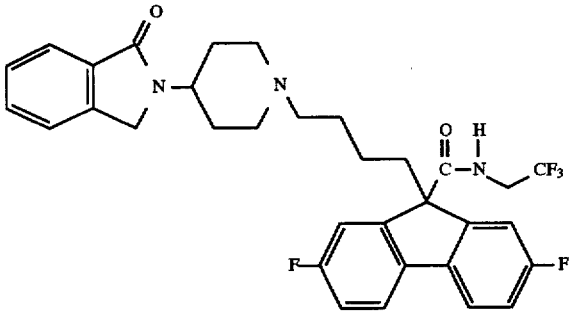

(Z)-9-[4-[4-(2,3-Dihydro-1-oxo-1H-isoindol-2-yl)-1-piperidinyl]-2-butenyl]-N-propyl-9H-fluorene-9-carboxamide, TFA salt

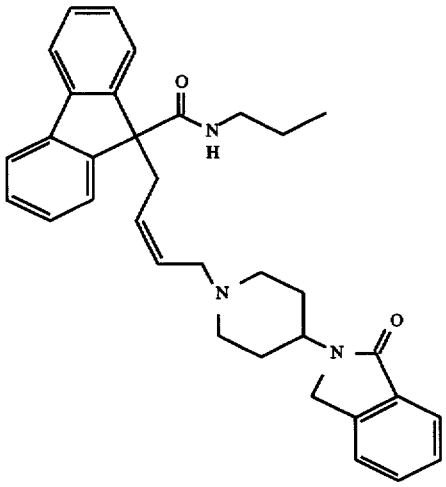

9-[4-[4-[[2-(Phenoxyphenyl) carbonyl]amino]-1-piperidinyl]butyl]-N-propyl-9H-fluorene-9-carboxamide, TFA salt

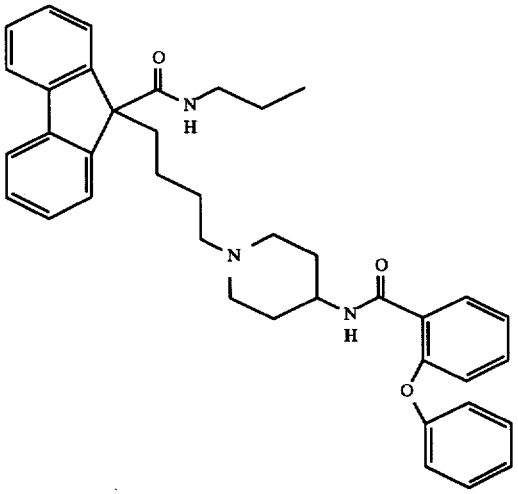

9-[4[4-(2,3-Dihydro-1,3-dioxo-1H-isoindol-2-yl)-1-piperidinyl]butyl]-N-propyl-9H-fluorene-9-carboxamide, TFA salt

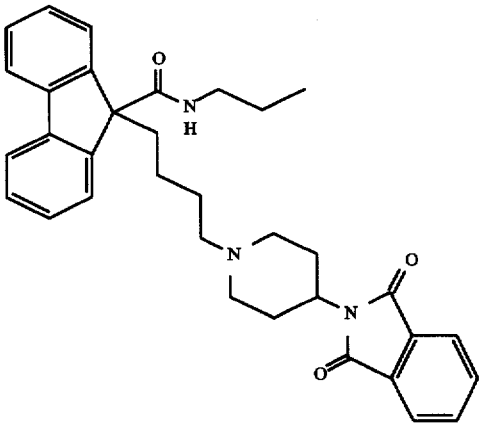

9-[4-[4-(2,3-Dihydro-1-oxo-1H-isoindol-2-yl)-1-piperidinyl]butyl]-N-propyl-9H-indeno[2,1-b]-pyridine-9-carboxamide, TFA salt

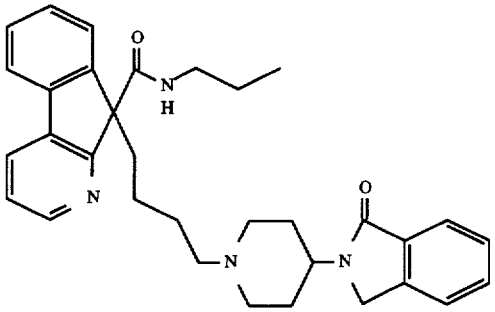

2,3-Dihydro-1-[4-[4-(2,3-dihydro-1-oxo-1H-isoindol-2-yl)-1-piperidinyl]butyl]-N-propyl-1H-indene-1-carboxamide, TFA salt

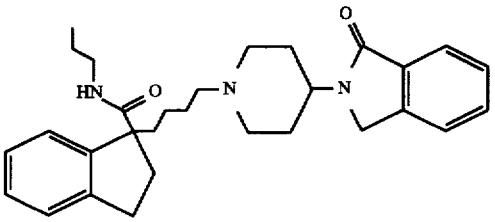

1-[4-[4-(2,3-Dihydro-1-oxo-1H-isoindol-2-yl)1-piperidinyl]butyl]-2-phenyl-N-propyl-1H-indene-1-carboxamide, TFA salt

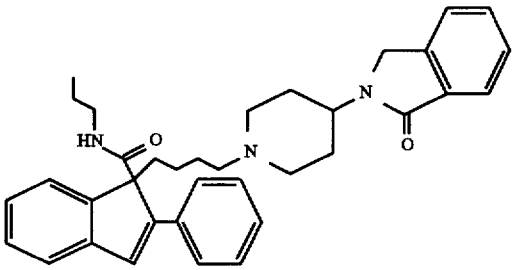

trans-2,3-Dihydro-1-[4-[4-(2,3-dihydro-1-oxo-1H-isoindol-2-yl)-1-piperidinyl]butyl]-2-phenyl-N-propyl-1H-indene-1-carboxamide, TFA salt

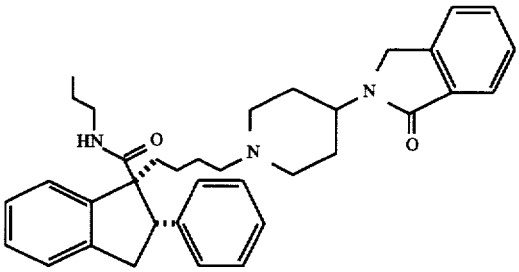

9-[4-[4-[(2-Phenoxybenzoyl)amino]-1-piperidinyl]-butyl]-N-(2,2,2-trifluoroethyl)-9H-fluorene-9-carboxamide, TFA salt 9-[4-[[4-(Benzoylamino)-1-piperidinyl]butyl]-2,7-difluoro-N-(2,2,2-trifluoroethyl)-9H-fluorene-9-carboxamide, TFA salt 9-[4-[[4-(1,3-Dihydro-1,3-dioxo-2H-isoindol-2-yl)-1-piperidinyl]butyl]-2,7-difluoro-N-(2,2,2-trifluoroethyl)-9H-fluorene-9-carboxamide, TFA salt 2,7-Difluoro-9-[4-[[4-[(2-phenoxybenzoyl)amino]-1-piperidinyl]butyl]-N-(2,2,2-trifluoroethyl)-9H-fluorene-9-carboxamide, TFA salt 9-[4-[4-(Benzoylamino)-1-piperidinyl]butyl]-N-(2,2,2-trifluoroethyl)-9H-fluorene-9-carboxamide, TFA salt

[1-[4-[9-[(Propylamino)carbonyl]-9H-fluoren-9-yl]-butyl]-3-piperidinyl]carbamic acid, phenylmethyl ester, TFA salt 9-[4-[4-(2,3-Dihydro-1-oxo-1H-isoindol-2-yl)-1-piperidinyl]butyl]-N-(2,2,2-trifluoroethyl)-9H-fluorene-9-carboxamide, TFA salt 9-[4-[4-(2,3-Dihydro-1-oxo-1H-isoindol-2-yl)-1-piperidinyl]butyl]-N-(2,2,2-trifluoroethyl)-9H-fluorene-9-carboxamide, TFA salt 9-[4-[4-[(Phenoxycarbonyl)amino]-1-piperidinyl]-butyl]-N-(2,2,2-trifluoroethyl)-9H-fluorene-9-carboxamide, TFA salt 9-[4-[4-[[(Phenylamino)carbonyl]amino]-1-piperidinyl]butyl]-N-(2,2,2-trifluoroethyl)-9H-fluorene-9-carboxamide, TFA salt 9-[4-[4-[(2-Phenoxybenzoyl)amino]-1-piperidinyl]-4-oxobutyl]-N-(2,2,2-trifluoroethyl)-9H-fluorene-9-carboxamide, TFA salt

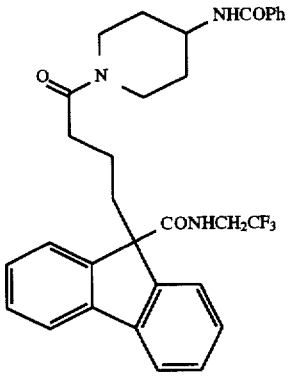

9-[4-[4-[[(2-Phenoxyphenyl)sulfonyl]amino]-1-piperidinyl]butyl]-N-(2,2,2-trifluoroethyl)-9H-fluorene-9-carboxamide, TFA salt 9-[4-[4-[(2-Phenoxybenzoyl)amino]-1-piperidinyl]-pentyl]-N-(2,2,2-trifluoroethyl)-9H-fluorene-9-carboxamide, TFA salt N-(Phenylmethyl)-9-(3-phenylpropyl)-9H-fluorene-9-carboxamide (E)-N-Ethyl-9-(3-phenyl-2-propenyl)-9H-fluorene-9-carboxamide 9-[4-(Dibutoxyphosphinyl)butyl]-N-propyl-9H-fluorene-9-carboxamide (E)-9-(3-Phenyl-2-propenyl)-N-propyl-9H-fluorene-9-carboxamide

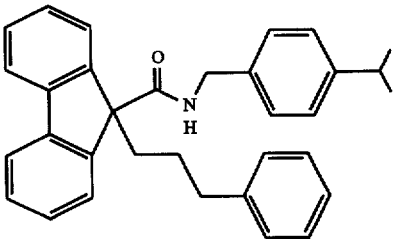

9-(3-Phenylpropyl)-N-(2,2,2-trifluoroethyl)-9H-fluorene-9-carboxamide

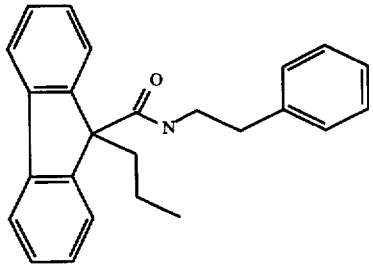

9-(2-Propenyl)-N-(2-pyridinylmethyl)-9H-fluorene-9-carboxamide

N-Butyl-9-(2-propenyl)-9H-fluorene-9-carboxamide 9-(2,3-Dihydroxypropyl)-N-ethyl-9H-fluorene-9-carboxamide 9-(3-Phenylpropyl)-N-(3-hydroxy)propyl-9H-xanthene-9-carboxamide

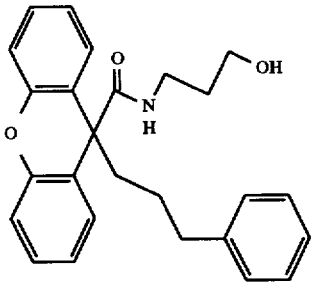

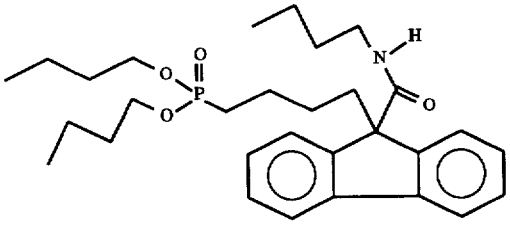

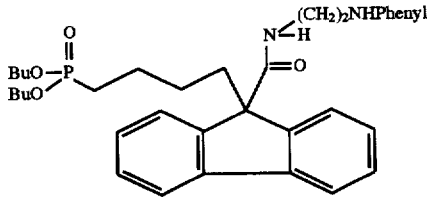

9-[4-(Dibutoxyphosphinyl)butyl]-N-(2,2,2-trifluoroethyl)-9H-fluorene-9-carboxamide 9-(4-Cyanobutyl)-N-propyl-9H-fluorene-9-carboxamide N-[3-(Dibutoxyphosphinyl)propyl]-9-propyl-9H-fluorene-9-carboxamide N-[5-(Dibutoxyphosphinyl)pentyl-9-propyl-9H-fluorene-9-carboxamide N-[[4-(1,3-Dihydro-1-oxo-2H-isoindol-2-yl)phenyl]-methyl-9-propyl-9H-fluorene-9-carboxamide (E)-9-[4-(Dibutoxyphosphinyl)-2-butenyl]-2,7-difluoro-N-Propyl-9H-fluorene-9-carboxamide 9-[4-(Dibutoxyphosphinyl)butyl]-2,7-difluoro-N-9H-fluorene-9-carboxamide 9-[4-(Diethoxyphosphinyl)butyl]-N-propyl-9H-fluorene-9-carboxamide 9-[4-(Diphenylphosphinyl)butyl]-N-propyl-9H-fluorene-9-carboxamide

[4-[9-(Butylthio)-9H-fluoren-9-yl]butyl]phosphonic acid, dibutyl ester (E)-9-[4-(Dibutoxyphosphinyl)-2-butenyl]-2,7-difluoro-N-(2,2,2-trifluoroethyl)-9H-fluorene-9-carboxamide 9-[4-[4-(1,3-Dihydro-1,3-dioxo-2H-isoindol-2-yl)phenyl] butyl-N-propyl-9H-fluorene-9-carboxamide 9-[4-[4-[[(2-Phenoxyphenyl)carbonyl]amino]phenyl]-butyl] -N-propyl-9H-fluorene-9-carboxamide 9-[4-[4-(1,3-Dihydro-1-oxo-2H-isoindol-2-yl)phenyl]-butyl-N-propyl-9H-fluorene-9-carboxamide 9-[3-[4-(1,3-Dihydro-1,3-dioxo-2H-isoindol-2-yl)-phenyl] propyl]-N-propyl-9H-fluorene-9-carboxamide 9-[3-[4-(Benzoylamino)]phenyl]-N-propyl-9H-fluorene-9-carboxamide 9-[3-[(1,3-Dihydro-1-oxo-2H-isoindol-2-yl)phenyl]-propyl] -N-propyl-9H-fluorene-9-carboxamide 9-[5-[(6-Ethoxy-2-benzothiazolyl)thio]pentyl]-N-propyl-9H-fluorene-9-carboxamide 9-[4-[4-(Benzoylamino)phenyl]butyl]-N-propyl-9H-fluorene-9-carboxamide 9-[5-(Dibutoxyphosphinyl)pentyl]-N-propyl-9H-fluorene-9-carboxamide (Z)-9-[4-[(6-Ethoxy-2-benzothiazolyl)thio]-2-butenyl]-N-propyl-9H-fluorene-9-carboxamide

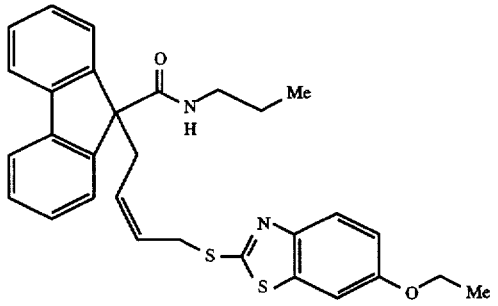

9-[4-(Dibutoxyphosphinyl)butyl]-N-(2,2,2-trifluoropropyl)-9H-xanthene-9-carboxamide

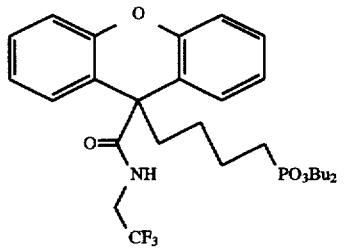

9-[4-Butoxy[2-(4-morpholinyl)ethoxy]phosphinyl]-butyl]-N-(2,2,2-trifluoroethyl)-9H-fluorene-9-carboxamide, TFA salt

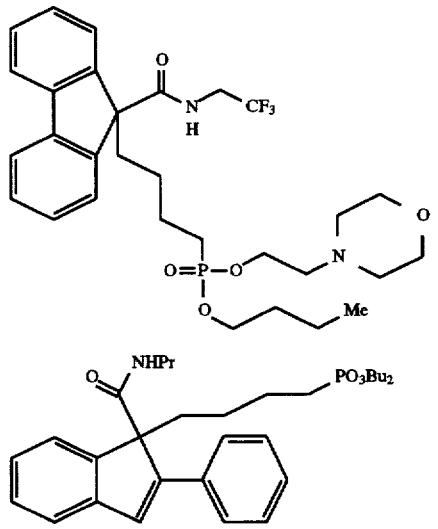

9-[4-(Dibutoxyphosphinyl)butyl]-2,7-difluoro-N-(2,2,2-trifluoroethyl)-9H-fluorene-9-carboxamide

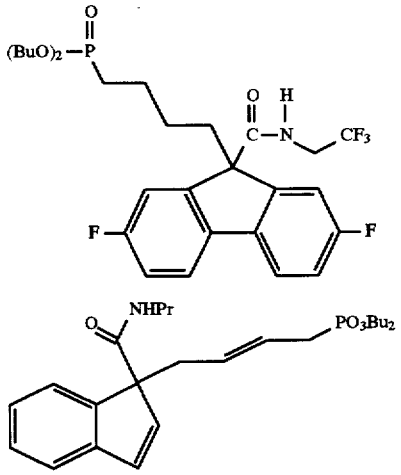

(E)-9-[4-(Dibutoxyphosphinyl)-2-butenyl]-N-propyl-9H-fluorene-9-carboxamide

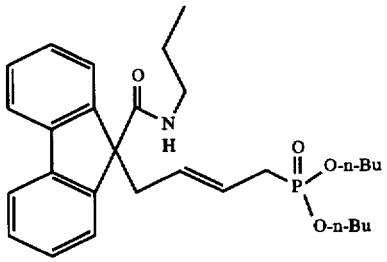

9-[4-[4-(Benzoylamino)-1H-imidazol-1-yl]butyl]-N-(2,2,2-trifluoroethyl)-9H-fluorene-9-carboxamide, TFA salt

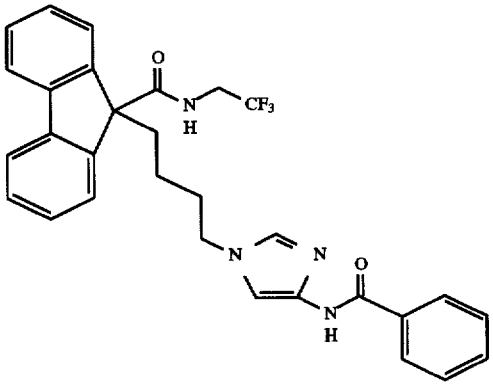

9-[4-[5-(Benzoylamino)-2-pyridinyl]butyl]-N-(2,2,2-trifluoroethyl)-9H-fluorene-9-carboxamide, TFA salt

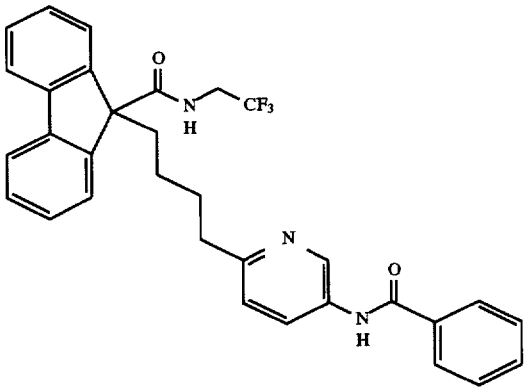

9-[4-[4-[(2-Phenoxybenzoyl)amino]-1H-imidazol-1-yl]butyl]-N-(2,2,2-trifluoroethyl)-9H-fluorene-9-carboxamide, TFA salt

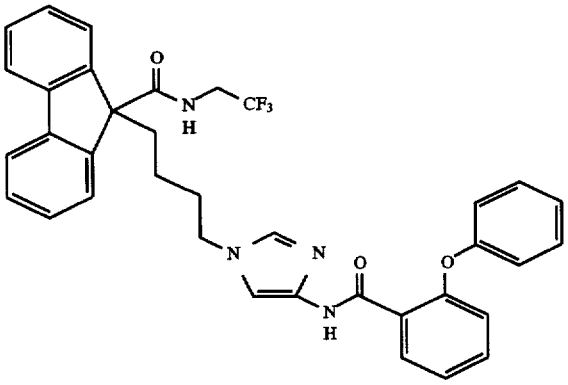

9-[4-[(2-Bromo-5-pyridinyl)amino]butyl]-N-propyl-9H-fluorene-9-carboxamide, TFA salt

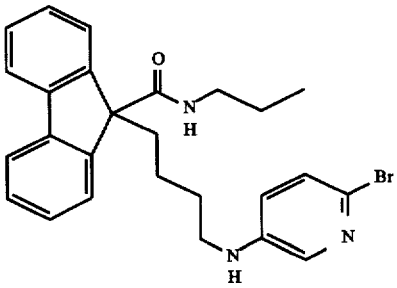

9-[4-(Dibutoxyphosphinyl)butyl]-N-propyl-9H-indeno-[2,1-b]pyridine-9-carboxamide, TFA salt

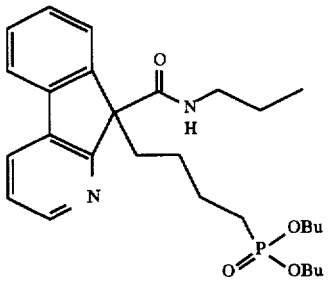

9-[4-[4-[(Phenylsulfonyl)amino]phenyl]butyl]-N-(2,2,2-trifluoroethyl)-9H-fluorene-9-carboxamide

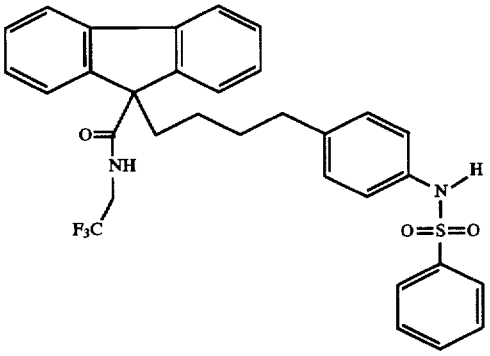

9-[3-[[5-[(2-Phenoxybenzoyl)amino]-2-pyridinyl]oxy]-propyl]-N-(2,2,2-trifluoroethyl)-9H-fluorene-9-carboxamide, TFA salt

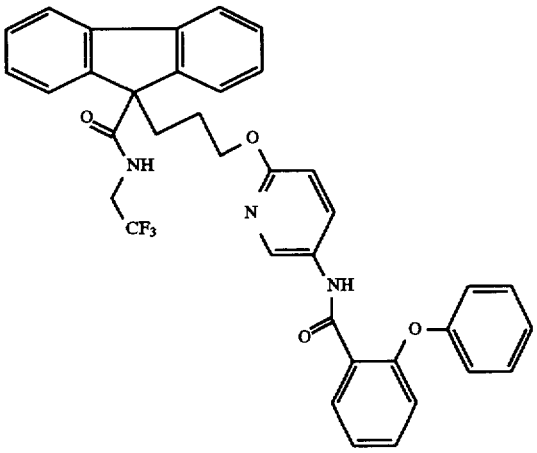

9-[4-[5-[(2-Phenoxybenzoyl)amino]-2-pyridinyl]butyl]-N-(2,2,2-trifluoroethyl)-9H-fluorene-9-carboxamide, TFA salt

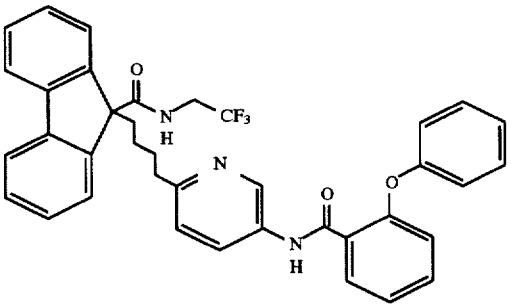

9-[4-[4-(Benzoylamino)-2-methyl-1H-imidazol-1-yl]-butyl]-N-(2,2,2-trifluoroethyl)-9H-fluorene-9-carboxamide, TFA salt

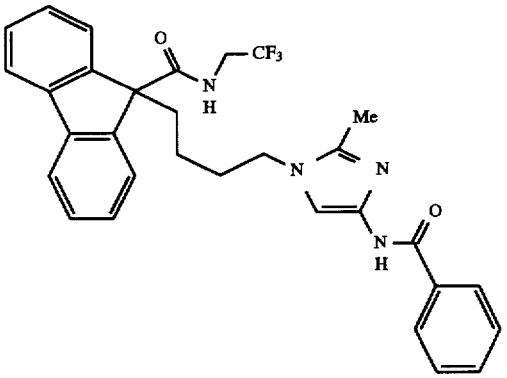

9-[4-[4-[(2-Phenoxybenzoyl)amino]-2-methyl-1H-imidazol-1-yl]butyl]-N-(2,2,2-trifluoroethyl)-9H-fluorene-9-carboxamide, TFA salt

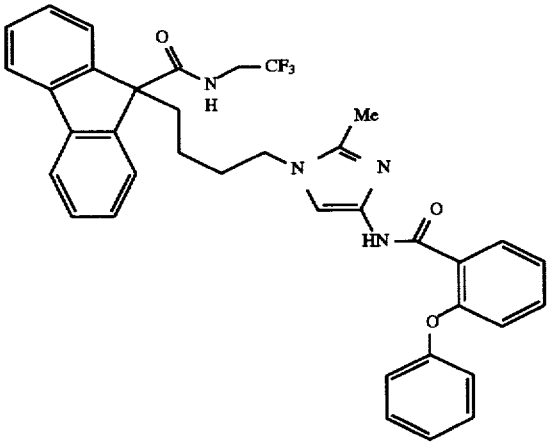

9-[3-[[2-(Benzoylamino)-5-pyridinyl]amino]propyl]-N-5 (2,2,2-trifluoroethyl)-9H-fluorene-9-carboxamide, TFA salt

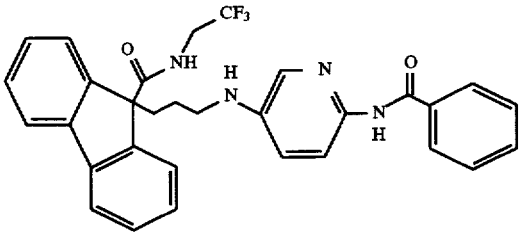

9-[2-[[[4-(Benzoylamino)phenyl]methyl]amino]ethyl]-N-(2,2,2-trifluoroethyl)-9H-fluorene-9-carboxamide, TFA salt

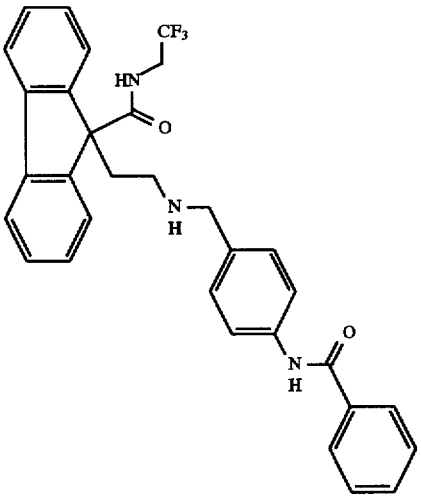

9-[4-[Butoxy(tetrahydrofuran-2-ylmethoxy)phosphinyl]- butyl]-N-(2,2,2-trifluoroethyl)-9H-fluorene-9-carboxamide

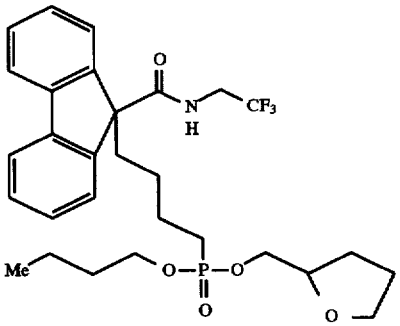

9-[4-[Butoxy(2-pyridinylmethoxy)phosphinyl]butyl]-N-(2,2,2-trifluoroethyl)-9H-fluorene-9-carboxamide, TFA salt

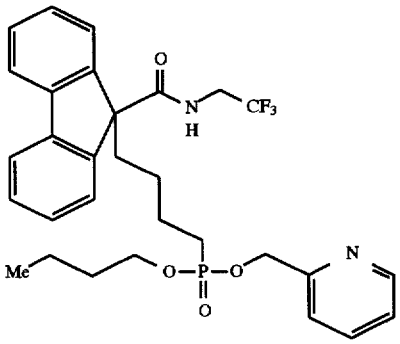

9-[4-[(6-Ethoxy-2-benzothiazolyl)thio]butyl]-N-propyl-9H-fluorene-9-carboxamide

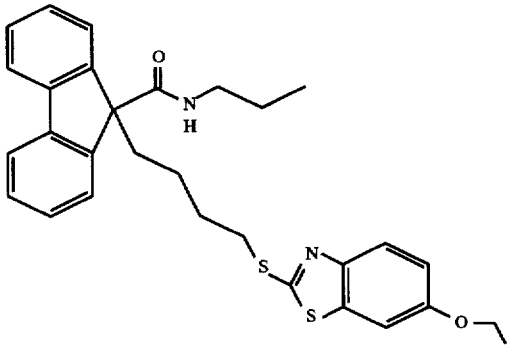

9-[4-[(4,5-Diphenyl-1H-imidazol-2-yl)thio]butyl]-N-(2-(4-methoxyphenyl)ethyl]-9H-fluorene-9-carboxamide

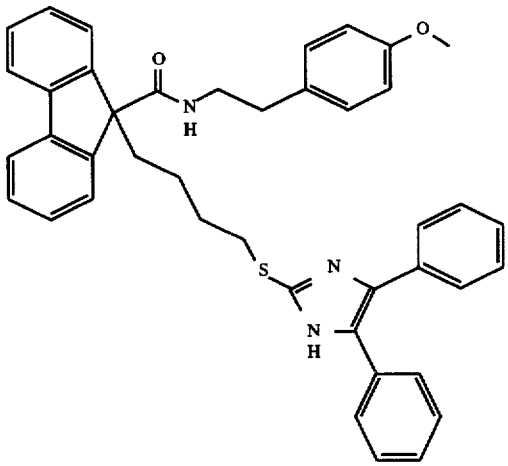

9-[4-(2-Thiazolylthio)butyl]-N-(2,2,2-trifluoroethyl)-9H-fluorene-9-carboxamide

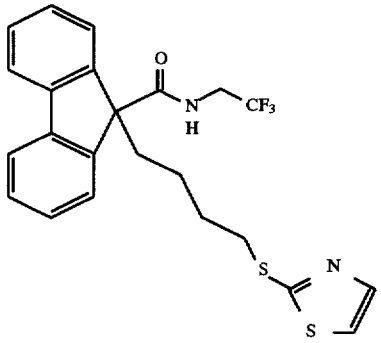

What is claimed is:

1. A dialkoxyaryl aldehyde linker-resin for use in carrying out solid phase syntheses, which aldehyde linker-resin comprises a resin suitable for use as a support for carrying out solid phase syntheses and a dialkoxyaryl aldehyde containing linker attached to the resin.

2. The aldehyde linker-resin as defined in claim 1 which has the structure

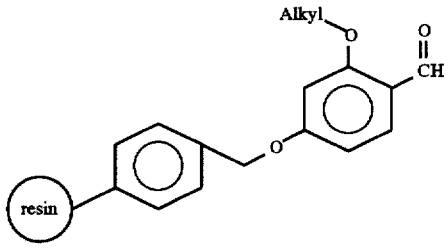

wherein

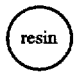

represents a support resin.

3. The aldehyde linker-resin as defined in claim 1 wherein the resin

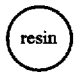

is a polystyrene resin.

4. The aldehyde linker-resin as defined in claim 1 wherein the resin is a divinylbenzene cross-linked polystyrene resin, polyethylene glycol-polystyrene-based resin, polyethylene glycol-based resin or polypropylene glycol-based resin, employed in the form of beads.

5. A method for preparing an aldehyde linker-resin as defined in claim 1, which comprises reacting an aldehyde of the structure

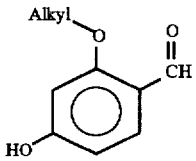

with a resin III

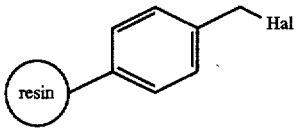

III where Hal is Cl, Br or I and

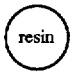

represents a support resin, in the presence of a base, to form the aldehyde linker-resin.

6. The method as defined in claim 5 wherein the aldehyde linker-resin formed is of the structure

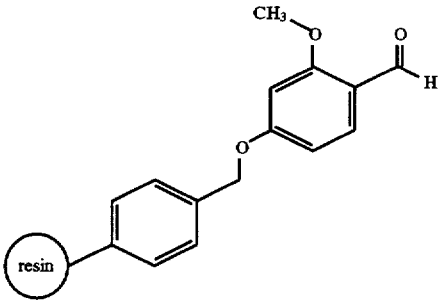

7. The method as defined in claim 6 wherein the resin is a divinylbenzene cross-linked polystyrene or polyethyleneglycol-polystyrene-based resin.

8. A method for forming an amine linker-resin intermediate of the structure

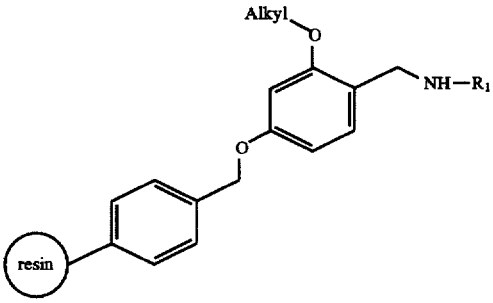

wherein $R_1$ is H or alkyl, and

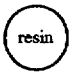

represents a support resin, which comprises reacting the aldehyde linker-resin as defined in claim 2 of the structure

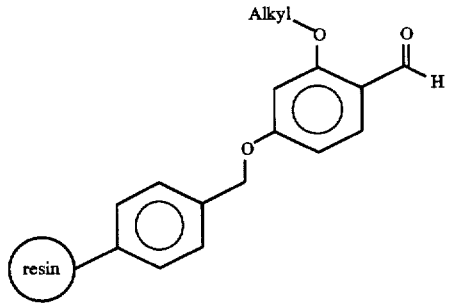

with an amine of the structure $H_2N—R_1$ or a salt thereof, in the presence of a dehydrating agent, and treating the reaction with a reducing agent and weak organic acid to form the amine linker-resin intermediate.

9. The method as defined in claim 8 wherein reaction of the aldehyde linker-resin and the amine is carried out in the presence of trimethylorthoformate, molecular sieves or titanium isopropoxide as the dehydrating agent, and the reaction is treated with sodium triacetoxyborohydride, sodium cyanoborohydride or sodium borohydride as the reducing agent.

10. A method for preparing a linker-resin intermediate of the structure

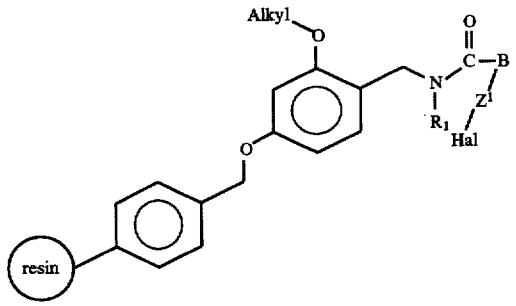

wherein $R_1$ is H or alkyl, and Hal is Cl, Br or I.

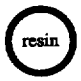

is a support resin, $Z^1$ is alkylene, alkenylene or alkynylene of up to 10 carbons, arylene or mixed arylenealkylene B is:

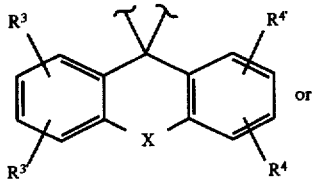

-continued

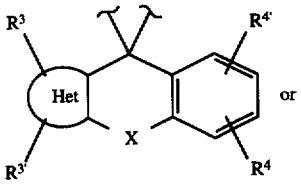

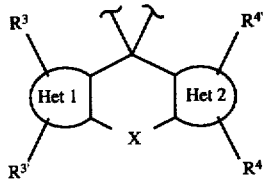

B is an indenyl-type group of the structure

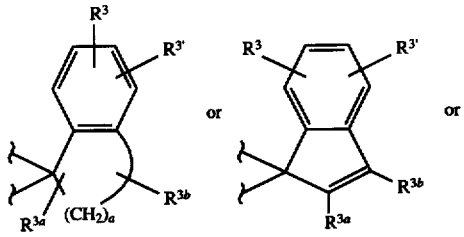

(a = 2, 3 or 4)

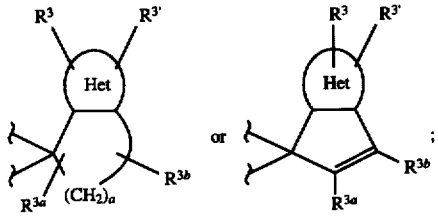

wherein $R^3$, $R^{3'}$, $R^{4'}$ and $R^{4'}$ may be the same or different and are independently selected from H, halogen, $CF_3$, haloalkyl, alkoxy, alkyl, aryl, alkenyl, alkenyloxy, alkynyl, alkynyloxy, alkanoyl, nitro, alkylthio, alkylsulfinyl, alkylsulfonyl, carboxy, alkoxycarbonyl, aminocarbonyl, alkylcarbonyloxy, alkylcarbonylamino, cycloheteroalkyl, cycloheteroalkylalkyl, cyano, Ar, Ar-alkyl, ArO, Ar-amino, Ar-thio, Ar-sulfinyl, Ar-sulfonyl, Ar-carbonyl, Ar-carbonyloxy or Ar-carbonylamino, wherein Ar is aryl or heteroaryl and Ar may optionally include 1, 2 or 3 additional rings fused to Ar;

$R^{3a}$ and $R^{3a}$ are the same or different and are independently any of the $R^3$ groups except hydroxy, nitro, amino or thio;

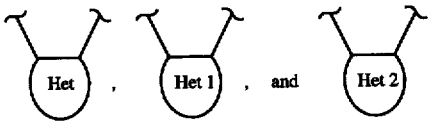

are the same or different and independently represent a 5 or 6 membered heteroaryl ring which may contain 1, 2, 3 or 4 heteroatoms in the ring which are independently N, S or O; and including N-oxides.

X (in the fluorenyl type ring) is a bond, or is one of the following groups:

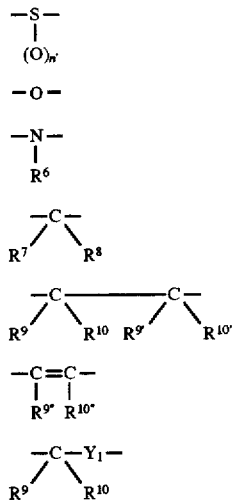

wherein $Y_1$ is O, N—$R^6$ or S;

n' is 0, 1 or 2;

$R^6$ is H, lower alkyl, aryl, —C(O)—$R^{11}$ or —C(O)—O—$R^{11}$;

$R^7$ and $R^8$ are the same or different and are independently H, alkyl, aryl, halogen, —O—$R^{12}$, or $R^7$ and $R^8$ together can be oxygen to form a ketone;

$R^9$, $R^{10}$, $R^{9'}$ and $R^{10'}$ are the same or different and are independently H, lower alkyl, aryl or —O—$R^{11}$;

$R^{9''}$ and $R^{10''}$ are the same or different and are independently H, lower alkyl, aryl, halogen or —O—$R^{11}$;

$R^{11}$ is alky or aryl;

$R^{12}$ is H, alkyl or aryl; which includes the steps of (1) providing an amine linker-resin intermediate of the structure

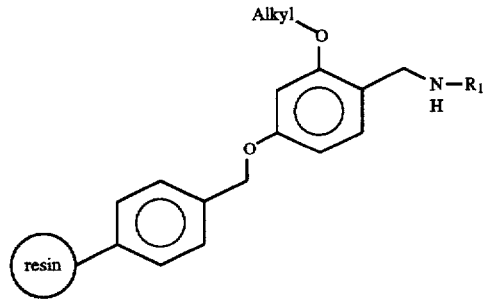

(2) treating the amine linker-resin intermediate with a halide of the structure

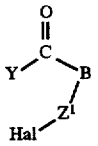

where Y is Hal,

Hal is Cl, Br, or F, $Z^1$ is alkylene, alkenylene or alkynylene of from 1 to 10 carbons;

in the presence of a base, to form the linker-resin intermediate; or (2a) treating the amine linker-resin intermediate of step (1) with an acid of the structure

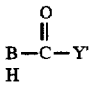

where Y' is OH, in the presence of a coupling agent, and an auxiliary nucleophile, to form the intermediate of the structure

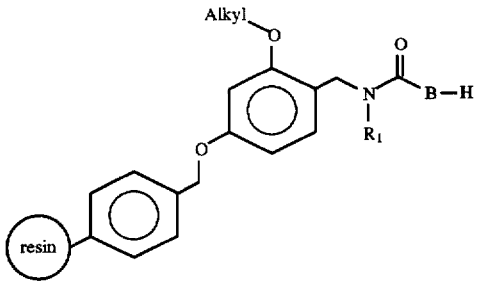

and treating the above intermediate with a dihaloalkane of the stucture $Hal_1—Z^1—Hal_2$ where $Z^1$ is as defined above, and $Hal_1$ and $Hal_2$ are independently a halogen, and a base to form the linker-resin intermediate.

11. The method as defined in claim 10 where

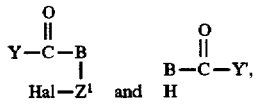

B is a fluorenyl type group.

12. The method as defined in claim 10 where in step (2a) the amine linker-resin intermediate is reacted with

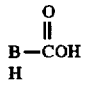

in the presence of diisopropylcarbodiimide as a coupling agent.

13. A method is provided for preparing an MTP inhibitor of the structure

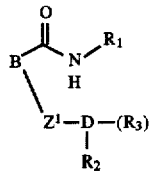

wherein $R_1$ is H or alkyl, $Z^1$ is alkylene, alkenylene or alkynylene of up to 10 carbons, arylene or mixed arylene-alkylen, B is:

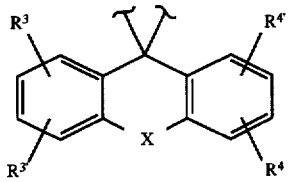

or

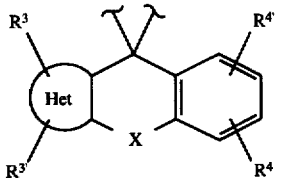

or

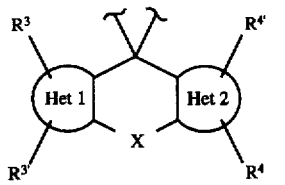

B is an indenyl-type group of the structure

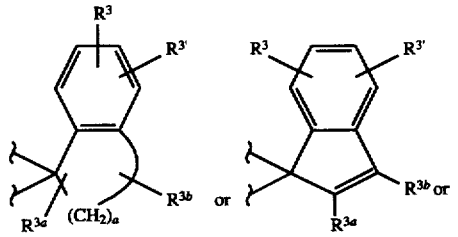

(a = 2,3 or 4)

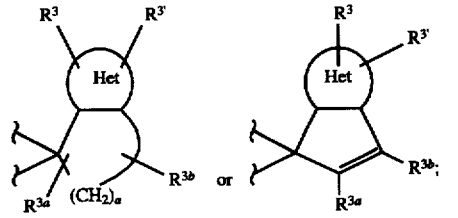

wherein $R^3$, $R^{3'}$, $R^4$ and $R^{4'}$ may be the same or 10 different and are independently selected from H, halogen, $CF_3$, haloalkyl, alkoxy, alkyl, aryl, alkenyl, alkenyloxy, alkynyl, alkynyloxy, alkanoyl, nitro, alkylthio, alkylsulfinyl, alkylsulfonyl, carboxy, alkoxycarbonyl, aminocarbonyl, alkylcarbonyloxy, alkylcarbonylamino, cycloheteroalkyl, cycloheteroalkylalkyl, cyano, Ar, Ar-alkyl, ArO, Ar-amino, Ar-thio, Ar-sulfinyl, Ar-sulfonyl, Ar-carbonyl, Ar-carbonyloxy or Ar-carbonylamino, wherein Ar is aryl or heteroaryl and Ar may optionally include 1, 2 or 3 additional rings fused to Ar;

$R^{3a}$ and $R^{3b}$ are the same or different and are independently any of the $R^3$ groups except hydroxy, nitro, amino or thio;

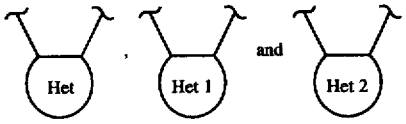

are the same or different and independently represent a 5 or 6 membered heteroaryl ring which may contain 1, 2, 3 or 4 heteroatoms in the ring which are independently N, S or O; and including N-oxides.

X (in the fluorenyl type ring) is a bond, or is one of the following groups:

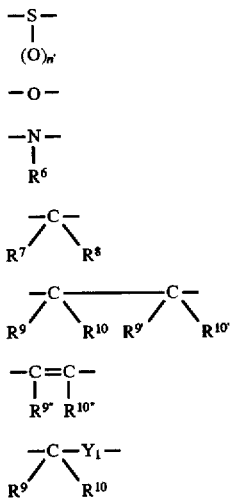

(1)

(2)

(3)

(4)

(5)

(6)

(7)

wherein $Y_1$ is O, N—$R^6$ or S;

n' is 0, 1 or 2;

$R^6$ is H, lower alkyl, aryl, —C(O)—$R^{11}$ or —C(O)—O—$R^{11}$;

$R^7$ and $R^8$ are the same or different and are independently H, alkyl, aryl, halogen, —O—$R^{12}$, or $R^7$ and $R^8$ together can be oxygen to form a ketone;

$R^9$, $R^{10}$, $R^{9'}$ and $R^{10'}$ are the same or different and are independently H, lower alkyl, aryl or —O—$R^{11}$;

$R^{9''}$ and $R^{10''}$ are the same or different and are independently H, lower alkyl, aryl, halogen or —O—$R^{11}$;

$R^{11}$ is alky or aryl;

$R^{12}$ is H, alkyl or aryl;

and D is S, O or N with the provisos that (1) when D is S or O, $R_3$ is not present, (2) when D is N, $R_2$ and $R_3$ are present, and D, $R_2$ and $R_3$ may optionally form a ring

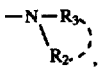

which is

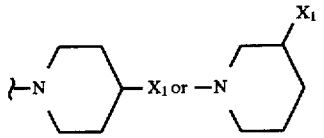

wherein $X_1$ is

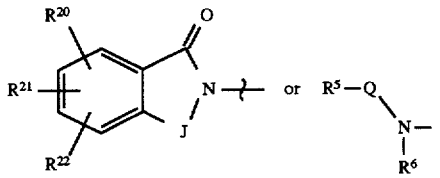

$R^5$ is independently alkyl, alkenyl, alkynyl, aryl, alkoxy, aryloxy, arylalkoxy, heteroaryl, arylalkyl, heteroarylalkyl, cycloalkyl, cycloalkylalkyl, polycycloalkyl, polycycloalkylalkyl, cycloalkenyl, cycloheteroalkyl, heteroaryloxy, cycloalkenylalkyl, polycycloalkenyl, polycycloalkenylalkyl, heteroarylcarbonyl, arylamino, heteroarylamino, cycloalkyloxy, cycloalkylamino, all optionally substituted through available carbon atoms with 1, 2, 3 or 4 groups selected from hydrogen, halo, alkyl, haloalkyl, alkoxy, haloalkoxy, alkenyl, alkynyl, cycloalkyl, cycloalkylalkyl, cycloheteroalkyl, cycloheteroalkylalkyl, aryl, heteroaryl, arylalkyl, arylcycloalkyl, arylalkenyl, arylalkynyl, aryloxy, aryloxyalkyl, arylalkoxy, arylazo, heteroaryloxo, heteroarylalkyl, heteroarylalkenyl, heteroaryloxy, hydroxy, nitro, cyano, alkylthio, arylthio, heteroarylthio, arylthioalkyl, alkylcarbonyl, arylcarbonyl, arylaminocarbonyl, alkoxycarbonyl, aminocarbonyl, alkynylaminocarbonyl, alkylaminocarbonyl, alkenylaminocarbonyl, alkylcarbonyloxy, arylcarbonyloxy, alkylcarbonylamino, arylcarbonylamino, arylsulfinyl, arylsulfinylalkyl, arylsulfonyl, alkylsulfonyl, arylsulfonylamino, heteroarylcarbonylamino, heteroarylsulfinyl, heteroarylthio, heteroarylsulfonyl, alkylsulfinyl;

$R^6$ is hydrogen or $C_1$–$C_4$ alkyl or $C_1$–$C_4$ alkenyl; all optionally substituted with 1, 2, 3 or 4 groups which may independently be any of the substituents listed in the definition of $R^5$ set out above;

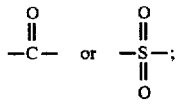

where J is: $CHR^{23}$,

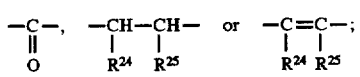

$R^{23}$, $R^{24}$ and $R^{25}$ are independently hydrogen, alkyl, alkenyl, alkynyl, aryl, arylalkyl, heteroaryl, heteroarylalkyl, cycloalkyl, or cycloalkylalkyl;

where $R^{20}$, $R^{21}$, $R^{22}$ are independently hydrogen, halo, alkyl, alkenyl, alkoxy, aryloxy, aryl, arylalkyl, alkylmercapto, arylmercapto, cycloalkyl, cycloalkylalkyl, heteroaryl, heteroarylalkyl, hydroxy or haloalkyl; and these preferred substituents may either be directly attached or attached via an alkylene chain at an open position;

$R_2$ and $R_3$ are independently H, alkyl, aryl, heteroaryl, arylalkyl, heteroarylalkyl, cycloalkyl, cycloalkylalkyl, all optionally substituted through available carbon atoms with 1, 2, 3 or 4 groups selected from H, halogen, $CF_3$, haloalkyl, hydroxy, alkoxy, alkyl, aryl, alkenyl, alkenyloxy, alkynyl, alkynyloxy, alkanoyl, nitro, alkylthio, alkylsulfinyl, alkylsulfonyl, carboxy, alkoxycarbonyl, aminocarbonyl, alkylcarbonyloxy, alkylcarbonylamino, cycloheteroalkyl, cycloheteroalkylalkyl, cyano, Ar, Ar-alkyl, ArO, Ar-amino, Ar-thio, Ar-sulfinyl, Ar-sulfonyl, Ar-carbonyl, Ar-carbonyloxy or Ar-carbonylamino (wherein Ar is aryl or heteroaryl and Ar may optionally include 1, 2 or 3 additional rings fused to Ar), cycloalkylcarbonylamino, aryloxycarbonylamino, heteroaryloxycarbonylamino, uriedo (where the uriedo nitrogens may be substituted with alkyl, aryl or heteroaryl), cyclyloheteroalkylcarbonylamino (where the heterocycle is connected to the carbonyl group via a nitrogen or carbon atom), alkylsulfonylamino, arylsulfonylamino, heteroarylsulfonylamino,

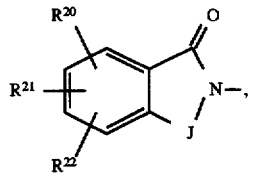

where J, and $R^{20}$, $R^{21}$, $R^{22}$ are as defined above;

which method comprises (a) providing a linker-resin intermediate of the structure

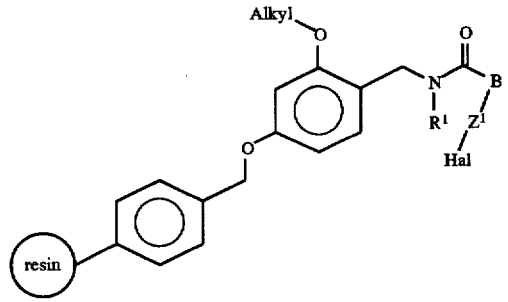

wherein

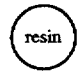

is a support resin, Hal is Cl, Br or I, and $R_1$, and B are as defined hereinbefore, (b) where D is S or O, reacting the linker-resin intermediate with a thioether or ether of the structure $HD—R_2$ where D is S or O, in the presence of a base, to form the linker-resin thioether or ether of the structure

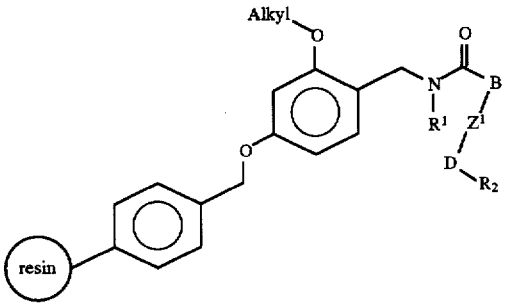

or (c) where D is N, reacting the linker resin intermediate with an amine

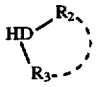

in the presence of weak alkali base to form the linker-resin amine where D is N, and (d) treating the linker-resin thiol, alcohol or amine with strong acid to remove the resin and form the MTP inhibitor.

14. The method as defined in claim 13 wherein D is S or O and the product produced has the structure

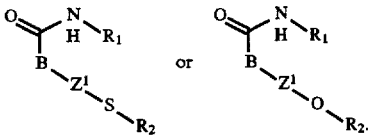

15. The method as defined in claim 13 wherein D is N and the product produced has the structure

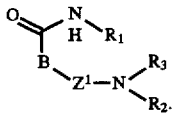

16. The method as defined in claim 13 wherein the product B is a fluorenyl type group.

17. A method for preparing a compound of the structure

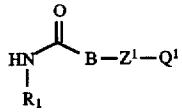

wherein $R_1$ is H or alkyl, $Z^1$ is alkylene, alkenylene or alkynylene of up to 10 carbons, arylene or mixed arylene-alkylene,

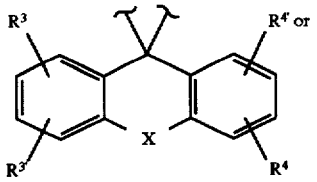

-continued

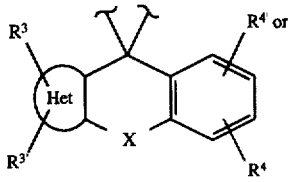

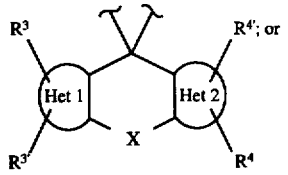

B is an indenyl-type group of the structure

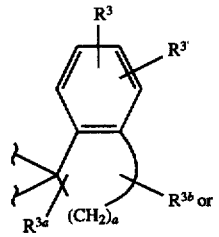

(a = 2, 3 or 4)

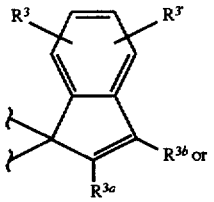

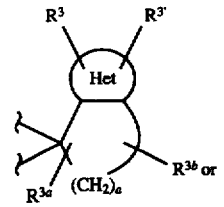

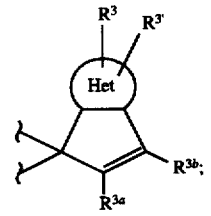

wherein $R^3$, $R^{3'}$, $R^4$ and $R^{4'}$ may be the same or different and are independently selected from H, halogen, $CF_3$, haloalkyl, alkoxy, alkyl, aryl, alkenyl, alkenyloxy, alkynyl, alkynyloxy, alkanoyl, nitro, alkylthio, alkylsulfinyl, alkylsulfonyl, carboxy, alkoxycarbonyl, aminocarbonyl, alkylcarbonyloxy, alkylcarbonylamino, cycloheteroalkyl, cycloheteroalkylalkyl, cyano, Ar, Ar-alkyl, ArO, Ar-amino, Ar-thio, Ar-sulfinyl, Ar-sulfonyl, Ar-carbonyl, Ar-carbonyloxy or Ar-carbonylamino, wherein Ar is aryl or heteroaryl and Ar may optionally include 1, 2 or 3 additional rings fused to Ar;

$R^{3a}$ and $R^{3a}$ are the same or different and are independently any of the $R^3$ groups except hydroxy, nitro, amino or thio;

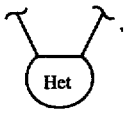

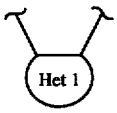

and

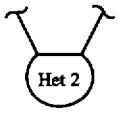

are the same or different and independently represent a 5 or 6 membered heteroaryl ring which may contain 1, 2, 3 or 4 heteroatoms in the ring which are independently N, S or O; and including N-oxides;

X (in the fluorenyl type ring) is a bond, or is one of the following groups:

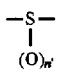
(1)

(2)

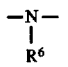
(3)

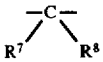
(4)

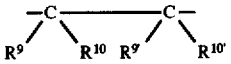
(5)

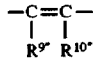
(6)

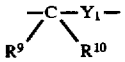
(7)

wherein $Y_1$ is O, N—$R^6$ or S;

n' is 0, 1 or 2;

$R^6$ is H, lower alkyl, aryl, —C(O)—$R^{11}$ or —C(O)—O—$R^{11}$;

$R^7$ and $R^8$ are the same or different and are independently H, alkyl, aryl, halogen, —O—$R^{12}$, or $R^7$ and $R^8$ together can be oxygen to form a ketone;

$R^9$, $R^{10}$, $R^{9'}$ and $R^{10'}$ are the same or different and are independently H, lower alkyl, aryl or —O—$R^{11}$;

$R^{9''}$ and $R^{10''}$ are the same or different and are independently H, lower alkyl, aryl, halogen or —O—$R^{11}$;

$R^{11}$ is alky or aryl;

$R^{12}$ is H, alkyl or aryl;

and $Q^1$ is alkyl, alkenyl, alkynyl, alkoxyl, (alkyl or aryl)$_3$Si (where each alkyl or aryl group is independent), cycloalkyl, cycloalkenyl, substituted alkylamino, substituted arylalkylamino, aryl, arylalkyl, arylamino, aryloxy, heteroaryl, heteroarylamino, heteroaryloxy, arylsulfonylamino, heteroarylsulfonylamino, arylthio, arylsulfinyl, arylsulfonyl, alkylthio, alkylsulfinyl, alkylsulfonyl, heteroarylthio, heteroarylsulfinyl, heteroarylsulfonyl, —PO($R^{13}$) ($R^{14}$), (where $R^{13}$ and $R^{14}$ are independently alkyl, aryl, alkoxy, aryloxy, heteroaryl, heteroarylalkyl, heteroaryloxy, heteroarylalkoxy, cycloheteroalkyl, cycloheteroalkylalkyl, cycloheteroalkoxy, or cycloheteroalkylalkoxy);

the $Q^1$ group may have from one to four substituents, which can be any of the $R^3$ groups or $Q^1$ groups or alkylcarbonylamino, cycloalkylcarbonylamino, arylcarbonylamino, heteroarylcarbonylamino, alkoxycarbonylamino, aryloxycarbonylamino, heteroaryloxylcarbonylamino, uriedo (where the uriedo nitrogens may be substituted with alkyl, aryl or heteroaryl), heterocyclylcarbonylamino (where the heterocycle is connected to the carbonyl group via a nitrogen or carbon atom), alkylsulfonylamino, arylsulfonylamino, heteroarylsulfonylamino.

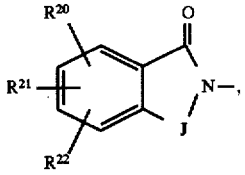

where J is: $CHR^{23}$,

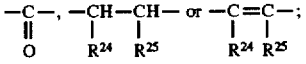

$R^{23}$, $R^{24}$ and $R^{25}$ are independently hydrogen, alkyl, alkenyl, alkynyl, aryl, arylalkyl, heteroaryl, heteroarylalkyl, cycloalkyl, or cycloalkylalkyl;

$R^{20}$, $R^{21}$, $R^{22}$ are independently hydrogen, halo, alkyl, alkenyl, alkoxy, aryloxy, aryl, arylalkyl, alkylmercapto, arylmercapto, cycloalkyl, cycloalkylalkyl, heteroaryl, heteroarylalkyl, hydroxy or haloalkyl; and these preferred substituents may either be directly attached or attached via an alkylene chain at an open position, which comprises reacting a linker resin of the structure

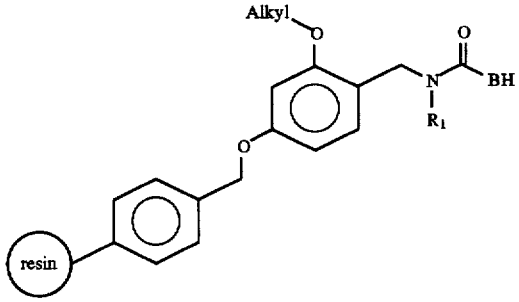

with an alkylating agent of the structure

Hal—$Z^1$—$Q^1$ to form the alkylated compound
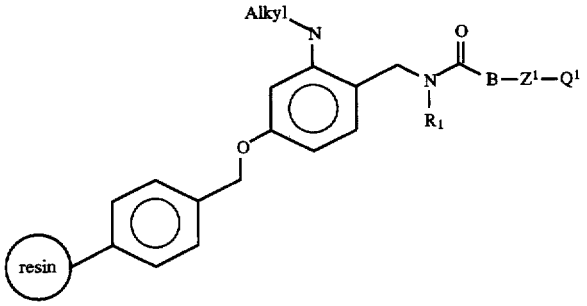
and reacting the alkylated compound with an acid to remove the resin and form
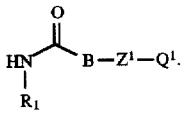
18. The method as defined in claim 17 wherein B is a fluorenyl type group.
* * * * *